US010608489B2

United States Patent
Bilgin et al.

(10) Patent No.: US 10,608,489 B2
(45) Date of Patent: Mar. 31, 2020

(54) SWITCHED RELUCTANCE MACHINE WITH ROTOR EXCITATION USING PERMANENT MAGNETS

(71) Applicant: Enedym Inc., Hamilton (CA)

(72) Inventors: Berker Bilgin, Hamilton (CA); Ali Emadi, Burlington (CA)

(73) Assignee: Enedym Inc., Hamilton, Ontario (CA)

( * ) Notice: Subject to any disclaimer, the term of this patent is extended or adjusted under 35 U.S.C. 154(b) by 438 days.

(21) Appl. No.: 14/103,041

(22) Filed: Dec. 11, 2013

(65) Prior Publication Data
US 2014/0159529 A1 Jun. 12, 2014

Related U.S. Application Data

(60) Provisional application No. 61/735,620, filed on Dec. 11, 2012.

(51) Int. Cl.
*H02K 1/27* (2006.01)
*H02K 1/24* (2006.01)

(52) U.S. Cl.
CPC ............ *H02K 1/278* (2013.01); *H02K 1/246* (2013.01); *H02K 1/2746* (2013.01); *H02K 2213/03* (2013.01); *H02K 2213/09* (2013.01)

(58) Field of Classification Search
CPC ............ H02K 1/246278; H02K 19/06; H02K 19/103; H02K 1/246; H02K 1/278; H02K 1/2746
USPC ............................. 310/156.38–156.42, 156.45
See application file for complete search history.

(56) References Cited

U.S. PATENT DOCUMENTS

| 4,795,936 A * | 1/1989 | Crosetto | H02K 1/278 310/156.31 |
| 4,995,159 A * | 2/1991 | Hancock | H02K 19/103 29/596 |
| 5,304,882 A * | 4/1994 | Lipo | H02K 21/16 310/106 |

(Continued)

FOREIGN PATENT DOCUMENTS

| CN | 1780119 | * | 5/2006 | |
| CN | 102055294 A | * | 5/2011 | H02K 29/00 |

(Continued)

OTHER PUBLICATIONS

Leitgeb et al, Machine Translation of DE4237402, May 1994.*

(Continued)

*Primary Examiner* — Quyen P Leung
*Assistant Examiner* — Eric Johnson
(74) *Attorney, Agent, or Firm* — Bereskin & Parr LLP/S.E.N.C.R.L., s.r.l.; Stephen Beney; T. Cameron Gale

(57) ABSTRACT

Various embodiments are described herein for a switched reluctance machine having a rotor excitation. In one example embodiment, the switched reluctance machine comprises a stator and a rotor. The rotor may be disposed inside or outside the stator. The rotor is spaced from the stator, and the rotor and the stator are concentrically disposed. The rotor has a plurality of rotor poles having an excitation source, where the excitation source comprises at least one adjustable parameter. The excitation source is provided by a permanent magnet. The dimensions and various other parameters associated with the permanent magnets are adjustable.

16 Claims, 23 Drawing Sheets

(56) References Cited

U.S. PATENT DOCUMENTS

| | | | |
|---|---|---|---|
| 5,923,142 A * | 7/1999 | Li | H02P 25/092 310/165 |
| 5,973,431 A * | 10/1999 | Li | H02P 25/092 310/156.15 |
| 5,973,462 A | 10/1999 | Kalpathi et al. | |
| 6,087,751 A * | 7/2000 | Sakai | H02K 1/246 310/156.56 |
| 6,097,126 A * | 8/2000 | Takura | H02K 19/103 310/166 |
| 6,114,789 A | 9/2000 | Pengov et al. | |
| 6,150,971 A | 11/2000 | Naylor et al. | |
| 6,329,734 B1 * | 12/2001 | Takahashi | H02K 1/246 310/156.07 |
| 6,442,535 B1 | 8/2002 | Yifan | |
| 6,552,462 B2 * | 4/2003 | Sakai | H02K 21/46 310/156.56 |
| 6,700,273 B1 * | 3/2004 | Ojima | F04C 18/00 310/166 |
| 6,836,044 B2 | 12/2004 | Ando et al. | |
| 6,847,144 B1 * | 1/2005 | Luo | H02K 1/276 310/156.49 |
| 6,992,036 B2 | 1/2006 | Gindelberger | |
| 7,230,360 B2 | 6/2007 | Desai et al. | |
| 2002/0047435 A1 * | 4/2002 | Takahashi | H02K 1/246 310/156.56 |
| 2004/0251761 A1 * | 12/2004 | Hirzel | H02K 21/16 310/156.25 |
| 2005/0156475 A1 * | 7/2005 | Ramu | H02K 19/103 310/166 |
| 2005/0168309 A1 * | 8/2005 | Engel | H01P 1/122 335/229 |
| 2010/0019612 A1 * | 1/2010 | Lefley | H02K 1/246 310/216.076 |
| 2011/0210686 A1 * | 9/2011 | Sengchanh | H02K 1/146 318/135 |
| 2013/0134805 A1 * | 5/2013 | Jung | H02K 21/44 310/46 |
| 2014/0062379 A1 * | 3/2014 | Dai | H02P 25/08 318/701 |

FOREIGN PATENT DOCUMENTS

| | | | | |
|---|---|---|---|---|
| CN | 102751838 | * | 10/2012 | |
| DE | 4237402 A1 | * | 5/1994 | H02K 1/278 |
| JP | WO 0055961 A1 | * | 9/2000 | H02K 1/246 |
| JP | WO 2011004546 A1 | * | 1/2011 | H02K 19/103 |
| WO | WO-0055961 A1 | * | 9/2000 | H02K 1/246 |
| WO | WO 2012129964 A1 | * | 10/2012 | H02P 25/08 |

OTHER PUBLICATIONS

Hasebe et al, Machine Translation of WO0055961, Sep. 2000.*
Xie, machine translation of cn1780119, May 2006.*
Hongmei et al., Machine Translation of CN102055294, May 2011.*
Dai, Machine Translation of CN102751838, Oct. 2012.*

* cited by examiner

SWITCHED RELUCTANCE MACHINE WITH ROTOR EXCITATION USING PERMANENT MAGNETS

CROSS-REFERENCE TO RELATED APPLICATION

This application claims the benefit of U.S. Provisional Patent Application No. 61/735,620 filed Dec. 11, 2012, the contents of which are incorporated herein by reference.

TECHNICAL FIELD

The described embodiments relate to electric machines with salient pole structures, and in particular, to switched reluctance machines with permanent magnet configuration for rotor excitation.

BACKGROUND

Electric machines have been applied as motors and generators in a wide range of industries. A reluctance machine is an electric machine in which torque is produced by the tendency of the movable part of the machine to move into a position where the inductance of an excited winding is maximized. A switched reluctance machine is a type of a reluctance machine where the windings are energized as a function of the position of the movable part of the machine.

A switched reluctance machine is a brushless machine with salient pole construction on its rotor and stator. Conventional switched reluctance machines typically have concentrated windings around each stator pole to generate electromagnetic field. Typically, in a three-phase switched reluctance machine, depending on the number of poles in each phase, the windings around the stator poles are connected in series or parallel to create phase windings.

When a phase is energized, the flux generated by the coil windings closes its path through the rotor and the closest rotor pole rotates to get in alignment with the stator pole. Due to double saliency, i.e. salient poles on both the stator and the rotor, when the rotor pole moves towards the stator pole, the airgap length, and, hence, the stored energy changes.

The change in the stored energy depends both on the rotor position and the excitation current, and may result in a variable inductance profile, and accordingly, a pulsating torque profile.

Furthermore, since there is no excitation source on the rotor of the conventional switched reluctance machine, the radial forces acting on the rotor pole to pull it towards the stator pole causes torque ripples, vibration and acoustic noise. This also contributes to lower power density in conventional switched reluctance machines as compared to high-performance electric machines.

SUMMARY

In one aspect, at least one embodiment described herein provides a switched reluctance machine comprising: a stator; and a rotor, the rotor being disposed concentrically with and spaced from the stator, the rotor having a plurality of rotor poles, the rotor poles having an excitation source comprising at least one adjustable parameter.

In some embodiments, each rotor pole comprises a permanent magnet to provide the excitation source.

In some embodiments, adjacent rotor pole pairs comprise permanent magnets with opposite polarity. In some other embodiments, adjacent rotor pole pairs comprise permanent magnets with same polarity.

In some embodiments, each rotor pole comprises permanent magnet in a continuous configuration on the surface of the rotor pole.

In some embodiments, the permanent magnet is located on top edge of the rotor pole. In some other embodiments, the permanent magnet is located on each top corner of the rotor pole. In some further embodiments, the permanent magnet comprises a plurality of permanent magnets arranged in a unique configuration.

In some embodiments, the permanent magnet is a surface magnet. In some other embodiments, the permanent magnet is a straight-shape magnet.

In some embodiments, the permanent magnet is a U-shape magnet. In some other embodiments, the permanent magnet is an inverse U-shape magnet. In some further embodiments, the permanent magnet is a tilted U-shape magnet. In some other embodiments, the permanent magnet is a tilted inverse U-shape magnet.

In some embodiments, the permanent magnet is a V-shape magnet. In some other embodiments, the permanent magnet is an inverse V-shape magnet. In some further embodiments, the permanent magnet is a tilted V-shape magnet. In some other embodiments, the permanent magnet is a tilted inverse V-shape magnet.

In some embodiments, the at least one adjustable parameter comprises length of the permanent magnet. In some other embodiments, the at least one adjustable parameter comprises width of the permanent magnet.

In some embodiments, the permanent magnet overlays the surface of the rotor pole. In such embodiments, the at least one adjustable parameter may comprise radius of the surface magnet. In such embodiments, the at least one adjustable parameter may additionally or alternatively comprise fillet radii of each corner of surface magnet.

In some embodiments, the permanent magnet is located on each top corner of the rotor pole. In such embodiments, the at least one adjustable parameter may comprise distance between the permanent magnets on each top corner of the rotor pole.

In some embodiments, the permanent magnet is a straight-shape magnet. In such embodiments, the at least one adjustable parameter may comprise outer length of the straight-shape magnet. In such embodiments, the at least one adjustable parameter may additionally or alternatively comprise inner length of the straight-shape magnet.

In some embodiments, each rotor pole comprises a plurality of permanent magnets. In such embodiments, the at least one adjustable parameter comprises distance between adjacent permanent magnets.

In some embodiments, the at least one adjustable parameter comprises position angle of the permanent magnet.

In some other embodiments, the at least one adjustable parameter comprises extension angle of the permanent magnet.

In some further embodiments, the at least one adjustable parameter comprises rotation angle of the permanent magnet.

In some embodiments, the switched reluctance machine further comprises a controller configured to control current in each phase winding of the stator based on position of the rotor poles.

In some embodiments, the rotor is disposed outside the stator. In some other embodiments, the rotor is disposed inside the stator.

In another aspect, in at least one embodiment described herein, there is provided a method of manufacturing a switched reluctance machine. The method comprises: providing a stator; and disposing a rotor concentrically with and spaced from the stator. The rotor has a plurality of rotor poles. The method further comprises providing the rotor poles with an excitation source comprising at least one adjustable parameter. In various embodiments, the method comprises providing each rotor pole with a permanent magnet to provide the excitation source.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

Several embodiments of the present invention will now be described in detail with reference to the drawings, in which.

Figure 1:
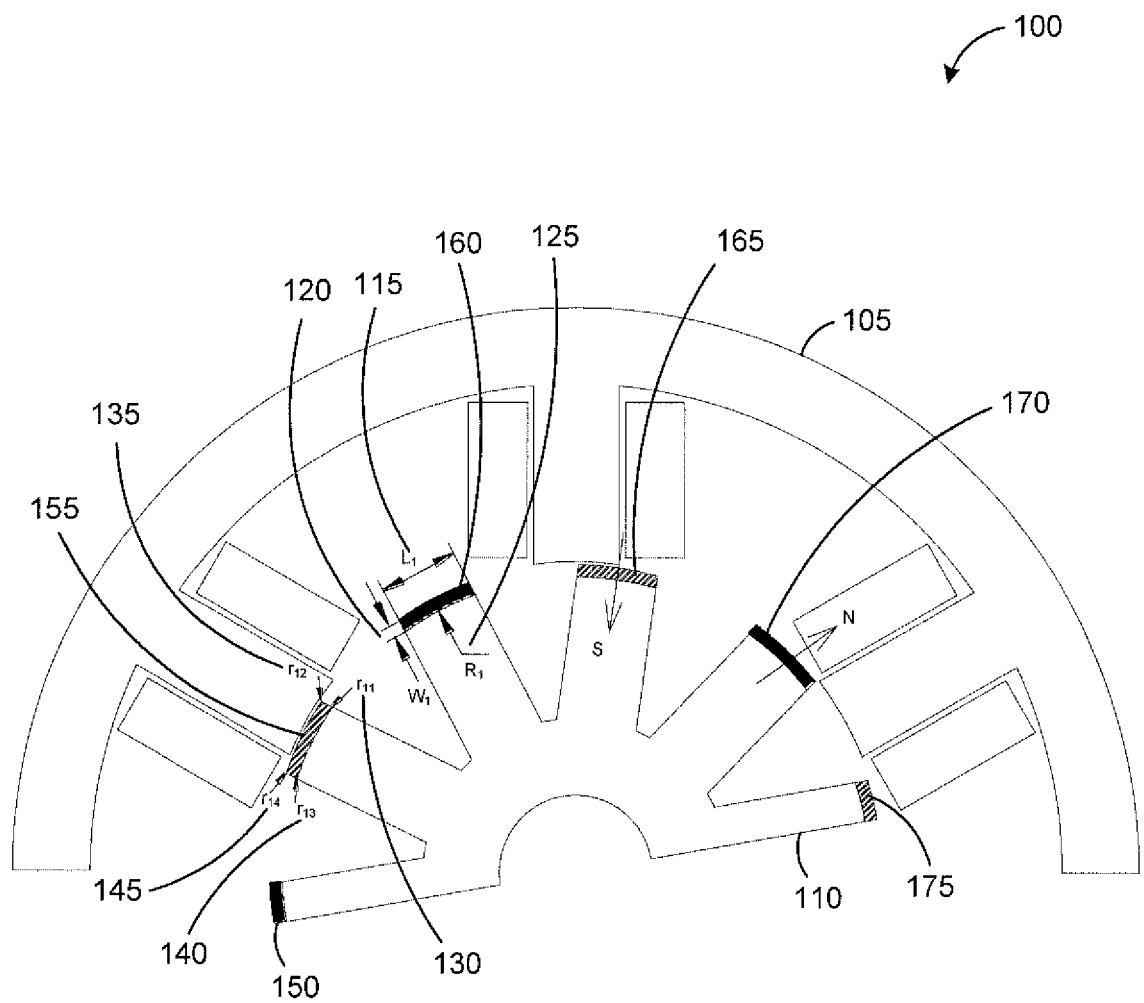
FIG. 1 is a cross-sectional view of a switched reluctance machine having opposite permanent magnet polarity on adjacent rotor pole pairs in accordance with an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

The various embodiments described herein relate to a switched reluctance machine that comprises an excitation source on the rotor poles. In particular, the various embodiments described herein relate to a switched reluctance machine comprising various permanent magnet configurations located on the rotor poles.

Various embodiments of switched reluctance machines with rotor excitation disclosed herein include a variety of adjustable features, such as, for example, configuration of permanent magnets on rotor poles, dimension of permanent magnets on rotor poles, dimensions of stator and rotor poles, number of permanent magnets, type of permanent magnet material, and/or number of stator and rotor poles etc.

These and any other adjustable parameters or features may be adjusted based on a variety of factors, such as, for example, application type of the switched reluctance machine with rotor excitation, size requirements, cost constraints, performance characteristics, and machine ratings (including, for example, power, torque, speed, voltage and current ratings), etc., of the switched reluctance machine with rotor excitation.

In various cases, the overall size of a switched reluctance machine with rotor excitation may be determined by considering the mutual effect of rotor excitation source (permanent magnets) and stator excitation source (coils) on the magnetic circuit.

The various embodiments of switched reluctance machines having rotor excitation described herein may provide certain advantages over conventional switched reluctance machines. Such advantages may include one or more of: high power density, high torque density, compact manufacturing, low cost, fault tolerance and quieter electric machines capable of operating in harsh environmental conditions.

The various embodiments of switched reluctance machines having rotor excitation described herein may also provide the advantages of decreased radial force requirements, decreased torque ripples, decreased acoustic noise, and accordingly, increased power density.

The switched reluctance machines with rotor excitation using permanent magnets may have applications in any industry where high torque density, low torque ripple and/or fault tolerance in an electric machine is required. The various embodiments of switched reluctance machines having rotor excitation described herein may have applications in the fields of hybrid electric vehicle powertrain, hybrid electric aircraft powertrain, hybrid ship powertrain, power generation and/or manufacturing processes.

Various embodiments disclosed herein illustrate different permanent magnetic configurations on rotor poles on one-half model of an interior-rotor 6/10 switched reluctance machine. This is for illustration purposes only. The various permanent magnet configurations on rotor poles disclosed herein can be used in all possible switched reluctance machines with all possible number of phases and sizes. The various permanent magnet configurations are also applicable to exterior-rotor switched reluctance machine configurations where the rotor is located outside of the stator.

An interior-rotor reluctance machine configuration includes a stator and a rotor, where the rotor is located inside the stator. An exterior-rotor reluctance machine configuration includes a stator and a rotor where the rotor is location outside of the stator. In the exterior-rotor reluctance machine, the rotor is upside down such that the rotor poles look down and stator poles look up. Even though the various examples illustrated herein are based on the interior-rotor reluctance machine configuration, the various teachings herein also apply to the exterior-rotor reluctance machine configuration.

In the illustrated embodiments disclosed herein, the flux directions of permanent magnets are shown with arrows and magnetic polarities are designated with different hatching styles. The solid hatch represents the magnetic North pole and is designated with "N", whereas the line hatch represents the magnetic South Pole and designated with "S".

Reference is first made to FIG. 1 illustrating a cross-sectional view of a switched reluctance machine 100 having opposite permanent magnet polarity on adjacent rotor poles in accordance with an example embodiment.

The switched reluctance machine 100 of FIG. 1 consists of a stator 105, a rotor 110, a first rotor pole 150, a second rotor pole 155, a third rotor pole 160, a fourth rotor pole 165, a fifth rotor pole 170 and a sixth rotor pole 175. As illustrated in FIG. 1, rotor 110 is located inside stator 105.

In some cases, the rotor 110 may be located outside the stator 105. In such cases, the rotor 110 is upside down, and the first rotor pole 150, the second rotor pole 155, the third rotor pole 160, the fourth rotor pole 165, the fifth rotor pole 170 and the sixth rotor pole 175 are looking down on the stator 105.

The first to sixth rotor poles, 150 to 175, comprise permanent magnets located on the rotor poles. In the illustrated embodiment, the permanent magnets span over the top edges of the rotor poles, where the top edges comprise the surface of the rotor poles closest to the stator poles. In some cases, the permanent magnets span over the entire surface of the rotor poles. In some other cases, the permanent magnets span over a substantial area of the rotor poles. In some further cases, different rotor poles comprise different permanent magnet configuration such that different rotor poles have different area coverage by the permanent magnets.

In the illustrated embodiment, the permanent magnets located on rotor poles 150 to 175 of switched reluctance machine 100 are configured such that permanent magnets on adjacent rotor pole pairs have opposed polarity. In this embodiment, first rotor pole 150, third rotor pole 160 and fifth rotor pole 170 comprise permanent magnets having the same orientation, and accordingly, the polarity, as each other. Second rotor pole 155, fourth rotor pole 165 and sixth rotor pole 175 comprise permanent magnets having the same orientation, and accordingly, the polarity as each other, which is opposite than the orientation and polarity of the permanent magnets corresponding to the first 150, third 160 and fifth 170 rotor poles.

Switched reluctance machine 100 has a plurality of adjustable parameters associated with the permanent magnets located on the rotor poles, which can be adjusted based on the application of the switched reluctance machine 100. Depending on machine ratings suitable for the type of application for the switched reluctance machine 100, the adjustable parameters may be adjusted to match desired performance characteristics, size and cost of the switched reluctance machine 100.

Adjustable parameters in switched reluctance machine 100 include a plurality of parameters, such as, for example, length of surface permanent magnet $L_1$ 115, width of surface permanent magnet $W_1$ 120, radius of surface permanent magnet $R_1$ 125 (in case a similar shape with rotor pole surface is used), fillet radii of each corner of surface permanent magnet $r_{11}$, $r_{12}$, $r_{13}$, $r_{14}$ 130, 135, 140 and 145 etc.

In various embodiments disclosed herein, the length of the permanent magnet, such as the surface permanent magnet $L_1$ 115, may affect the magnet arc length covered by the stator flux. Depending on the operating conditions, this might affect the machine performance parameters, including parameters, such as, for example, saliency, torque, torque ripple, induced voltage, etc. The width of the permanent magnet, such as the surface permanent magnet $W_1$ 120, may have an effect on the demagnetization characteristics of the magnet.

Figure 2:
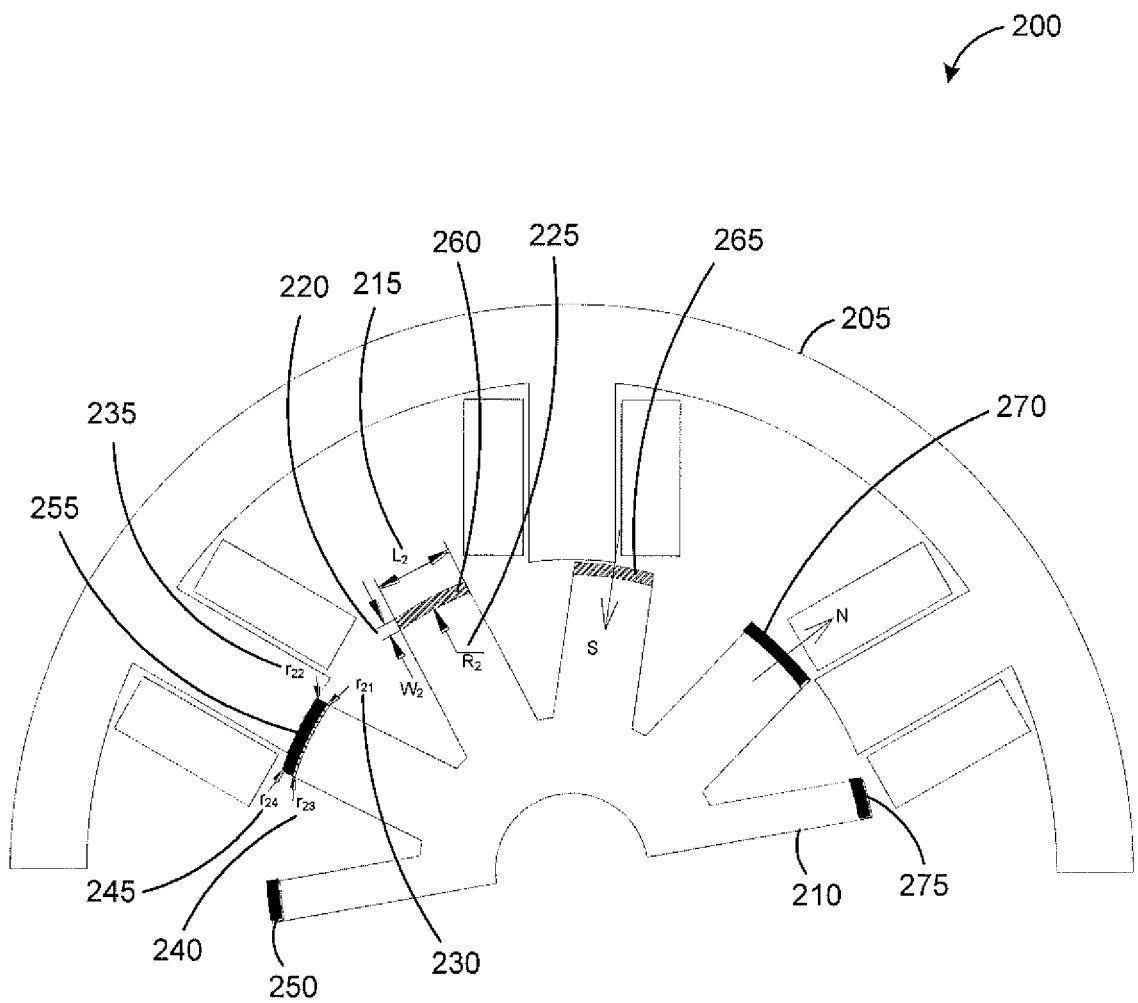
FIG. 2 is a cross-sectional view of a switched reluctance machine having same permanent magnet polarity on adjacent rotor pole pairs in accordance with another example embodiment.

Reference is first made to FIG. 2 illustrating a cross-sectional view of a switched reluctance machine 200 having same permanent magnet polarity on adjacent rotor poles in accordance with an example embodiment.

The switched reluctance machine 200 of FIG. 2 consists of a stator 205, a rotor 210, a first rotor pole 250, a second rotor pole 255, a third rotor pole 260, a fourth rotor pole 265, a fifth rotor pole 270 and a sixth rotor pole 275.

As illustrated in FIG. 2, rotor 210 is located inside stator 205. As mentioned above, the rotor 210 may be located outside the stator 205, where the rotor 210 is upside down, and the first rotor pole 250, the second rotor pole 255, the third rotor pole 260, the fourth rotor pole 265, the fifth rotor pole 270 and the sixth rotor pole 275 are looking down on the stator 205.

The first to sixth rotor poles, 250 to 275, comprise permanent magnets located on the rotor poles. The permanent magnets located on the rotor poles 250 to 275 of the switched reluctance machine 200 are configured such that permanent magnets on adjacent rotor poles have same polarity.

In this embodiment, first rotor pole 250 and the second rotor pole 255 comprise permanent magnets having the same orientation, and accordingly the same polarity, as each other. Similarly, the fifth rotor pole 270 and the sixth rotor pole 275 comprise permanent magnets having the same orientation and polarity as each other.

The third rotor pole 260 and the fourth rotor pole 265 comprise permanent magnets having the same orientation, and accordingly, the same polarity as each other, but opposite than the orientation and polarity of the permanent magnets corresponding to the first rotor pole 250 and second rotor pole 255. In this embodiment, the same pattern repeats such that adjacent pole pairs have permanent magnets with same orientation and polarity.

Switched reluctance machine 200 has a plurality of adjustable parameters associated with the permanent magnets located on the rotor poles, which can be adjusted based on the application of the switched reluctance machine 200. Depending on machine ratings suitable for the type of application for the switched reluctance machine 200, the adjustable parameters may be adjusted to match desired performance characteristics, size and cost of the switched reluctance machine 200.

Adjustable parameters in switched reluctance machine 200 may include length of surface permanent magnet $L_2$ 215, width of surface permanent magnet $W_2$ 220, radius of surface permanent magnet (in case a similar shape with rotor pole surface is used) $R_2$ 225, fillet radii of each corner of surface permanent magnet $r_{21}, r_{22}, r_{23}, r_{24}$ 230, 235, 240 and 245, etc.

Figure 3:
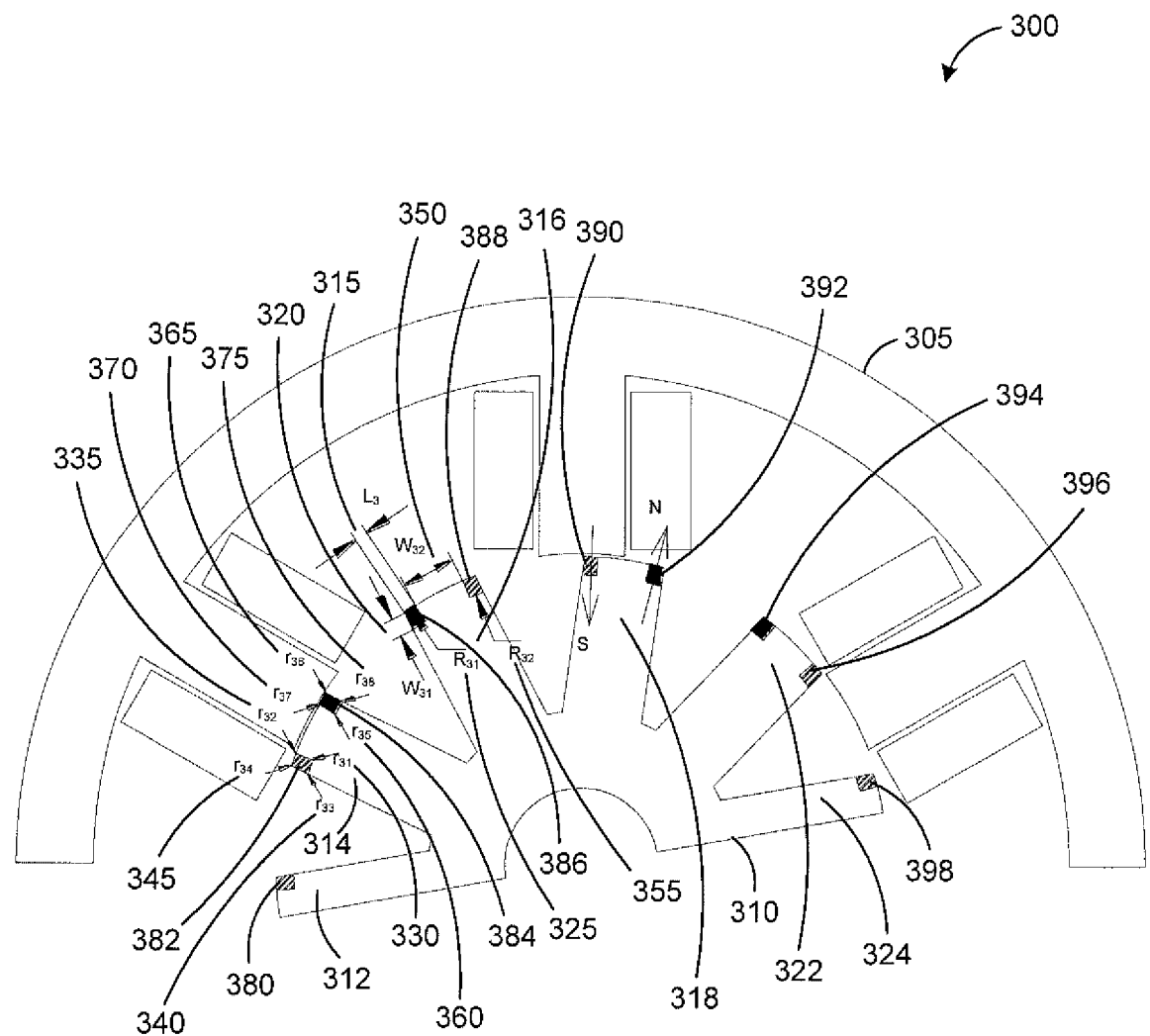
FIG. 3 is a cross-sectional view of a switched reluctance machine having permanent magnets located on each top corner of rotor pole pairs with same polarity on adjacent corners in accordance with an example embodiment.

Reference is first made to FIG. 3 illustrating a cross-sectional view of a switched reluctance machine 300 having permanent magnets located on each corner of rotor poles in accordance with an example embodiment.

The switched reluctance machine 300 of FIG. 3 consists of a stator 305, a rotor 310, a first rotor pole 312, a second rotor pole 314, a third rotor pole 316, a fourth rotor pole 318, a fifth rotor pole 322 and a sixth rotor pole 324.

As illustrated in FIG. 3, rotor 310 is located inside stator 305. In some other cases, rotor 310 is located outside the stator 305, and the rotor 310 is upside down. In such cases, the first rotor pole 312, the second rotor pole 314, the third rotor pole 316, the fourth rotor pole 318, the fifth rotor pole 322 and the sixth rotor pole 324 are looking down on the stator 305.

In this embodiment, each of the first to sixth rotor poles, 312 to 324, comprise permanent magnets located on each corner of the rotor poles. As illustrated, rotor pole 312 comprises permanent magnet 380 located on one corner of the rotor pole 312. Rotor pole 312 also comprises another permanent magnet (not illustrated) located on the opposite top corner of the rotor pole 312. Similarly, rotor pole 314 comprises permanent magnets 382 and 384 located on opposite top corners of the rotor pole 314. Rotor pole 316 comprises permanent magnets 386 and 388 located on opposite top corners of the rotor pole 316. Rotor pole 318 comprises permanent magnets 390 and 392 located on opposite top corners of the rotor pole 318. Rotor pole 322 comprises permanent magnets 394 and 396 located on opposite top corners of the rotor pole 322. Rotor pole 324 comprises permanent magnet 398 on one of the top corners of the rotor pole 324. Rotor pole 324 also comprises another permanent magnet (not illustrated) located on the opposite top corner of the rotor pole 324.

The permanent magnets 380 to 398 located on each corner of the rotor poles 312 to 324 of the switched reluctance machine 300 are configured such that permanent magnets on adjacent corner pair have same polarity. In this embodiment, permanent magnet 380 of rotor pole 312 and permanent magnet 382 of rotor pole 314, permanent magnet 388 of rotor pole 316 and permanent magnet 390 of rotor pole 318, permanent magnet 396 of rotor pole 322 and permanent magnet 398 of rotor pole 324 have the same orientation, and accordingly, the polarity as each other.

Permanent magnet 384 of rotor pole 314 and permanent magnet 386 of rotor pole 316, and permanent magnet 392 of rotor pole 318 and permanent magnet 394 of rotor pole 322 have the same orientation and polarity as each other, but different than the orientation and polarity of permanent magnet pairs 380-382, permanent magnet pairs 388-390, and permanent magnet pairs 396-398.

Switched reluctance machine 300 has a plurality of adjustable parameters associated with the permanent magnets located on each corner of the rotor poles, which can be adjusted based on the application of the switched reluctance machine 300. Depending on machine ratings suitable for the type of application for the switched reluctance machine 300, the adjustable parameters may be adjusted to match desired performance characteristics, size and cost of the switched reluctance machine 300.

Adjustable parameters in switched reluctance machine 300 may include length of corner permanent magnets $L_3$ 315, width of corner permanent magnets $W_{31}$ 320, distance between permanent magnets on each corner of the rotor pole $W_{32}$ 350, radii of permanent magnets on each corner of the rotor pole (in case a similar shape with rotor pole surface is used) $R_{31}$ 325 and $R_{32}$ 355, and fillet radii of each corner of permanent magnets, such as, for example, filler radii $r_{31}, r_{32}, r_{33}, r_{34}$ 330, 335, 340, 345 for permanent magnet 382, filler radii $r_{35}, r_{36}, r_{37}, r_{38}$ 360, 365, 370 and 375, etc.

Figure 4:
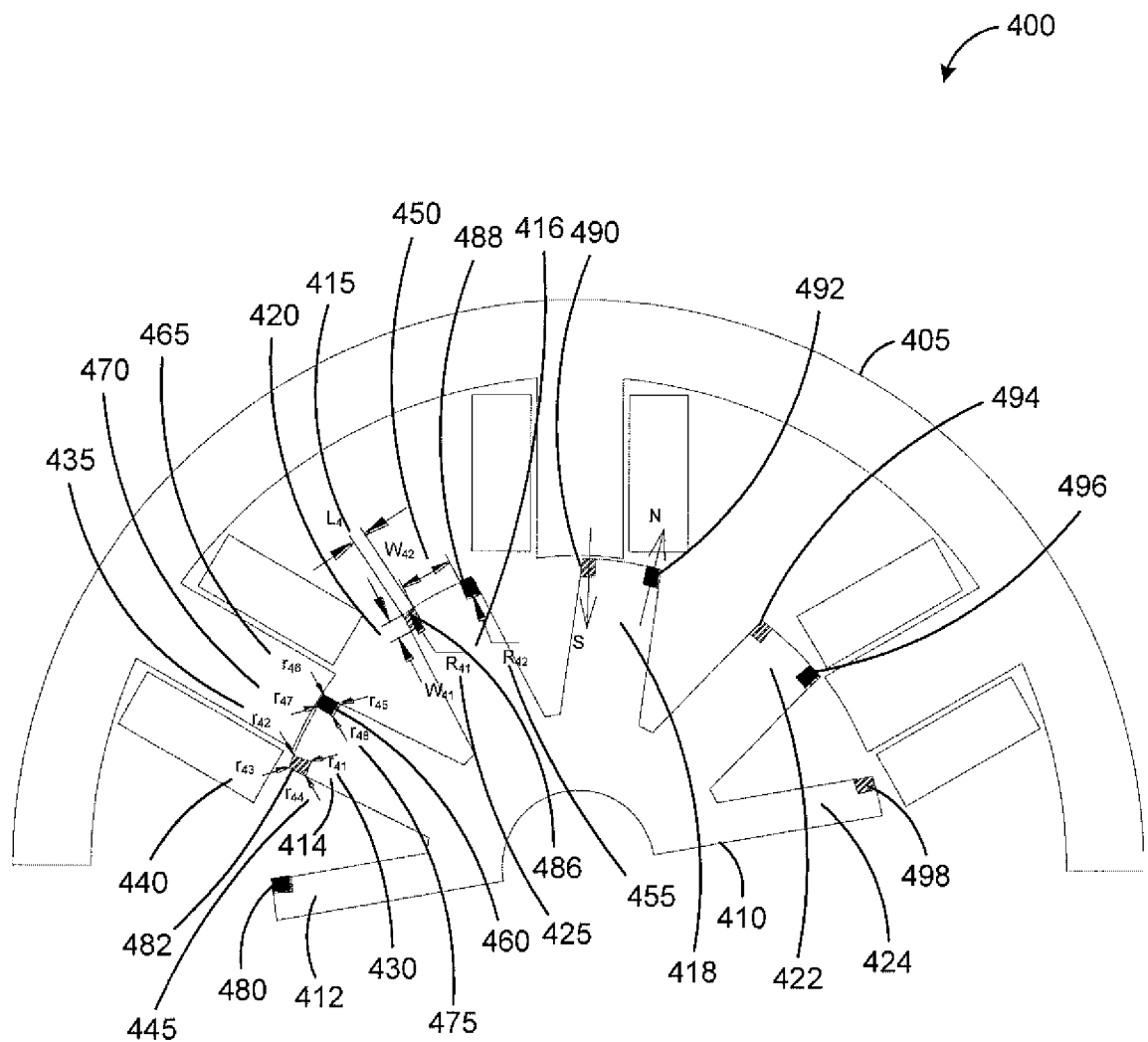
FIG. 4 is a cross-sectional view of a switched reluctance machine having permanent magnets located on each top corner of rotor pole pairs with opposite polarity on adjacent corners in accordance with another example embodiment.

Reference is first made to FIG. 4 illustrating a cross-sectional view of a switched reluctance machine 400 having permanent magnets located on each corner of rotor poles in accordance with an example embodiment.

The switched reluctance machine 400 of FIG. 4 consists of a stator 405, a rotor 410 located inside the stator 405, a first rotor pole 412, a second rotor pole 414, a third rotor pole 416, a fourth rotor pole 418, a fifth rotor pole 422 and a sixth rotor pole 424. As illustrated in FIG. 4, rotor 410 is located inside stator 405.

As mentioned above, the rotor 410 may be located outside the stator 405, where the rotor 410 is upside down, and the first rotor pole 412, the second rotor pole 414, the third rotor pole 416, the fourth rotor pole 418, the fifth rotor pole 422 and the sixth rotor pole 424 are looking down on the stator 405.

In this embodiment, each of the first to sixth rotor poles, 412 to 424, comprise permanent magnets located on each corner of the rotor poles. As illustrated, rotor pole 412 comprises permanent magnet 480 located on one corner of the rotor pole 412. Rotor pole 412 also comprises another permanent magnet (not illustrated) located on the opposite top corner of the rotor pole 412. Similarly, rotor pole 414 comprises permanent magnets 482 and 484 located on opposite top corners of the rotor pole 414. Rotor pole 416 comprises permanent magnets 486 and 488 located on opposite top corners of the rotor pole 416. Rotor pole 418 comprises permanent magnets 490 and 492 located on opposite top corners of the rotor pole 418. Rotor pole 422 comprises permanent magnets 494 and 496 located on opposite top corners of the rotor pole 422. Rotor pole 424 comprises permanent magnet 498 on one of the top corners of the rotor pole 424. Rotor pole 424 also comprises another permanent magnet (not illustrated) located on the opposite top corner of the rotor pole 424.

The permanent magnets 480 to 498 located on each corner of the rotor poles 412 to 424 of the switched reluctance machine 400 are configured such that permanent magnets located on adjacent corner pair have opposite polarity. In this embodiment, permanent magnet 480 of rotor pole 412, permanent magnet 484 of rotor pole 414, permanent magnet 488 of rotor pole 416, permanent magnet 492 of rotor pole 418, permanent magnet 496 of rotor pole 422 and permanent magnet 498 of rotor pole 424 have the same orientation, and accordingly, the polarity as each other.

Permanent magnet 482 of rotor pole 414, permanent magnet 486 of rotor pole 416, permanent magnet 490 of rotor pole 418, permanent magnet 494 of rotor pole 422, and permanent magnet 498 of rotor pole 424 have the same orientation and polarity as each other, but different than the orientation and polarity of permanent magnets 480, 484, 488, 492, and 494.

Switched reluctance machine 400 has a plurality of adjustable parameters associated with the permanent magnets located on each corner of the rotor poles, which can be adjusted based on the application of the switched reluctance machine 400. Depending on machine ratings suitable for the type of application for the switched reluctance machine 400, the adjustable parameters may be adjusted to match desired performance characteristics, size and cost of the switched reluctance machine 400.

Adjustable parameters in switched reluctance machine 400 may include length of corner permanent magnets $L_4$ 415, width of corner permanent magnets $W_{41}$ 420, distance between permanent magnets on each corner of the rotor pole $W_{42}$ 450, radii of permanent magnets on each corner of the rotor pole (in case a similar shape with rotor pole surface is used) $R_{41}$ 425 and $R_{42}$ 455, and fillet radii of each corner of permanent magnets, such as, for example, filler radii $r_{41}$, $r_{42}$, $r_{43}$, $r_{44}$ 430, 435, 440, 445 for permanent magnet 482, filler radii $r_{45}$, $r_{46}$, $r_{47}$, $r_{48}$ 460, 465, 470 and 475, etc.

Figure 5:
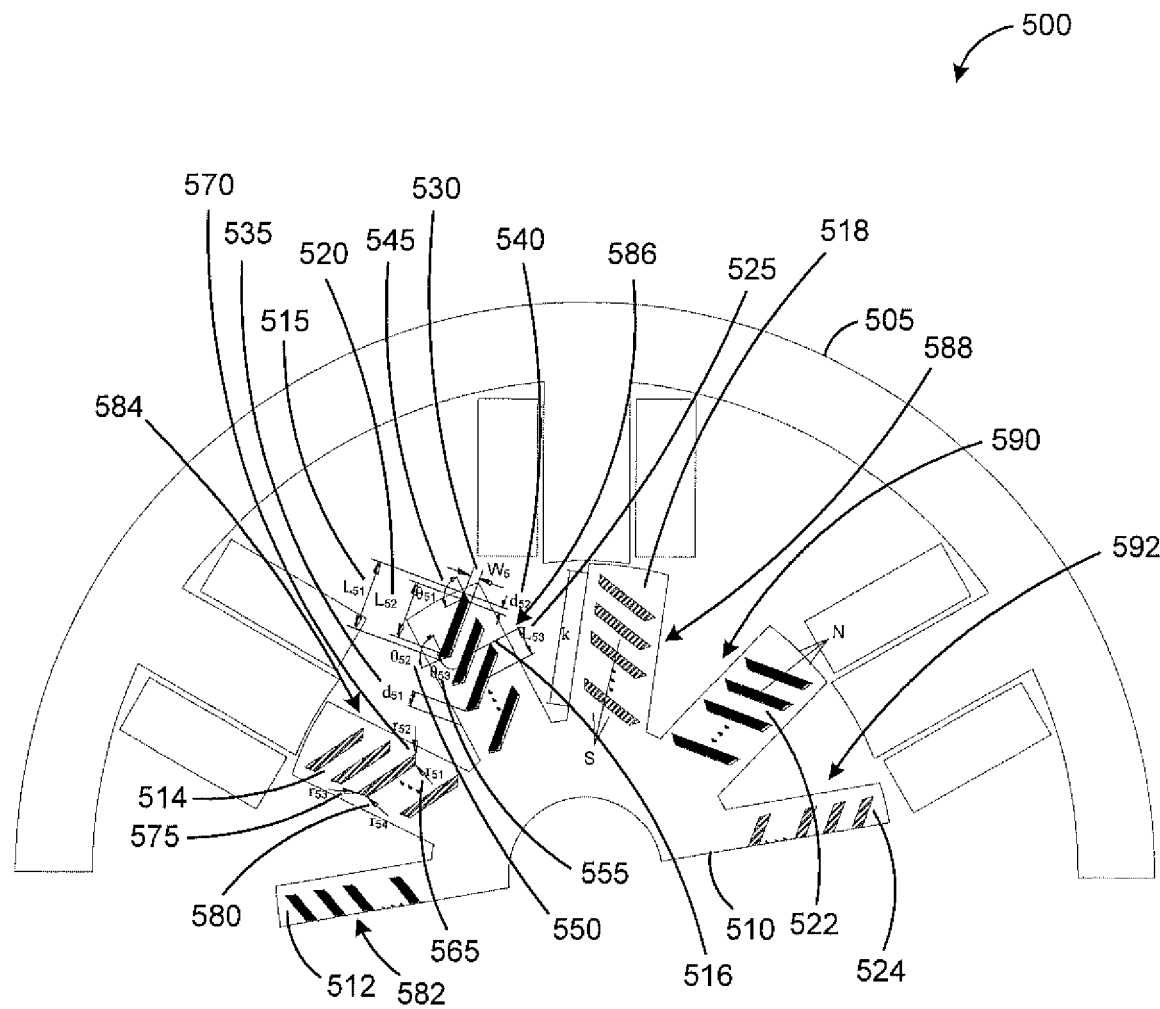
FIG. 5 is a cross-sectional view of a switched reluctance machine having straight-shape permanent magnets with opposite polarity on adjacent rotor pole pairs in accordance with an example embodiment.

Reference is first made to FIG. 5 illustrating a cross-sectional view of a switched reluctance machine 500 having straight-shape permanent magnets with opposite polarity on adjacent rotor pole pairs in accordance with an example embodiment.

The switched reluctance machine 500 of FIG. 5 consists of a stator 505, a rotor 510, a first rotor pole 512, a second rotor pole 514, a third rotor pole 516, a fourth rotor pole 518, a fifth rotor pole 522 and a sixth rotor pole 524.

As illustrated in FIG. 5, rotor 510 is located inside stator 505. As mentioned above, the rotor 510 may be located outside the stator 505, where the rotor 510 is upside down, and the first rotor pole 512, the second rotor pole 514, the third rotor pole 516, the fourth rotor pole 518, the fifth rotor pole 522 and the sixth rotor pole 524 are looking down on the stator 505.

In this embodiment, each of the first to sixth rotor poles, 512 to 524, comprise permanent magnets located on the surface of the rotor poles. In this embodiment, the permanent magnet is one or more straight-shape magnets. In some cases, each rotor pole comprises only one straight-shape magnet. In some other cases, each rotor pole comprises more than one straight-shape magnets. In the illustrated embodiments, each rotor pole comprises k straight-shape magnets, where k is any integer greater than or equal to 1.

As illustrated, rotor pole 512 comprises k straight-shape magnets 582, rotor pole 514 comprises k straight-shape magnets 584, rotor pole 516 comprises k straight-shape magnets 586, rotor pole 518 comprises k straight-shape magnets 588, rotor pole 522 comprises k straight-shape magnets 590 and rotor pole 524 comprises k straight-shape magnets 592.

The straight-shape magnets 582 to 592 located on each rotor pole 512 to 524 of the switched reluctance machine 500 are configured such that adjacent rotor pole pairs have straight-shape magnets with opposite orientation and polarity to each other. In this embodiment, straight-shape magnet 582 of rotor pole 512, straight-shape magnet 586 of rotor pole 516, straight-shape magnet 590 of rotor pole 522 have the same orientation and polarity as each other.

Straight-shape magnet 584 of rotor pole 514, straight-shape magnet 588 of rotor pole 518 and straight-shape magnet 592 of rotor pole 524 have the same orientation and polarity as each other, but different than the orientation and polarity of straight-shape magnets 582, 586 and 590.

Switched reluctance machine 500 has a plurality of adjustable parameters associated with the straight-shape magnets located on each rotor pole, which can be adjusted based on the application of the switched reluctance machine 500. Depending on machine ratings suitable for the type of application for the switched reluctance machine 500, the adjustable parameters may be adjusted to match desired performance characteristics, size and cost of the switched reluctance machine 500.

Adjustable parameters in switched reluctance machine 500 include a plurality of parameters, such as, for example, outer length of straight-shape permanent magnets $L_{51}$ 515, inner length of straight-shape permanent magnets $L_{52}$ 520, distance between each straight-shape permanent magnet on the rotor pole $L_{53}$ 525, width of straight permanent magnets $W_5$ 530, etc.

Adjustable parameters in switched reluctance machine 500 may also include distance of outer length of straight-shape permanent magnets from the closest side of the rotor pole $d_{51}$ 535, perpendicular distance between the outer edge of outer length of a straight-shape permanent magnet from the outer edge of the inner length of the straight-shape permanent magnet $d_{52}$ 540, etc.

Adjustable parameters in switched reluctance machine 500 may also include right side extension angle of straight-shape permanent magnet $\theta_{51}$ 545, left side extension angle of straight-shape permanent magnet $\theta_{52}$ 550, tilt angle of straight-shape permanent magnet towards the rotor pole surface $\theta_{53}$ 555, fillet radii of each corner of straight-shape permanent magnets $r_{51}$, $r_{52}$, $r_{53}$, $r_{54}$ 565, 570, 575 and 580, etc. Tilt angle indicates the angle at which the permanent magnet is tilted with respect to the rotor pole surface. For example, if the tilt angle is zero, straight-shape permanent magnet ends up parallel to the rotor pole surface.

Figure 6:
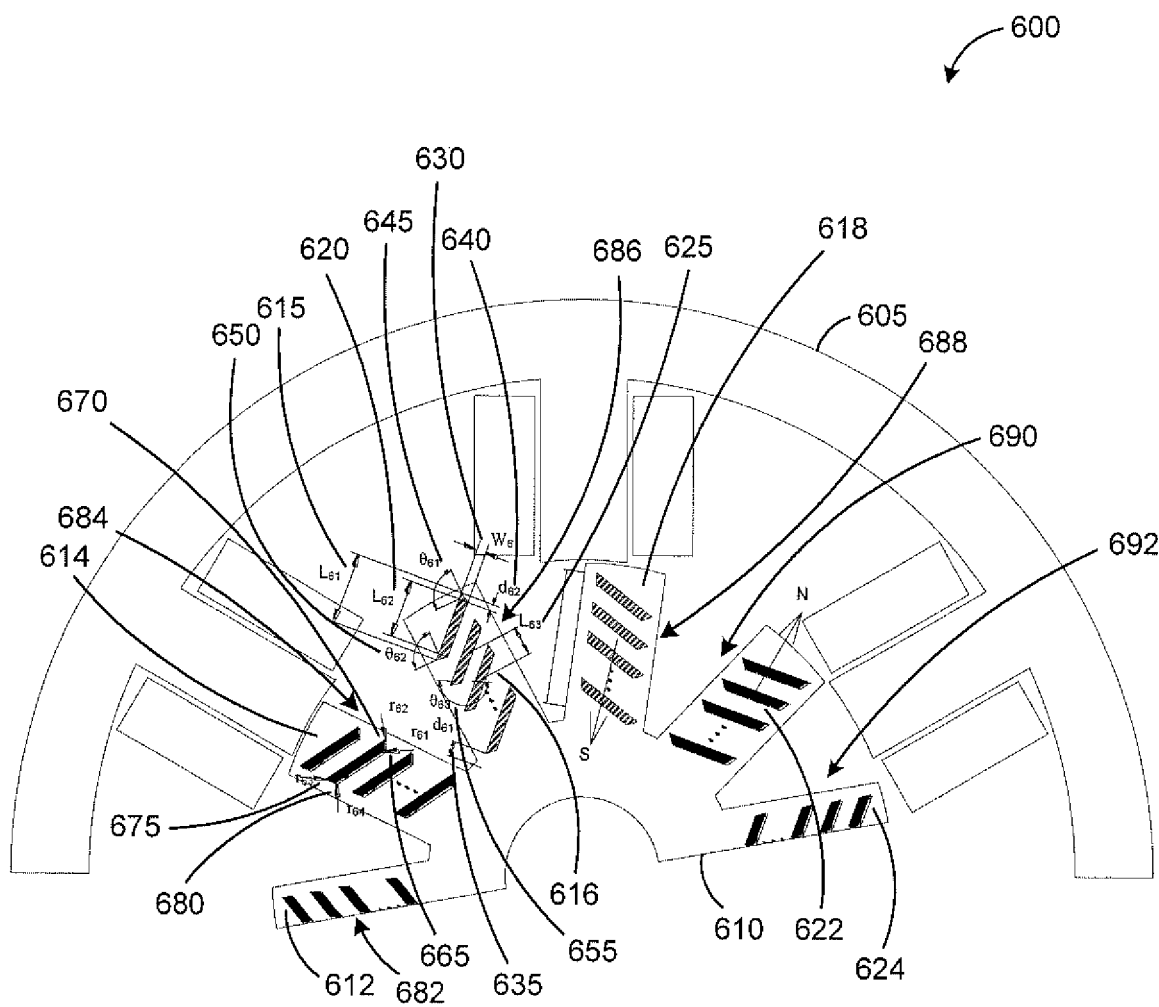
FIG. 6 is a cross-sectional view of the switched reluctance machine having straight-shape permanent magnets with same polarity on adjacent rotor pole pairs in accordance with another example embodiment.

Reference is first made to FIG. 6 illustrating a cross-sectional view of a switched reluctance machine 600 having straight-shape permanent magnets with same polarity on adjacent rotor pole pairs in accordance with an example embodiment.

The switched reluctance machine 600 of FIG. 6 consists of a stator 605, a rotor 610 located inside the stator 605, a first rotor pole 612, a second rotor pole 614, a third rotor pole 616, a fourth rotor pole 618, a fifth rotor pole 622 and a sixth rotor pole 624.

As illustrated in FIG. 6, rotor 610 is located inside stator 605. As mentioned above, the rotor 610 may be located outside the stator 605, where the rotor 610 is upside down. In such cases, the first rotor pole 612, the second rotor pole 614, the third rotor pole 616, the fourth rotor pole 618, the fifth rotor pole 622 and the sixth rotor pole 624 are looking down on the stator 605.

In this embodiment, each of the first to sixth rotor poles, 612 to 624, comprise permanent magnets located on the surface of the rotor poles. In this embodiment, the permanent magnet is one or more straight-shape magnets. In some cases, each rotor pole comprises only one straight-shape magnet. In some other cases, each rotor pole comprises more than one straight-shape magnets. In the illustrated embodiments, each rotor pole comprises k straight-shape magnets, where k is any integer greater than or equal to 1.

As illustrated, rotor pole 612 comprises k straight-shape magnets 682, rotor pole 614 comprises k straight-shape magnets 684, rotor pole 616 comprises k straight-shape magnets 686, rotor pole 618 comprises k straight-shape magnets 688, rotor pole 622 comprises k straight-shape magnets 690 and rotor pole 624 comprises k straight-shape magnets 692.

The straight-shape magnets 682 to 692 located on each rotor pole 612 to 624 of the switched reluctance machine 600 are configured such that adjacent rotor pole pairs have straight-shape magnets with same orientation and polarity to each other. In this embodiment, straight-shape permanent magnet 682 of rotor pole 612 and straight-shape permanent magnet 684 of rotor pole 614, and straight-shape magnet 690 of rotor pole 622 and straight-shape permanent magnet 692 of rotor pole 624 have the same orientation and polarity as each other.

Straight-shape permanent magnet 686 of rotor pole 616, straight-shape magnet 688 of rotor pole 618 have the same orientation and polarity as each other, but different than the orientation and polarity of straight-shape permanent magnets 682, 684, 690 and 692.

Switched reluctance machine 600 has a plurality of adjustable parameters associated with the straight-shape magnets located on each rotor pole, which can be adjusted based on the application of the switched reluctance machine 600. Depending on machine ratings suitable for the type of application for the switched reluctance machine 600, the adjustable parameters may be adjusted to match desired performance characteristics, size and cost of the switched reluctance machine 600.

Adjustable parameters in switched reluctance machine 600 may include outer length of straight-shape permanent magnets $L_{61}$ 615, inner length of straight-shape permanent magnets $L_{62}$ 620, distance between each straight-shape permanent magnet on the rotor pole $L_{63}$ 625, width of straight permanent magnets $W_6$ 630, distance of outer length of straight-shape permanent magnets from the closest side of the rotor pole $d_{61}$ 635, perpendicular distance between the outer edge of outer length of a straight-shape permanent magnet from the outer edge of the inner length of the straight-shape permanent magnet $d_{62}$ 640, right side extension angle of straight-shape permanent magnet $\theta_{61}$ 645, etc.

Adjustable parameters in switched reluctance machine 600 may further include left side extension angle of straight-shape permanent magnet $\theta_{62}$ 650, tilt angle of straight-shape permanent magnet towards the rotor pole surface $\theta_{63}$ 655, fillet radii of each corner of straight-shape permanent magnets $r_{61}$, $r_{62}$, $r_{63}$, $r_{64}$ 665, 670, 675 and 680, etc.

Figure 7:
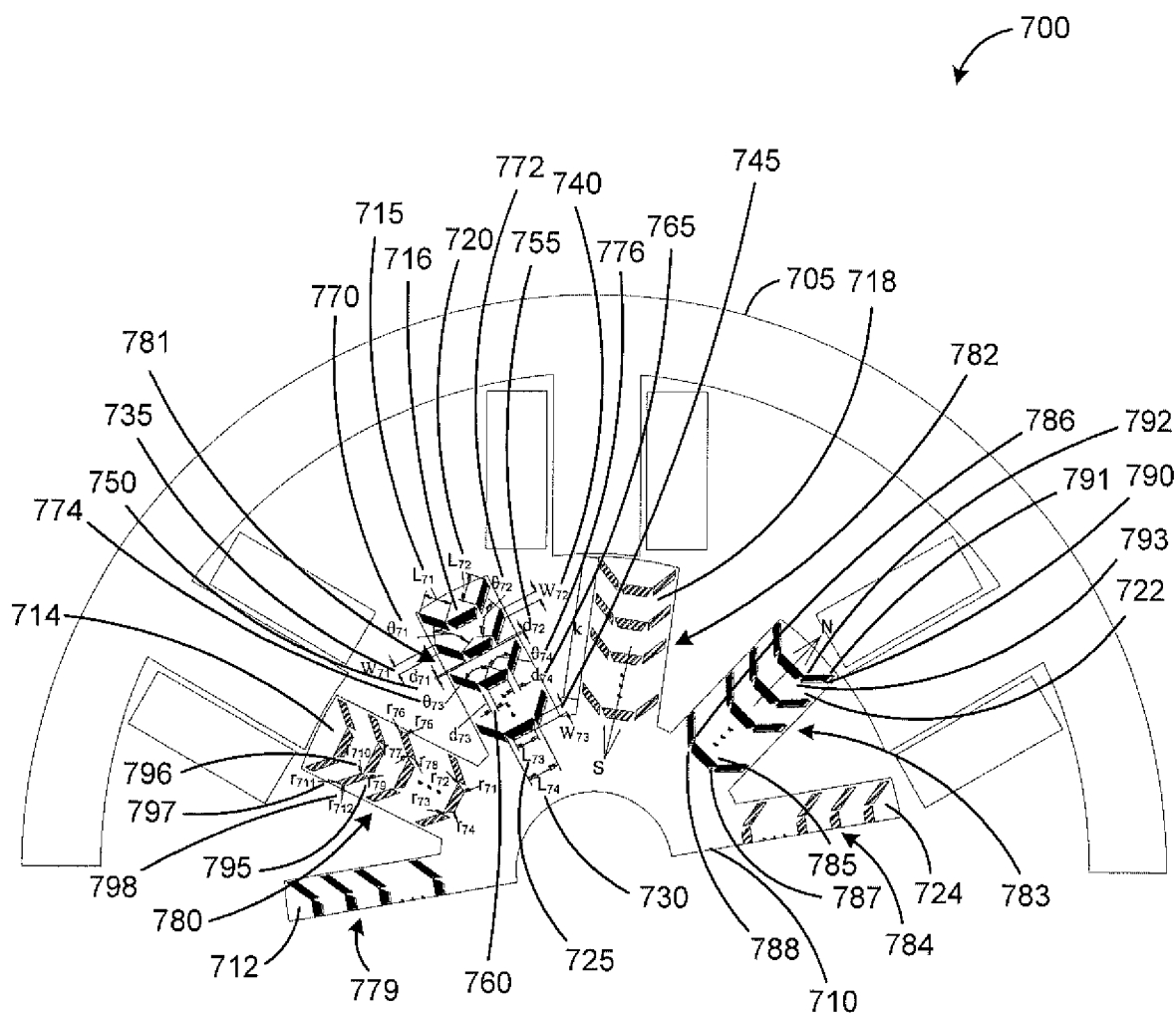
FIG. 7 is a cross-sectional view of a switched reluctance machine having U-shape permanent magnets with opposite polarity on adjacent rotor pole pairs in accordance with an example embodiment.

Reference is first made to FIG. 7 illustrating a cross-sectional view of a switched reluctance machine 700 having U-shape permanent magnets with opposite polarity on adjacent rotor pole pairs in accordance with an example embodiment.

The switched reluctance machine 700 of FIG. 7 consists of a stator 705, a rotor 710 located inside the stator 705, a first rotor pole 712, a second rotor pole 714, a third rotor pole 716, a fourth rotor pole 718, a fifth rotor pole 722 and a sixth rotor pole 724.

As illustrated in FIG. 7, rotor 710 is located inside stator 705. As mentioned above, the rotor 710 may be located outside the stator 705, where the rotor 710 is upside down, and the first rotor pole 712, the second rotor pole 714, the third rotor pole 716, the fourth rotor pole 718, the fifth rotor pole 722 and the sixth rotor pole 724 are looking down on the stator 705.

In this embodiment, each of the first to sixth rotor poles, 712 to 724, comprise permanent magnets located on the surface of the rotor poles. In this embodiment, the permanent magnet is one or more U-shape permanent magnets. A U-shaped permanent magnet comprises three sub-magnets, where two of the three magnets are side magnets and the remaining magnet is a base magnet. The three sub-magnets are arranged in the form of the letter 'U', where the base magnet forms the base of the letter 'U' and side magnets form the left and the right sides of the letter 'U'.

In various embodiments disclosed herein, extra reluctance component may be achieved by using the space occupied by the side magnets, and/or the base magnet of a permanent magnet as an air barrier. Permanent magnets having a side and a base magnet, such as, for example, U-shape permanent magnet, inverse U-shape permanent magnet, tilted U-shape permanent magnet, tilted inverse U-shape permanent magnet, and the like, may be installed on the rotor poles without a base, and/or one or both of the left and right side magnets to enhance the reluctance component in the switched reluctance machine. In such embodiments, the empty space, which would otherwise have been occupied by the base and/or one or both side magnets is preserved by not installing any other magnet or component in that space.

In some cases, each rotor pole comprises only one U-shape permanent magnet. In some other cases, each rotor pole comprises more than one U-shape permanent magnets.

In the illustrated embodiments, each rotor pole comprises k U-shape permanent magnets, where k is any integer greater than or equal to 1.

As illustrated, rotor pole 712 comprises k U-shape permanent magnets 779, rotor pole 714 comprises k U-shape permanent magnets 780, rotor pole 716 comprises k U-shape permanent magnets 781, rotor pole 718 comprises k U-shape permanent magnets 782, rotor pole 722 comprises k U-shape permanent magnets 783 and rotor pole 724 comprises k U-shape permanent magnets 684.

The U-shape permanent magnets 779 to 784 located on each rotor pole 712 to 724 of the switched reluctance machine 700 are configured such that adjacent rotor pole pairs have U-shape permanent magnets with opposite orientation and polarity to each other. In this embodiment, U-shape permanent magnet 779 of rotor pole 712, U-shape permanent magnet 781 of rotor pole 716, and U-shape permanent magnet 783 of rotor pole 722 have the same orientation and polarity as each other.

U-shape permanent magnet 780 of rotor pole 714, U-shape permanent magnet 782 of rotor pole 718 and U-shape permanent magnet 784 of rotor pole 724 have the same orientation and polarity as each other, but different than the orientation and polarity of U-shape permanent magnets 779, 781 and 783.

Switched reluctance machine 700 has a plurality of adjustable parameters associated with the U-shape permanent magnets located on each rotor pole, which can be adjusted based on the application of the switched reluctance machine 700. Depending on machine ratings suitable for the type of application for the switched reluctance machine 700, the adjustable parameters may be adjusted to match desired performance characteristics, size and cost of the switched reluctance machine 700.

Adjustable parameters in switched reluctance machine 700 may include length of the left side magnet of a U-shape permanent magnet $L_{71}$ 715, length of the right side magnet of a U-shape permanent magnet $L_{72}$ 720, inner length of the base magnet of the U-shape permanent magnet $L_{73}$ 725, outer length of the base magnet of the U-shape permanent magnet $L_{74}$ 730, width of the left side magnet of the U-shape permanent magnet $W_{71}$ 735, width of the right side magnet of the U-shape permanent magnet $W_{72}$ 740, width of the base magnet of the U-shape permanent magnet $W_{73}$ 745, etc.

Adjustable parameters in switched reluctance machine 700 may further include parameters such as, for example, vertical distance of the lowermost tip of the left side magnet from the base magnet of the U-shape permanent magnet $d_{71}$ 750, vertical distance of the lowermost tip of the right side magnet from the base magnet of the U-shape permanent magnet $d_{72}$ 755, horizontal distance of the left side magnet from the base magnet of the U-shape permanent magnet $d_{73}$ 760, horizontal distance of the left side magnet from the base magnet of the U-shape permanent magnet $d_{74}$ 765, etc.

Adjustable parameters in switched reluctance machine 700 may also include parameters such as, for example, position angle of left side magnet towards to the base magnet of the U-shape permanent magnet $\theta_{71}$ 770, position angle of right side magnet towards to the base magnet of the U-shape permanent magnet $\theta_{72}$ 772, left side extension angle of the base magnet of the U-shape permanent magnet $\theta_{73}$ 774, right side extension angle of the base magnet of the U-shape permanent magnet $\theta_{74}$ 776, etc. Position angles of side magnets indicate the angles by which the side magnets are offset from the base magnet. For example, in case of a zero position angle of left side magnet, the left side magnet is perpendicular to the base magnet. Similarly, in case of a zero position angle of right side magnet, the right side magnet is perpendicular to the base magnet.

Adjustable parameters in switched reluctance machine 700 may also include parameters, such as, for example, fillet radii of each corner of base magnet of the U-shape permanent magnets $r_{71}$, $r_{72}$, $r_{73}$, $r_{74}$ 785, 786, 787 and 788, fillet radii of each corner of right side magnet of the U-shape permanent magnet $r_{75}$, $r_{76}$, $r_{77}$, $r_{78}$ 790, 791, 792, 793, and fillet radii of each corner of left side magnet of the U-shape permanent magnet $r_{79}$, $r_{710}$, $r_{711}$, $r_{712}$ 795, 796, 797 and 798, etc.

Figure 8:
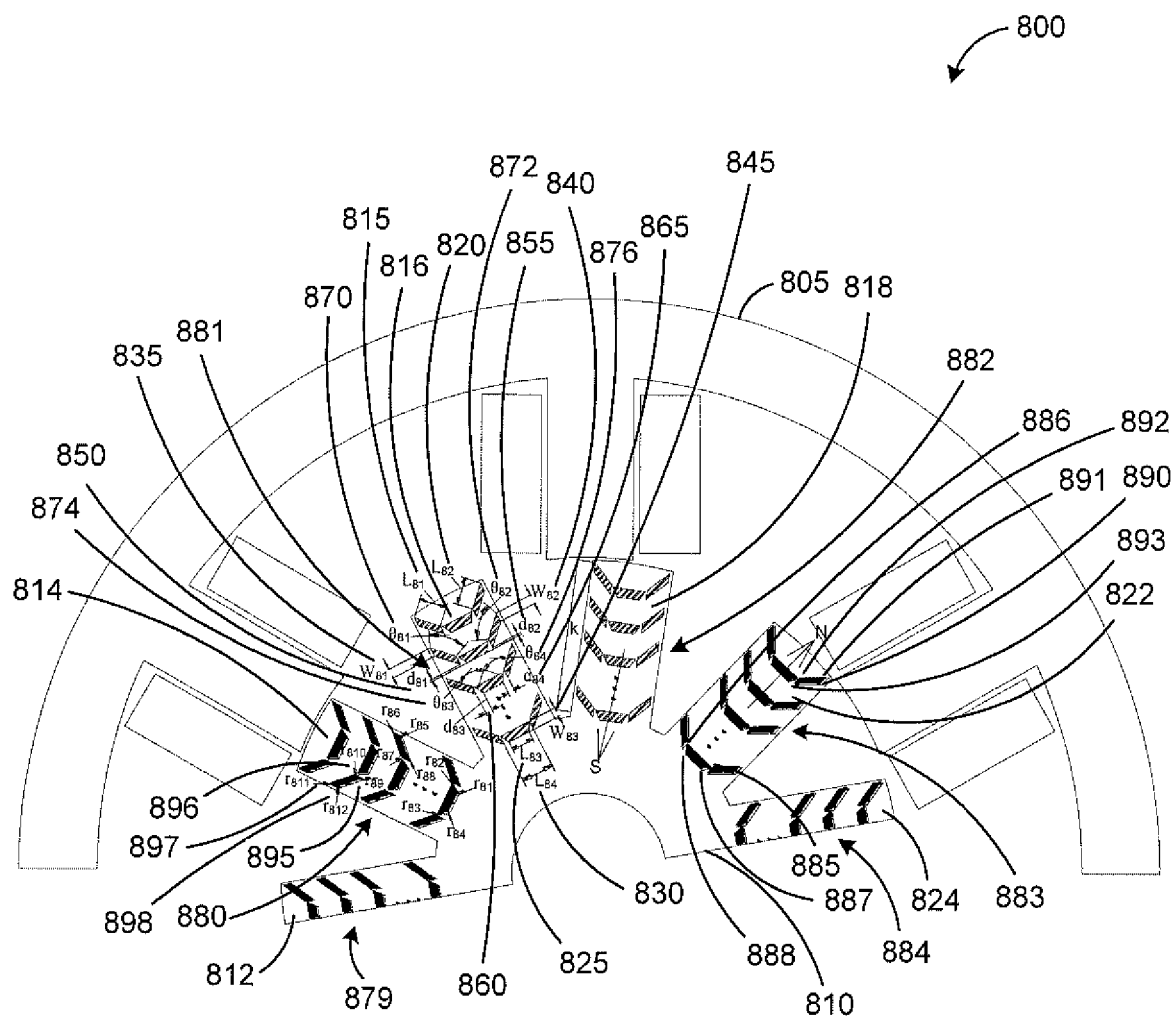
FIG. 8 is a cross-sectional view of a switched reluctance machine having U-shape permanent magnets with same polarity on adjacent rotor pole pairs in accordance with another example embodiment.

Reference is first made to FIG. 8 illustrating a cross-sectional view of a switched reluctance machine 800 having U-shape permanent magnets with same polarity on adjacent rotor pole pairs in accordance with an example embodiment.

The switched reluctance machine 800 of FIG. 8 consists of a stator 805, a rotor 810 located inside the stator 805, a first rotor pole 812, a second rotor pole 814, a third rotor pole 816, a fourth rotor pole 818, a fifth rotor pole 822 and a sixth rotor pole 824.

As illustrated in FIG. 8, rotor 810 is located inside stator 805. As mentioned above, the rotor 810 may be located outside the stator 805, where the rotor 810 is upside down, and the first rotor pole 812, the second rotor pole 814, the third rotor pole 816, the fourth rotor pole 818, the fifth rotor pole 822 and the sixth rotor pole 824 are looking down on the stator 805.

In this embodiment, each of the first to sixth rotor poles, 812 to 824, comprise permanent magnets located on the surface of the rotor poles. In this embodiment, the permanent magnet is one or more U-shape permanent magnets. A U-shaped permanent magnet comprises three sub-magnets, where two of the three magnets are side magnets and the remaining magnet is a base magnet. The three sub-magnets are arranged in the form of the letter 'U', where the base magnet forms the base of the letter 'U' and side magnets form the left and the right sides of the letter 'U'.

In some cases, each rotor pole comprises only one U-shape permanent magnet. In some other cases, each rotor pole comprises more than one U-shape permanent magnets. In the illustrated embodiments, each rotor pole comprises k U-shape permanent magnets, where k is any integer greater than or equal to 1.

As illustrated, rotor pole 812 comprises k U-shape permanent magnets 879, rotor pole 814 comprises k U-shape permanent magnets 880, rotor pole 816 comprises k U-shape permanent magnets 881, rotor pole 818 comprises k U-shape permanent magnets 882, rotor pole 822 comprises k U-shape permanent magnets 883 and rotor pole 824 comprises k U-shape permanent magnets 884.

The U-shape permanent magnets 879 to 884 located on each rotor pole 812 to 824 of the switched reluctance machine 800 are configured such that adjacent permanent rotor pole pairs have U-shape permanent magnets with same orientation and polarity to each other. In this embodiment, U-shape permanent magnet 879 of rotor pole 812 and U-shape permanent magnet 880 of rotor pole 814, and U-shape permanent magnet 883 of rotor pole 822 and U-shape permanent magnet 884 of rotor pole 824 have the same orientation and polarity as each other.

U-shape permanent magnet 881 of rotor pole 816 and U-shape permanent magnet 882 of rotor pole 818 have the same orientation and polarity as each other, but different than the orientation and polarity of U-shape permanent magnets 879, 880, 883 and 884.

Switched reluctance machine 800 has a plurality of adjustable parameters associated with the U-shape permanent magnets located on each rotor pole, which can be adjusted based on the application of the switched reluctance machine 800. Depending on machine ratings suitable for the type of application for the switched reluctance machine 800, the adjustable parameters may be adjusted to match desired performance characteristics, size and cost of the switched reluctance machine 800.

Adjustable parameters in switched reluctance machine 800 may include parameters, such as, for example, length of the left side magnet of a U-shape permanent magnet $L_{81}$ 815, length of the right side magnet of a U-shape permanent magnet $L_{82}$ 820, inner length of the base magnet of the U-shape permanent magnet $L_{83}$ 825, outer length of the base magnet of the U-shape permanent magnet $L_{84}$ 830, width of the left side magnet of the U-shape permanent magnet $W_{81}$ 835, width of the right side magnet of the U-shape permanent magnet $W_{82}$ 840, width of the base magnet of the U-shape permanent magnet $W_{83}$ 845, etc.

Adjustable parameters in switched reluctance machine 800 may further include parameters, such as, for example, vertical distance of the lowermost tip of the left side magnet from the base magnet of the U-shape permanent magnet $d_{81}$ 850, vertical distance of the lowermost tip of the right side magnet from the base magnet of the U-shape permanent magnet $d_{82}$ 855, horizontal distance of the left side magnet from the base magnet of the U-shape permanent magnet $d_{83}$ 860, horizontal distance of the left side magnet from the base magnet of the U-shape permanent magnet $d_{84}$ 865, etc.

Adjustable parameters in switched reluctance machine 800 may also include parameters, such as, for example, position angle of left side magnet towards to the base magnet of the U-shape permanent magnet $\theta_{81}$ 870, position angle of right side magnet towards to the base magnet of the U-shape permanent magnet $\theta_{82}$ 872, left side extension angle of the base magnet of the U-shape permanent magnet $\theta_{83}$ 874, right side extension angle of the base magnet of the U-shape permanent magnet $\theta_{84}$ 876, fillet radii of each corner of base magnet of the U-shape permanent magnets $r_{81}$, $r_{82}$, $r_{83}$, $r_{84}$ 885, 886, 887 and 888, fillet radii of each corner of right side magnet of the U-shape permanent magnet $r_{85}$, $r_{86}$, $r_{87}$, $r_{88}$ 890, 891, 892, 893, fillet radii of each corner of left side magnet of the U-shape permanent magnet $r_{89}$, $r_{810}$, $r_{811}$, $r_{812}$ 895, 896, 897 and 898, etc.

Figure 9:
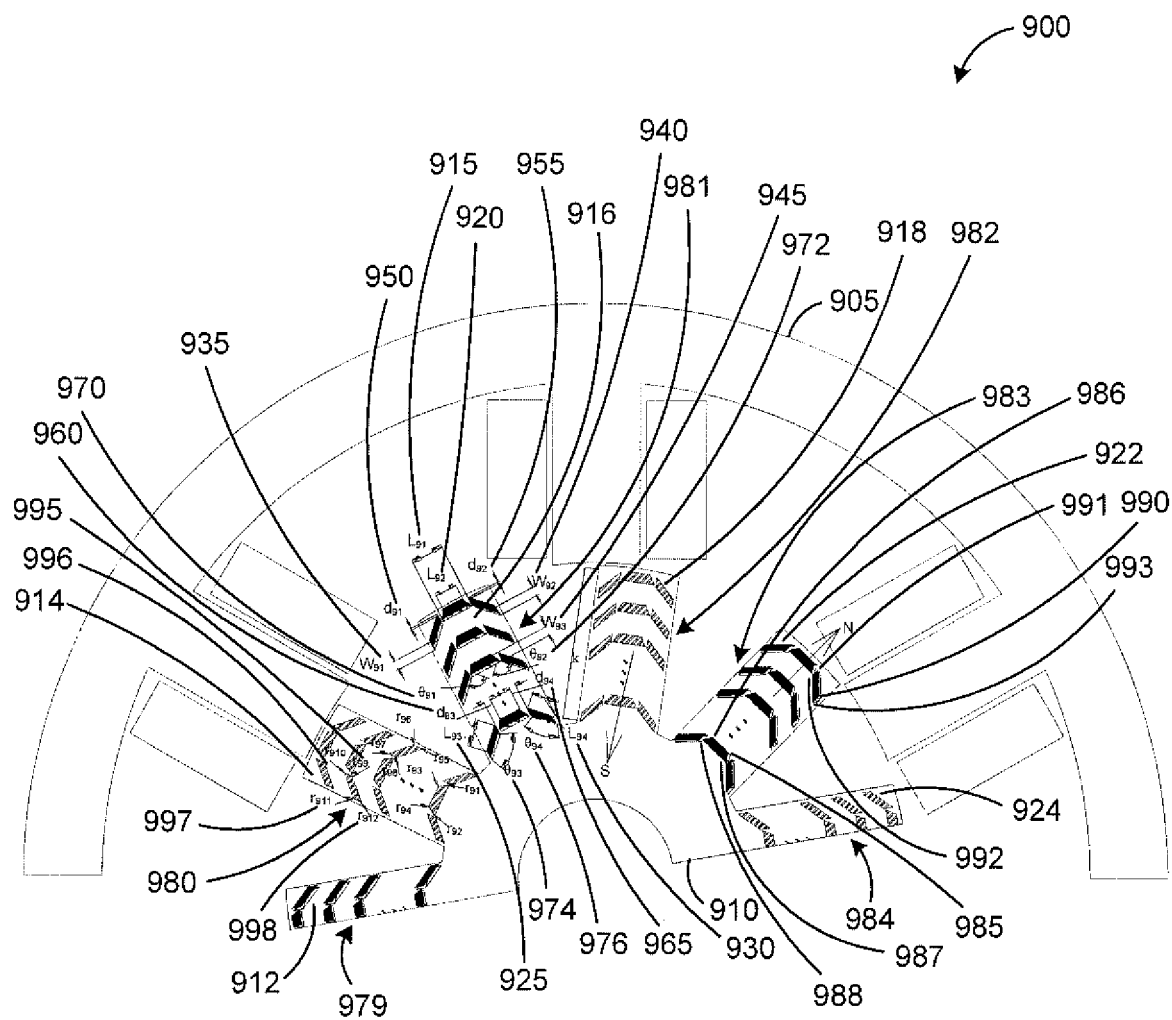
FIG. 9 is a cross-sectional view of a switched reluctance machine having inverse U-shape permanent magnets with opposite polarity on adjacent rotor pole pairs in accordance with an example embodiment.

Reference is first made to FIG. 9 illustrating a cross-sectional view of a switched reluctance machine 900 having inverse U-shape permanent magnets with opposite polarity on adjacent rotor pole pairs in accordance with an example embodiment.

The switched reluctance machine 900 of FIG. 9 consists of a stator 905, a rotor 910 located inside the stator 905, a first rotor pole 912, a second rotor pole 914, a third rotor pole 916, a fourth rotor pole 918, a fifth rotor pole 922 and a sixth rotor pole 924.

As illustrated in FIG. 9, rotor 910 is located inside stator 905. In some other cases, rotor 910 may be located outside the stator 905, where the rotor 910 is upside down, and the first rotor pole 912, the second rotor pole 914, the third rotor pole 916, the fourth rotor pole 918, the fifth rotor pole 922 and the sixth rotor pole 924 are looking down on the stator 905.

In this embodiment, each of the first to sixth rotor poles, 912 to 924, comprise permanent magnets located on the surface of the rotor poles. In this embodiment, the permanent magnet is one or more inverse U-shape permanent magnets. An inverse U-shaped permanent magnet comprises three sub-magnets, where two of the three magnets are side magnets and the third magnet is a base magnet. The three sub-magnets are arranged in the form of an inverse letter 'U', where the base magnet forms the base of the letter 'U' and side magnets form the left and the right sides of the letter 'U'.

In some cases, each rotor pole comprises only one inverse U-shape permanent magnet. In some other cases, each rotor pole comprises more than one inverse U-shape permanent magnets. In the illustrated embodiments, each rotor pole comprises k inverse U-shape permanent magnets, where k is any integer greater than or equal to 1.

As illustrated, rotor pole 912 comprises k inverse U-shape permanent magnets 979, rotor pole 914 comprises k inverse U-shape permanent magnets 980, rotor pole 916 comprises k inverse U-shape permanent magnets 981, rotor pole 918 comprises k inverse U-shape permanent magnets 982, rotor pole 922 comprises k inverse U-shape permanent magnets 983 and rotor pole 924 comprises k inverse U-shape permanent magnets 984.

The inverse U-shape permanent magnets 979 to 984 located on each rotor pole 912 to 924 of the switched reluctance machine 900 are configured such that adjacent rotor pole pairs have inverse U-shape permanent magnets with opposite orientation and polarity to each other. In this embodiment, inverse U-shape permanent magnet 979 of rotor pole 912, inverse U-shape permanent magnet 981 of rotor pole 916, and inverse U-shape permanent magnet 983 of rotor pole 922 have the same orientation and polarity as each other.

Inverse U-shape permanent magnet 980 of rotor pole 914, inverse U-shape permanent magnet 982 of rotor pole 918 and inverse U-shape permanent magnet 984 of rotor pole 924 have the same orientation and polarity as each other, but different than the orientation and polarity of inverse U-shape permanent magnets 979, 981 and 983.

Switched reluctance machine 900 has a plurality of adjustable parameters associated with the inverse U-shape permanent magnets located on each rotor pole, which can be adjusted based on the application of the switched reluctance machine 900. Depending on machine ratings suitable for the type of application for the switched reluctance machine 900, the adjustable parameters may be adjusted to match desired performance characteristics, size and cost of the switched reluctance machine 900.

Adjustable parameters in switched reluctance machine 900 include parameters, such as, for example, outer length of the base magnet of the inverse U-shape permanent magnet $L_{91}$ 915, inner length of the base magnet of the inverse U-shape permanent magnet $L_{92}$ 920, length of the left side magnet of the inverse U-shape permanent magnet $L_{93}$ 925, length of the left side magnet of the inverse U-shape permanent magnet $L_{94}$ 930, width of the left side magnet of the inverse U-shape permanent magnet $W_{91}$ 935, width of the right side magnet of the inverse U-shape permanent magnet $W_{92}$ 940, width of the base magnet of the inverse U-shape permanent magnet $W_{93}$ 945, etc.

Adjustable parameters in switched reluctance machine 900 may further include parameters, such as, for example, vertical distance of the topmost tip of the left side magnet from the inner length tip of the base magnet of the inverse U-shape permanent magnet $d_{91}$ 950, vertical distance of the topmost tip of the right side magnet from the inner length tip of the base magnet of the inverse U-shape permanent magnet $d_{92}$ 955, horizontal distance between the left side magnet from the base magnet of the inverse U-shape permanent magnet $d_{93}$ 960, horizontal distance of the right side magnet from the base magnet of the inverse U-shape permanent magnet $d_{94}$ 965, etc.

Adjustable parameters in switched reluctance machine 900 may also include parameters, such as, for example, position angle of left side magnet towards to the base magnet of the inverse U-shape permanent magnet $\theta_{93}$ 974, position angle of right side magnet towards to the base magnet of the inverse U-shape permanent magnet $\theta_{94}$ 976, left side extension angle of the base magnet of the inverse U-shape permanent magnet $\theta_{91}$ 970, right side extension angle of the base magnet of the inverse U-shape permanent magnet $\theta_{92}$ 972, fillet radii of each corner of base magnet of the inverse U-shape permanent magnets $r_{91}$, $r_{92}$, $r_{93}$, $r_{94}$ 985, 986, 987 and 988, fillet radii of each corner of right side magnet of the inverse U-shape permanent magnet $r_{95}$, $r_{96}$, $r_{97}$, $r_{98}$ 990, 991, 992, 993, fillet radii of each corner of left side magnet of the inverse U-shape permanent magnet $r_{99}$, $r_{910}$, $r_{911}$, $r_{912}$ 995, 996, 997 and 998, etc.

Figure 10:
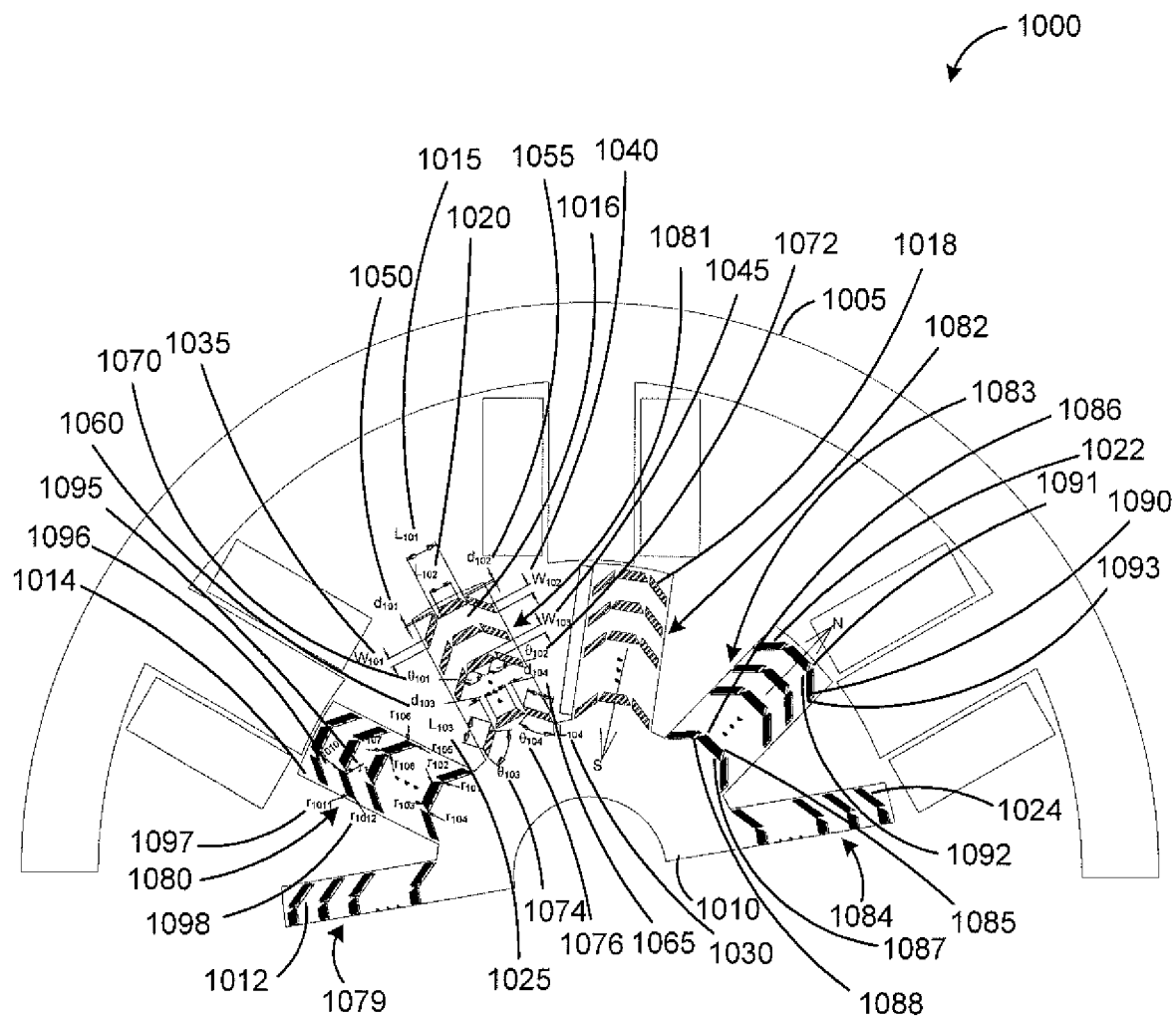
FIG. 10 is a cross-sectional view of a switched reluctance machine having inverse U-shape permanent magnets with same polarity on adjacent rotor pole pairs in accordance with another example embodiment.

Reference is first made to FIG. 10 illustrating a cross-sectional view of a switched reluctance machine 1000 having inverse U-shape permanent magnets with same polarity on adjacent rotor pole pairs in accordance with an example embodiment.

The switched reluctance machine 1000 of FIG. 10 consists of a stator 1005, a rotor 1010 located inside the stator 1005, a first rotor pole 1012, a second rotor pole 1014, a third rotor pole 1016, a fourth rotor pole 1018, a fifth rotor pole 1022 and a sixth rotor pole 1024.

As illustrated in FIG. 10, rotor 1010 is located inside stator 1005. In some other cases, rotor 1010 may be located outside the stator 1005, where the rotor 1010 is upside down, and the first rotor pole 1012, the second rotor pole 1014, the third rotor pole 1016, the fourth rotor pole 1018, the fifth rotor pole 1022 and the sixth rotor pole 1024 are looking down on the stator 1005.

In this embodiment, each of the first to sixth rotor poles, 1012 to 1024, comprise permanent magnets located on the surface of the rotor poles. In this embodiment, the permanent magnet is one or more inverse U-shape permanent magnets. An inverse U-shaped permanent magnet comprises three sub-magnets, where two of the three magnets are side magnets and the third magnet is a base magnet. The three sub-magnets are arranged in the form of an inverse letter 'U', where the base magnet forms the base of the letter 'U' and side magnets form the left and the right sides of the letter 'U'.

In some cases, each rotor pole comprises only one inverse U-shape permanent magnet. In some other cases, each rotor pole comprises more than one inverse U-shape permanent magnets. In the illustrated embodiments, each rotor pole comprises k inverse U-shape permanent magnets, where k is any integer greater than or equal to 1.

As illustrated, rotor pole 1012 comprises k inverse U-shape permanent magnets 1079, rotor pole 1014 comprises k inverse U-shape permanent magnets 1080, rotor pole 1016 comprises k inverse U-shape permanent magnets 1081, rotor pole 1018 comprises k inverse U-shape permanent magnets 1082, rotor pole 1022 comprises k inverse U-shape permanent magnets 1083 and rotor pole 1024 comprises k inverse U-shape permanent magnets 1084.

The inverse U-shape permanent magnets 1079 to 1084 located on each rotor pole 1012 to 1024 of the switched reluctance machine 1000 are configured such that adjacent permanent rotor pole pairs have inverse U-shape permanent magnets with same orientation and polarity to each other. In this embodiment, inverse U-shape permanent magnet 1079 of rotor pole 1012 and U-shape permanent magnet 1080 of rotor pole 1014, and inverse U-shape permanent magnet 1083 of rotor pole 1022 and inverse U-shape permanent magnet 1084 of rotor pole 1024 have the same orientation and polarity as each other.

Inverse U-shape permanent magnet 1081 of rotor pole 1016 and inverse U-shape permanent magnet 1082 of rotor pole 1018 have the same orientation and polarity as each other, but different than the orientation and polarity of inverse U-shape permanent magnets 1079, 1080, 1083 and 1084.

Switched reluctance machine 1000 has a plurality of adjustable parameters associated with the inverse U-shape permanent magnets located on each rotor pole, which can be adjusted based on the application of the switched reluctance machine 1000. Depending on machine ratings suitable for the type of application for the switched reluctance machine 1000, the adjustable parameters may be adjusted to match desired performance characteristics, size and cost of the switched reluctance machine 1000.

Adjustable parameters in switched reluctance machine 1000 include parameters, such as, for example, outer length of the base magnet of the inverse U-shape permanent magnet $L_{101}$ 1015, inner length of the base magnet of the inverse U-shape permanent magnet $L_{102}$ 1020, length of the left side magnet of the inverse U-shape permanent magnet $L_{103}$ 1025, length of the left side magnet of the inverse U-shape permanent magnet $L_{104}$ 1030, width of the left side magnet of the inverse U-shape permanent magnet $W_{101}$ 1035, width of the right side magnet of the inverse U-shape permanent magnet $W_{102}$ 1040, width of the base magnet of the inverse U-shape permanent magnet $W_{103}$ 1045, etc.

Adjustable parameters in switched reluctance machine 1000 may further include parameters, such as, for example, vertical distance of the topmost tip of the left side magnet from the inner length tip of the base magnet of the inverse U-shape permanent magnet $d_{101}$ 1050, vertical distance of the topmost tip of the right side magnet from the inner length tip of the base magnet of the inverse U-shape permanent magnet $d_{102}$ 1055, horizontal distance between the left side magnet from the base magnet of the inverse U-shape permanent magnet $d_{103}$ 1060, horizontal distance of the right side magnet from the base magnet of the inverse U-shape permanent magnet $d_{104}$ 1065, etc.

Adjustable parameters in switched reluctance machine 1000 may also include parameters, such as, for example, position angle of left side magnet towards to the base magnet of the inverse U-shape permanent magnet $\theta_{103}$ 1074, position angle of right side magnet towards to the base magnet of the inverse U-shape permanent magnet $\theta_{104}$ 1076, left side extension angle of the base magnet of the inverse U-shape permanent magnet $\theta_{101}$ 1070, right side extension angle of the base magnet of the inverse U-shape permanent magnet $\theta_{102}$ 1072, fillet radii of each corner of base magnet of the inverse U-shape permanent magnets $r_{101}$, $r_{102}$, $r_{103}$, $r_{104}$ 1085, 1086, 1087 and 1088, fillet radii of each corner of right side magnet of the inverse U-shape permanent magnet $r_{105}$, $r_{106}$, $r_{107}$, $r_{108}$ 1090, 1091, 1092, 1093, fillet radii of each corner of left side magnet of the inverse U-shape permanent magnet $r_{109}$, $r_{1010}$, $r_{1011}$, $r_{1012}$ 1095, 1096, 1097 and 1098, etc.

Figure 11:
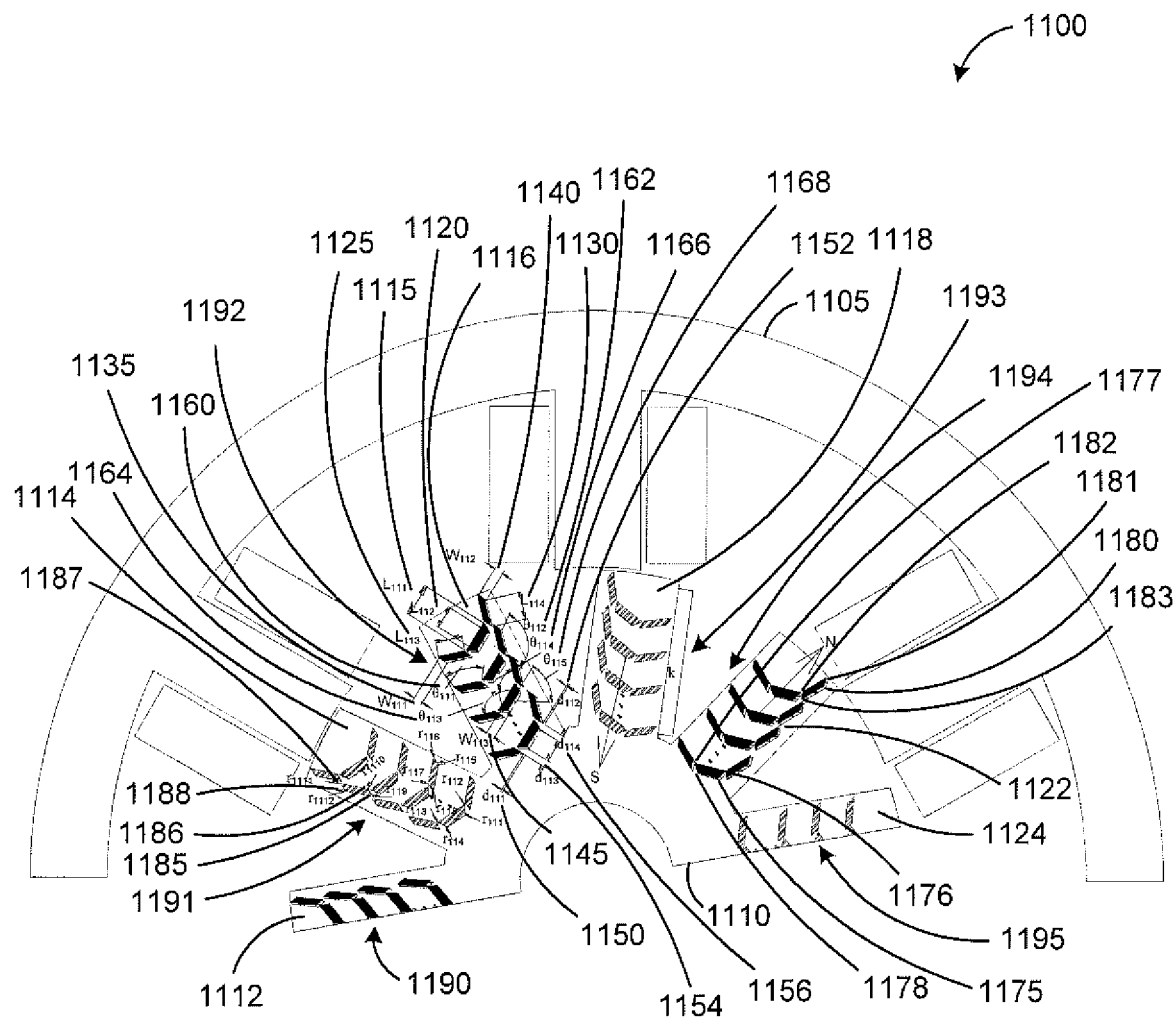
FIG. 11 is a cross-sectional view of a switched reluctance machine having tilted U-shape permanent magnets with opposite polarity on adjacent rotor pole pairs in accordance with an example embodiment.

Reference is first made to FIG. 11 illustrating a cross-sectional view of a switched reluctance machine 1100 having tilted U-shape permanent magnets with opposite polarity on adjacent rotor pole pairs in accordance with an example embodiment.

The switched reluctance machine 1100 of FIG. 11 consists of a stator 1105, a rotor 1110 located inside the stator 1105, a first rotor pole 1112, a second rotor pole 1114, a third rotor pole 1116, a fourth rotor pole 1118, a fifth rotor pole 1122 and a sixth rotor pole 1124. As illustrated in FIG. 11, rotor 1110 is located inside stator 1105.

In some other cases, rotor 1110 may be located outside the stator 1105, where the rotor 1110 is upside down, and the first rotor pole 1112, the second rotor pole 1114, the third rotor pole 1116, the fourth rotor pole 1118, the fifth rotor pole 1122 and the sixth rotor pole 1124 are looking down on the stator 1105.

In this embodiment, each of the first to sixth rotor poles, 1112 to 1124, comprise permanent magnets located on the surface of the rotor poles. In this embodiment, the permanent magnet is one or more tilted U-shape permanent magnets. A tilted U-shape permanent magnet is a U-shape magnet tilted at an angle. Accordingly, a tilted U-shape permanent magnet comprises three sub-magnets, where two of the three magnets are side magnets and the remaining magnet is a base magnet. The three sub-magnets are arranged in the form of the letter 'U' tilted at an angle, where the base magnet forms the base of the letter 'U' and side magnets form the left and the right sides of the letter 'U'.

In some cases, each rotor pole comprises only one tilted U-shape permanent magnet. In some other cases, each rotor pole comprises more than one tilted U-shape permanent magnets. In the illustrated embodiments, each rotor pole comprises k tilted U-shape permanent magnets, where k is any integer greater than or equal to 1.

As illustrated, rotor pole 1112 comprises k tilted U-shape permanent magnets 1190, rotor pole 1114 comprises k tilted U-shape permanent magnets 1191, rotor pole 1116 comprises k tilted U-shape permanent magnets 1192, rotor pole 1118 comprises k tilted U-shape permanent magnets 1193, rotor pole 1122 comprises k tilted U-shape permanent magnets 1194 and rotor pole 1124 comprises k tilted U-shape permanent magnets 1195.

The tilted U-shape permanent magnets 1190 to 1195 located on each rotor pole 1112 to 1124 of the switched reluctance machine 1100 are configured such that adjacent rotor pole pairs have tilted U-shape permanent magnets with opposite orientation and polarity to each other. In this embodiment, tilted U-shape permanent magnet 1190 of rotor pole 1112, tilted U-shape permanent magnet 1192 of rotor pole 1116, and tilted U-shape permanent magnet 1194 of rotor pole 1122 have the same orientation and polarity as each other.

Tilted U-shape permanent magnet 1191 of rotor pole 1114, tilted U-shape permanent magnet 1193 of rotor pole 1118 and tilted U-shape permanent magnet 1195 of rotor pole 1124 have the same orientation and polarity as each other, but different than the orientation and polarity of tilted U-shape permanent magnets 1190, 1192 and 1194.

Switched reluctance machine 1100 has a plurality of adjustable parameters associated with the tilted U-shape permanent magnets located on each rotor pole, which can be adjusted based on the application of the switched reluctance machine 1100. Depending on machine ratings suitable for the type of application for the switched reluctance machine 1100, the adjustable parameters may be adjusted to match desired performance characteristics, size and cost of the switched reluctance machine 1100.

Adjustable parameters in switched reluctance machine 1100 may include parameters, such as, for example, length of the left side magnet of a tilted U-shape permanent magnet $L_{113}$ 1125, length of the right side magnet of a tilted U-shape permanent magnet $L_{114}$ 1130, inner length of the base magnet of the tilted U-shape permanent magnet $L_{112}$ 1120, outer length of the base magnet of the tilted U-shape permanent magnet $L_{111}$ 1115, width of the left side magnet of the tilted U-shape permanent magnet $W_{111}$ 1135, width of the right side magnet of the tilted U-shape permanent magnet $W_{112}$ 1140, width of the base magnet of the tilted U-shape permanent magnet $W_{113}$ 1145, etc.

Adjustable parameters in switched reluctance machine 1100 may further include parameters, such as, for example, vertical distance of the lowermost tip of the left side magnet from the base magnet of the tilted U-shape permanent magnet $d_{111}$ 1150, vertical distance of the lowermost tip of the right side magnet from the base magnet of the tilted U-shape permanent magnet $d_{112}$ 1152, horizontal distance of the left side magnet from the base magnet of the tilted U-shape permanent magnet $d_{113}$ 1154, horizontal distance of the right side magnet from the base magnet of the tilted U-shape permanent magnet $d_{114}$ 1156, etc.

Adjustable parameters in switched reluctance machine 1100 may also include parameters, such as, for example, position angle of left side magnet towards to the base magnet of the tilted U-shape permanent magnet $\theta_{111}$ 1160, position angle of right side magnet towards to the base magnet of the tilted U-shape permanent magnet $\theta_{112}$ 1162, left side extension angle of the base magnet of the tilted U-shape permanent magnet $\theta_{113}$ 1164, right side extension angle of the base magnet of the tilted U-shape permanent magnet $\theta_{114}$ 1166, rotation angle of tilted U-shape permanent magnet towards the rotor pole surface $\theta_{115}$ 1168, fillet radii of each corner of base magnet of the tilted U-shape permanent magnets $r_{111}$, $r_{112}$, $r_{113}$, $r_{114}$ 1175, 1176, 1177, 1178, fillet radii of each corner of right side magnet of the tilted U-shape permanent magnet $r_{115}$, $r_{116}$, $r_{117}$, $r_{118}$ 1180, 1181, 1182, 1183, fillet radii of each corner of left side magnet of the tilted U-shape permanent magnet $r_{119}$, $r_{1110}$, $r_{1111}$, $r_{1112}$ 1185, 1186, 1187 and 1188, etc.

Figure 12:
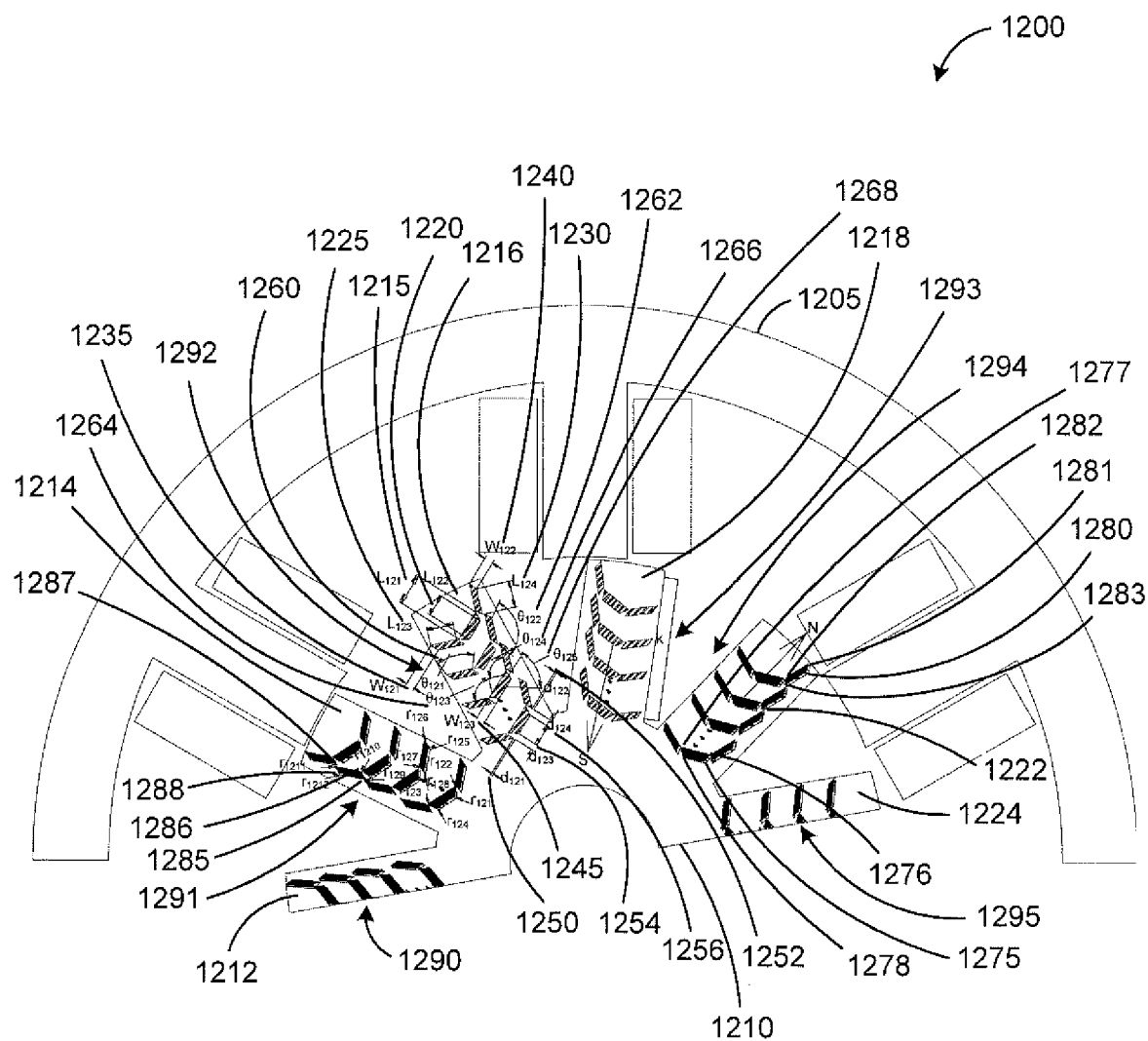
FIG. 12 is a cross-sectional view of a switched reluctance machine having tilted U-shape permanent magnets with same polarity on adjacent rotor pole pairs in accordance with another example embodiment.

Reference is next made to FIG. 12 illustrating a cross-sectional view of a switched reluctance machine 1200 having tilted U-shape permanent magnets with same polarity on adjacent rotor pole pairs in accordance with an example embodiment.

The switched reluctance machine 1200 of FIG. 12 consists of a stator 1205, a rotor 1210 located inside the stator 1205, a first rotor pole 1212, a second rotor pole 1214, a third rotor pole 1216, a fourth rotor pole 1218, a fifth rotor pole 1222 and a sixth rotor pole 1224. As illustrated in FIG. 12, rotor 1210 is located inside stator 1205.

In some other cases, rotor 1210 may be located outside the stator 1205, where the rotor 1210 is upside down, and the first rotor pole 1212, the second rotor pole 1214, the third rotor pole 1216, the fourth rotor pole 1218, the fifth rotor pole 1222 and the sixth rotor pole 1224 are looking down on the stator 1205.

In this embodiment, each of the first to sixth rotor poles, 1212 to 1224, comprise permanent magnets located on the surface of the rotor poles. In this embodiment, the permanent magnet is one or more tilted U-shape permanent magnets. A tilted U-shape permanent magnet is a U-shape magnet tilted at an angle. Accordingly, a tilted U-shape permanent magnet comprises three sub-magnets, where two of the three magnets are side magnets and the remaining magnet is a base magnet. The three sub-magnets are arranged in the form of the letter 'U' tilted at an angle, where the base magnet forms the base of the letter 'U' and side magnets form the left and the right sides of the letter 'U'.

In some cases, each rotor pole comprises only one tilted U-shape permanent magnet. In some other cases, each rotor pole comprises more than one tilted U-shape permanent magnets. In the illustrated embodiments, each rotor pole comprises k tilted U-shape permanent magnets, where k is any integer greater than or equal to 1.

As illustrated, rotor pole 1212 comprises k tilted U-shape permanent magnets 1290, rotor pole 1214 comprises k tilted U-shape permanent magnets 1291, rotor pole 1216 comprises k tilted U-shape permanent magnets 1292, rotor pole 1218 comprises k tilted U-shape permanent magnets 1293, rotor pole 1222 comprises k tilted U-shape permanent magnets 1294 and rotor pole 1224 comprises k tilted U-shape permanent magnets 1295.

The tilted U-shape permanent magnets 1290 to 1295 located on each rotor pole 1212 to 1224 of the switched reluctance machine 1200 are configured such that adjacent rotor pole pairs have tilted U-shape permanent magnets with same orientation and polarity to each other. In this embodiment, tilted U-shape permanent magnet 1290 of rotor pole 1212 and tilted U-shape permanent magnet 1291 of rotor pole 1214, and tilted U-shape permanent magnet 1294 of rotor pole 1222 and tilted U-shape permanent magnet 1295 of rotor pole 1224 have the same orientation and polarity as each other.

Tilted U-shape permanent magnet 1292 of rotor pole 1216 and tilted U-shape permanent magnet 1293 of rotor pole 1218 have the same orientation and polarity as each other, but different than the orientation and polarity of tilted U-shape permanent magnets 1290, 1291, 1294 and 1295.

Switched reluctance machine 1200 has a plurality of adjustable parameters associated with the tilted U-shape permanent magnets located on each rotor pole, which can be adjusted based on the application of the switched reluctance machine 1200. Depending on machine ratings suitable for the type of application for the switched reluctance machine 1200, the adjustable parameters may be adjusted to match desired performance characteristics, size and cost of the switched reluctance machine 1200.

Adjustable parameters in switched reluctance machine 1200 may include parameters, such as, for example, length of the left side magnet of a tilted U-shape permanent magnet $L_{123}$ 1225, length of the right side magnet of a tilted U-shape permanent magnet $L_{124}$ 1230, inner length of the base magnet of the tilted U-shape permanent magnet $L_{122}$ 1220, outer length of the base magnet of the tilted U-shape permanent magnet $L_{121}$ 1215, width of the left side magnet of the tilted U-shape permanent magnet $W_{121}$ 1235, width of the right side magnet of the tilted U-shape permanent magnet $W_{122}$ 1240, width of the base magnet of the tilted U-shape permanent magnet $W_{123}$ 1245, etc.

Adjustable parameters in switched reluctance machine 1200 may further include parameters, such as, for example, vertical distance of the lowermost tip of the left side magnet from the base magnet of the tilted U-shape permanent magnet $d_{121}$ 1250, vertical distance of the lowermost tip of the right side magnet from the base magnet of the tilted U-shape permanent magnet $d_{122}$ 1252, horizontal distance of the left side magnet from the base magnet of the tilted U-shape permanent magnet $d_{123}$ 1254, horizontal distance of the right side magnet from the base magnet of the tilted U-shape permanent magnet $d_{124}$ 1256 etc.

Adjustable parameters in switched reluctance machine 1200 may also include parameters, such as, for example, position angle of left side magnet towards to the base magnet of the tilted U-shape permanent magnet $\theta_{121}$ 1260, position angle of right side magnet towards to the base magnet of the tilted U-shape permanent magnet $\theta_{122}$ 1262, left side extension angle of the base magnet of the tilted U-shape permanent magnet $\theta_{123}$ 1264, right side extension angle of the base magnet of the tilted U-shape permanent magnet $\theta_{124}$ 1266, rotation angle of tilted U-shape permanent magnet towards the rotor pole surface $\theta_{125}$ 1268, fillet radii of each corner of base magnet of the tilted U-shape permanent magnets $r_{121}$, $r_{122}$, $r_{123}$, $r_{124}$ 1275, 1276, 1277, 1278, fillet radii of each corner of right side magnet of the tilted U-shape permanent $r_{125}$, $r_{126}$, $r_{127}$, $r_{128}$ 1280, 1281, 1282, 1283, and fillet radii of each corner of left side magnet of the tilted U-shape permanent magnet, $r_{129}$, $r_{1210}$, $r_{1211}$, $r_{1212}$ 1285, 1286, 1287 and 1288.

Figure 13:
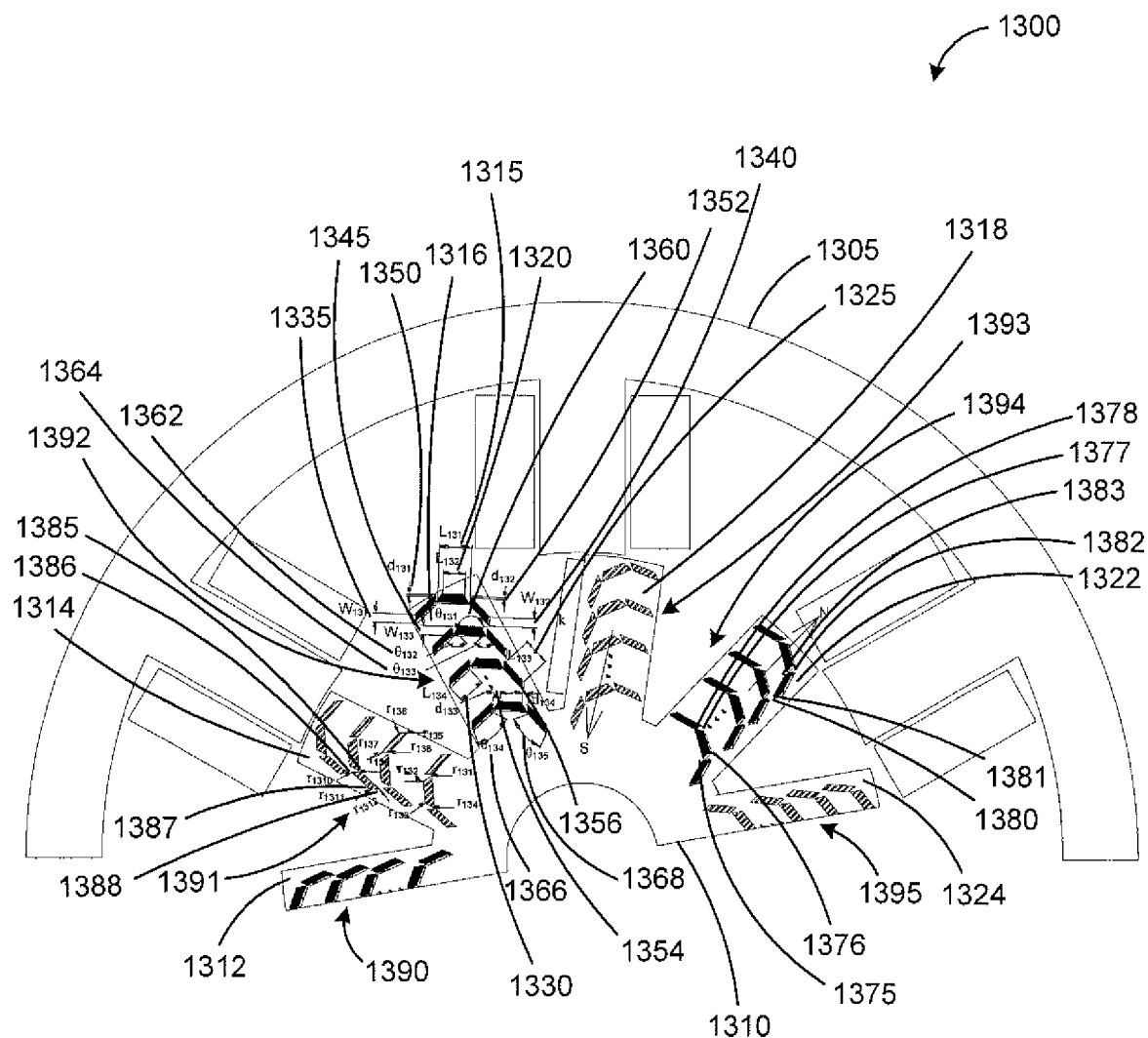
FIG. 13 is a cross-sectional view of a switched reluctance machine having tilted inverse U-shape permanent magnets with opposite polarity on adjacent rotor pole pairs in accordance with an example embodiment.

Reference is first made to FIG. 13 illustrating a cross-sectional view of a switched reluctance machine 1300 having tilted inverse U-shape permanent magnets with opposite polarity on adjacent rotor pole pairs in accordance with an example embodiment.

The switched reluctance machine 1300 of FIG. 13 consists of a stator 1305, a rotor 1310 located inside the stator 1305, a first rotor pole 1312, a second rotor pole 1314, a third rotor pole 1316, a fourth rotor pole 1318, a fifth rotor pole 1322 and a sixth rotor pole 1324. As illustrated, rotor 1310 is located inside stator 1305.

In some other cases, rotor 1310 may be located outside the stator 1305, where the rotor 1310 is upside down, and the first rotor pole 1312, the second rotor pole 1314, the third rotor pole 1316, the fourth rotor pole 1318, the fifth rotor pole 1322 and the sixth rotor pole 1324 are looking down on the stator 1305.

In this embodiment, each of the first to sixth rotor poles, 1312 to 1324, comprise permanent magnets located on the surface of the rotor poles. In this embodiment, the permanent magnet is one or more tilted inverse U-shape permanent magnets. A tilted inverse U-shape permanent magnet is an inverse U-shape magnet tilted at an angle. Accordingly, a tilted inverse U-shape permanent magnet comprises three sub-magnets, where two of the three magnets are side magnets and the remaining magnet is a base magnet. The three sub-magnets are arranged in the form of the inverse letter 'U' tilted at an angle, where the base magnet forms the base of the letter 'U' and side magnets form the left and the right sides of the letter 'U'.

In some cases, each rotor pole comprises only one tilted inverse U-shape permanent magnet. In some other cases, each rotor pole comprises more than one tilted inverse U-shape permanent magnets. In the illustrated embodiments, each rotor pole comprises k tilted inverse U-shape permanent magnets, where k is any integer greater than or equal to 1.

As illustrated, rotor pole 1312 comprises k tilted inverse U-shape permanent magnets 1390, rotor pole 1314 comprises k tilted inverse U-shape permanent magnets 1391, rotor pole 1316 comprises k tilted inverse U-shape permanent magnets 1392, rotor pole 1318 comprises k tilted inverse U-shape permanent magnets 1393, rotor pole 1322 comprises k tilted inverse U-shape permanent magnets 1394 and rotor pole 1324 comprises k tilted inverse U-shape permanent magnets 1395.

The tilted inverse U-shape permanent magnets 1390 to 1395 located on each rotor pole 1312 to 1324 of the switched reluctance machine 1300 are configured such that adjacent rotor pole pairs have tilted inverse U-shape permanent magnets with opposite orientation and polarity to each other. In this embodiment, tilted inverse U-shape permanent magnet 1390 of rotor pole 1312, tilted inverse U-shape permanent magnet 1392 of rotor pole 1316, and tilted inverse U-shape permanent magnet 1394 of rotor pole 1322 have the same orientation and polarity as each other.

Tilted inverse U-shape permanent magnet 1391 of rotor pole 1314, tilted inverse U-shape permanent magnet 1393 of rotor pole 1318 and tilted inverse U-shape permanent magnet 1395 of rotor pole 1324 have the same orientation and polarity as each other, but different than the orientation and polarity of tilted inverse U-shape permanent magnets 1390, 1392 and 1394.

Switched reluctance machine 1300 has a plurality of adjustable parameters associated with the tilted inverse U-shape permanent magnets located on each rotor pole, which can be adjusted based on the application of the switched reluctance machine 1300. Depending on machine ratings suitable for the type of application for the switched reluctance machine 1300, the adjustable parameters may be adjusted to match desired performance characteristics, size and cost of the switched reluctance machine 1300.

Adjustable parameters in switched reluctance machine 1300 may include a plurality of parameters, such as, for example, length of the left side magnet of a tilted inverse U-shape permanent magnet $L_{133}$ 1325, length of the right side magnet of a tilted inverse U-shape permanent magnet $L_{134}$ 1330, inner length of the base magnet of the tilted inverse U-shape permanent magnet $L_{132}$ 1320, outer length of the base magnet of the tilted inverse U-shape permanent magnet $L_{131}$ 1315, width of the left side magnet of the tilted inverse U-shape permanent magnet $W_{131}$ 1335, width of the right side magnet of the tilted inverse U-shape permanent magnet $W_{132}$ 1340, width of the base magnet of the tilted inverse U-shape permanent magnet $W_{133}$ 1345, etc.

Adjustable parameters in switched reluctance machine 1300 may further include parameters, such as, for example, vertical distance of the lowermost tip of the left side magnet from the base magnet of the tilted inverse U-shape permanent magnet $d_{131}$ 1350, vertical distance of the lowermost tip of the right side magnet from the base magnet of the tilted inverse U-shape permanent magnet $d_{132}$ 1352, horizontal distance of the left side magnet from the base magnet of the tilted inverse U-shape permanent magnet $d_{133}$ 1354, horizontal distance of the right side magnet from the base magnet of the tilted inverse U-shape permanent magnet $d_{134}$ 1356, etc.

Adjustable parameters in switched reluctance machine 1300 may also include parameters, such as, for example, position angle of left side magnet towards to the base magnet of the tilted inverse U-shape permanent magnet $\theta_{131}$ 1360, position angle of right side magnet towards to the base magnet of the tilted inverse U-shape permanent magnet $\theta_{132}$ 1362, left side extension angle of the base magnet of the tilted inverse U-shape permanent magnet $\theta_{133}$ 1364, right side extension angle of the base magnet of the tilted inverse U-shape permanent magnet $\theta_{134}$ 1366, rotation angle of tilted inverse U-shape permanent magnet towards the rotor pole surface $\theta_{135}$ 1368, fillet radii of each corner of base magnet of the tilted inverse U-shape permanent magnets $r_{131}$, $r_{132}$, $r_{133}$, $r_{134}$ 1375, 1376, 1377, 1378, fillet radii of each corner of right side magnet of the tilted inverse U-shape permanent magnet $r_{135}$, $r_{136}$, $r_{137}$, $r_{138}$ 1380, 1381, 1382, 1383, fillet radii of each corner of left side magnet of the tilted inverse U-shape permanent magnet $r_{139}$, $r_{1310}$, $r_{1311}$, $r_{1312}$ 1385, 1386, 1387 and 1388, etc.

Figure 14:
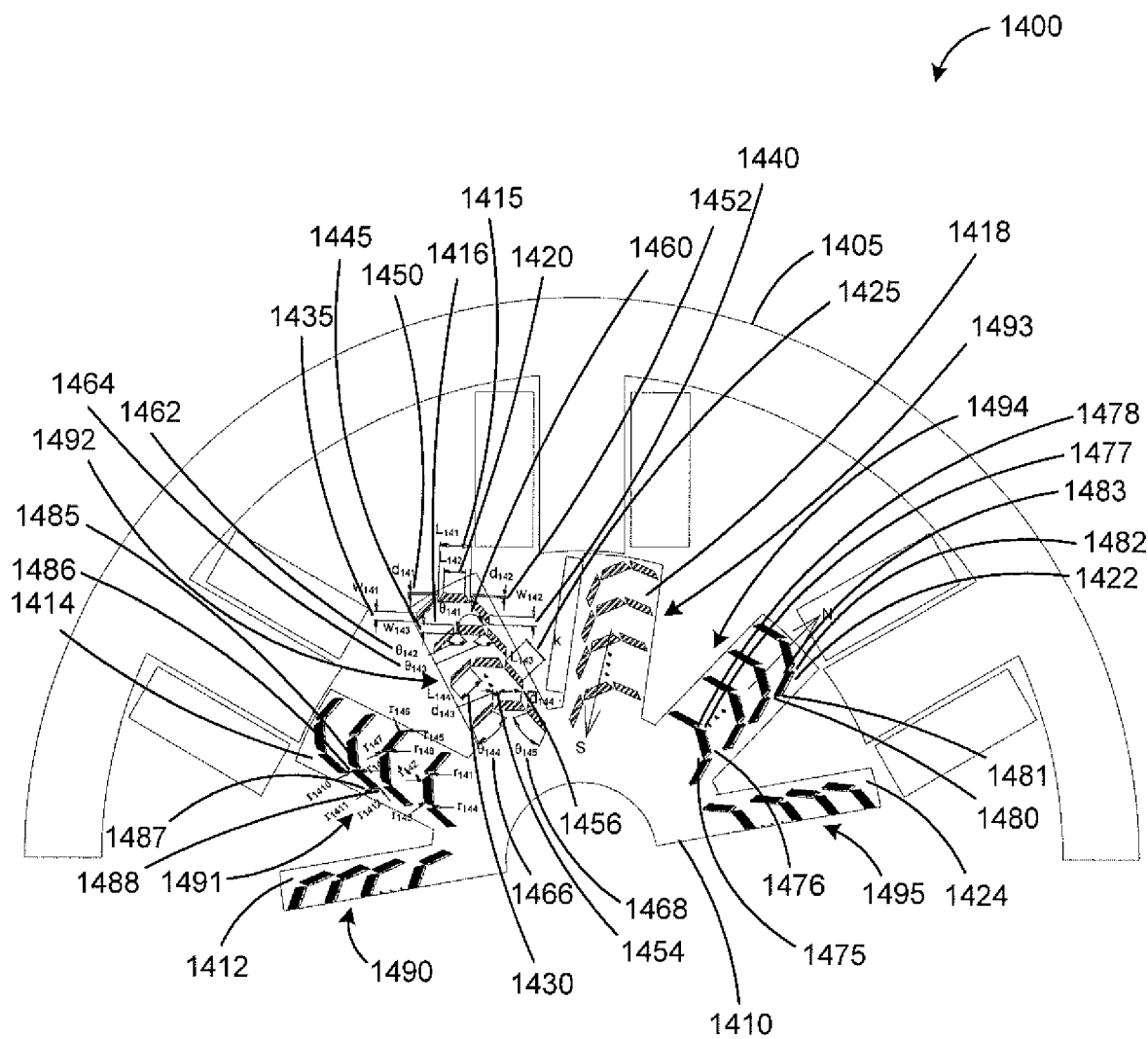
FIG. 14 is a cross-sectional view of a switched reluctance machine having tilted inverse U-shape permanent magnets with same polarity on adjacent rotor pole pairs in accordance with another example embodiment.

Reference is next made to FIG. 14 illustrating a cross-sectional view of a switched reluctance machine 1400 having tilted inverse U-shape permanent magnets with same polarity on adjacent rotor pole pairs in accordance with an example embodiment.

The switched reluctance machine 1400 of FIG. 14 consists of a stator 1405, a rotor 1410 located inside the stator 1405, a first rotor pole 1412, a second rotor pole 1414, a third rotor pole 1416, a fourth rotor pole 1418, a fifth rotor pole 1422 and a sixth rotor pole 1424. As illustrated in FIG. 14, rotor 1410 is located inside stator 1405.

In some other cases, rotor 1410 is located outside the stator 1405, where the rotor 1410 is upside down, and the first rotor pole 1412, the second rotor pole 1414, the third rotor pole 1416, the fourth rotor pole 1418, the fifth rotor pole 1422 and the sixth rotor pole 1024 are looking down on the stator 1405.

In this embodiment, each of the first to sixth rotor poles, 1412 to 1424, comprise permanent magnets located on the surface of the rotor poles. In this embodiment, the permanent magnet is one or more tilted inverse U-shape permanent magnets. A tilted inverse U-shape permanent magnet is an inverse U-shape magnet tilted at an angle. Accordingly, a tilted inverse U-shape permanent magnet comprises three sub-magnets, where two of the three magnets are side magnets and the remaining magnet is a base magnet. The three sub-magnets are arranged in the form of the inverse letter 'U' tilted at an angle, where the base magnet forms the base of the letter 'U' and side magnets form the left and the right sides of the letter 'U'.

In some cases, each rotor pole comprises only one tilted inverse U-shape permanent magnet. In some other cases, each rotor pole comprises more than one tilted inverse U-shape permanent magnets. In the illustrated embodiments, each rotor pole comprises k tilted inverse U-shape permanent magnets, where k is any integer greater than or equal to 1.

As illustrated, rotor pole 1412 comprises k tilted inverse U-shape permanent magnets 1490, rotor pole 1414 comprises k tilted inverse U-shape permanent magnets 1491, rotor pole 1416 comprises k tilted inverse U-shape permanent magnets 1492, rotor pole 1418 comprises k tilted inverse U-shape permanent magnets 1493, rotor pole 1422 comprises k tilted inverse U-shape permanent magnets 1494 and rotor pole 1424 comprises k tilted inverse U-shape permanent magnets 1495.

The tilted inverse U-shape permanent magnets 1490 to 1495 located on each rotor pole 1412 to 1424 of the switched reluctance machine 1200 are configured such that adjacent rotor pole pairs have tilted inverse U-shape permanent magnets with same orientation and polarity to each other. In this embodiment, tilted inverse U-shape permanent magnet 1490 of rotor pole 1412 and tilted inverse U-shape permanent magnet 1491 of rotor pole 1414, and tilted inverse U-shape permanent magnet 1494 of rotor pole 1422 and tilted inverse U-shape permanent magnet 1495 of rotor pole 1424 have the same orientation and polarity as each other.

Tilted inverse U-shape permanent magnet 1492 of rotor pole 1416 and tilted inverse U-shape permanent magnet 1493 of rotor pole 1418 have the same orientation and polarity as each other, but different than the orientation and polarity of tilted inverse U-shape permanent magnets 1490, 1491, 1494 and 1495.

Switched reluctance machine 1400 has a plurality of adjustable parameters associated with the tilted inverse U-shape permanent magnets located on each rotor pole, which can be adjusted based on the application of the switched reluctance machine 1400. Depending on machine ratings suitable for the type of application for the switched reluctance machine 1400, the adjustable parameters may be adjusted to match desired performance characteristics, size and cost of the switched reluctance machine 1400.

Adjustable parameters in switched reluctance machine 1400 may include parameters such as, for example, length of the left side magnet of a tilted inverse U-shape permanent magnet $L_{143}$ 1425, length of the right side magnet of a tilted inverse U-shape permanent magnet $L_{144}$ 1430, inner length of the base magnet of the tilted inverse U-shape permanent magnet $L_{142}$ 1420, outer length of the base magnet of the tilted inverse U-shape permanent magnet $L_{141}$ 1415, width of the left side magnet of the tilted inverse U-shape permanent magnet $W_{141}$ 1435, width of the right side magnet of the tilted inverse U-shape permanent magnet $W_{142}$ 1440, width of the base magnet of the tilted inverse U-shape permanent magnet $W_{143}$ 1445, etc.

Adjustable parameters in switched reluctance machine 1400 may further include parameters such as, for example, vertical distance of the lowermost tip of the left side magnet from the base magnet of the tilted inverse U-shape permanent magnet $d_{141}$ 1450, vertical distance of the lowermost tip of the right side magnet from the base magnet of the tilted inverse U-shape permanent magnet $d_{142}$ 1452, horizontal distance of the left side magnet from the base magnet of the tilted inverse U-shape permanent magnet $d_{143}$ 1454, horizontal distance of the right side magnet from the base magnet of the tilted inverse U-shape permanent magnet $d_{144}$ 1456, etc.

Adjustable parameters in switched reluctance machine 1400 may also include parameters such as, for example, position angle of left side magnet towards to the base magnet of the tilted inverse U-shape permanent magnet $\theta_{141}$ 1460, position angle of right side magnet towards to the base magnet of the tilted inverse U-shape permanent magnet $\theta_{142}$ 1462, left side extension angle of the base magnet of the tilted inverse U-shape permanent magnet $\theta_{143}$ 1464, right side extension angle of the base magnet of the tilted inverse U-shape permanent magnet $\theta_{144}$ 1466, rotation angle of tilted inverse U-shape permanent magnet towards the rotor pole surface $\theta_{145}$ 1468, fillet radii of each corner of base magnet of the tilted inverse U-shape permanent magnets $r_{141}$, $r_{142}$, $r_{143}$, $r_{144}$ 1475, 1476, 1477, 1478, fillet radii of each corner of right side magnet of the tilted inverse U-shape $r_{135}$, $r_{136}$, $r_{137}$, $r_{138}$ 1480, 1481, 1482, 1483, fillet radii of each corner of left side magnet of the tilted inverse U-shape permanent magnet, and $r_{139}$, $r_{1310}$, $r_{1311}$, $r_{1312}$ 1485, 1486, 1487 and 1488, etc.

Figure 15:
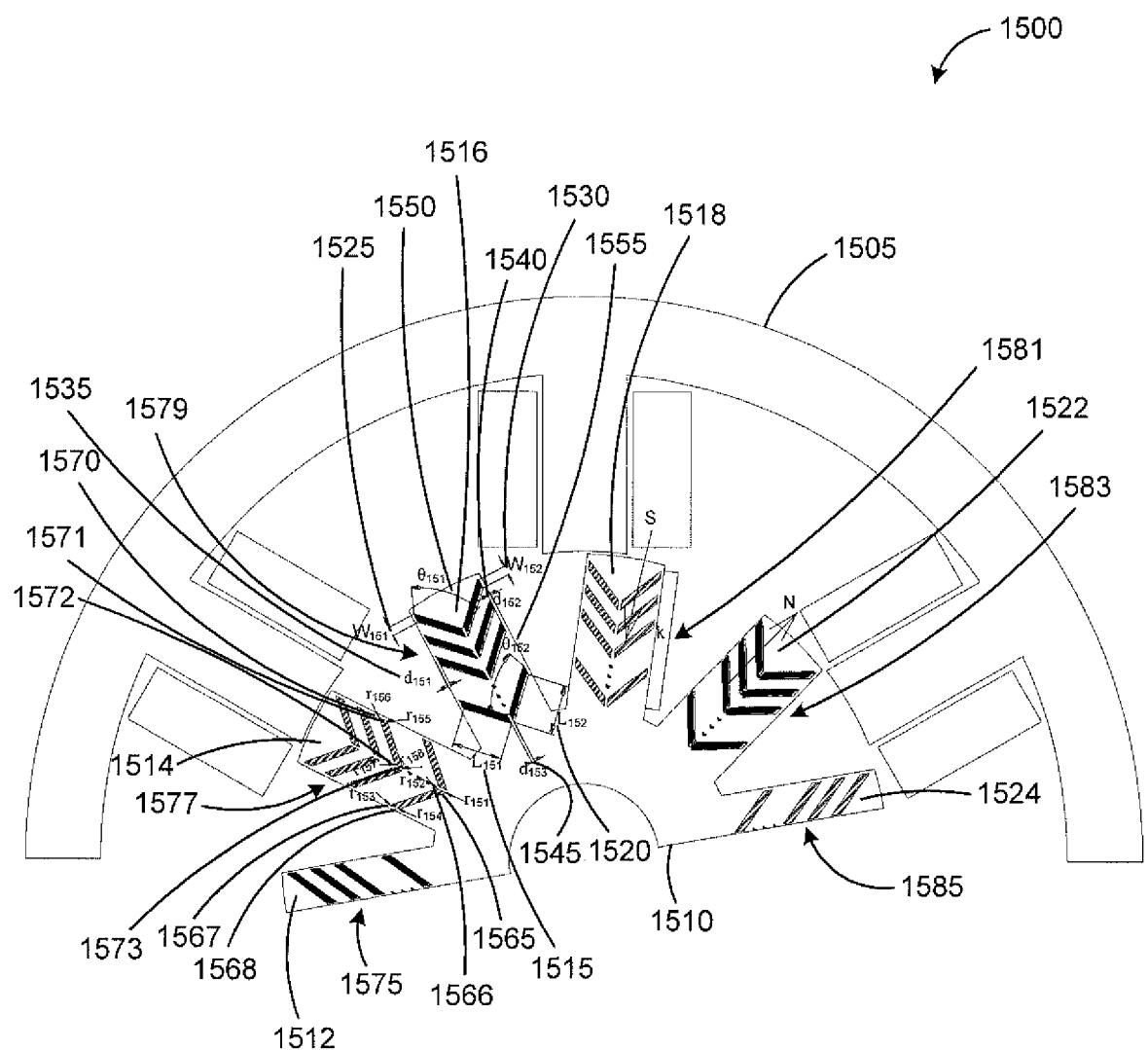
FIG. 15 is a cross-sectional view of a switched reluctance machine having V-shape permanent magnets with opposite polarity on adjacent rotor pole pairs in accordance with an example embodiment.

Reference is first made to FIG. 15 illustrating a cross-sectional view of a switched reluctance machine 1500 having V-shape permanent magnets with opposite polarity on adjacent rotor pole pairs in accordance with an example embodiment.

The switched reluctance machine 1500 of FIG. 15 consists of a stator 1505, a rotor 1510 located inside the stator 1505, a first rotor pole 1512, a second rotor pole 1514, a third rotor pole 1516, a fourth rotor pole 1518, a fifth rotor pole 1522 and a sixth rotor pole 1524. Rotor 1510 is located inside stator 1505, as illustrated.

In various other cases, rotor 1510 is located outside the stator 1505, where the rotor 1510 is upside down, and the first rotor pole 1512, the second rotor pole 1514, the third rotor pole 1516, the fourth rotor pole 1518, the fifth rotor pole 1522 and the sixth rotor pole 1524 are looking down on the stator 1505.

In this embodiment, each of the first to sixth rotor poles, 1512 to 1524, comprise permanent magnets located on the surface of the rotor poles. In this embodiment, the permanent magnet is one or more V-shape permanent magnets. A V-shape permanent magnet comprises two sub-magnets forming the left and the right side of the letter 'V'.

In some cases, each rotor pole comprises only one V-shape permanent magnet. In some other cases, each rotor pole comprises more than one V-shape permanent magnets.

In the illustrated embodiments, each rotor pole comprises k V-shape permanent magnets, where k is any integer greater than or equal to 1.

As illustrated, rotor pole 1512 comprises k V-shape permanent magnets 1575, rotor pole 1514 comprises k V-shape permanent magnets 1577, rotor pole 1516 comprises k V-shape permanent magnets 1579, rotor pole 1518 comprises k V-shape permanent magnets 1581, rotor pole 1522 comprises k V-shape permanent magnets 1583 and rotor pole 1524 comprises k V-shape permanent magnets 1585.

The V-shape permanent magnets 1575 to 1585 located on each rotor pole 1512 to 1524 of the switched reluctance machine 1500 are configured such that adjacent rotor pole pairs have V-shape permanent magnets with opposite orientation and polarity to each other. In this embodiment, V-shape permanent magnet 1575 of rotor pole 1512, V-shape permanent magnet 1579 of rotor pole 1516, and V-shape permanent magnet 1583 of rotor pole 1522 have the same orientation and polarity as each other.

V-shape permanent magnet 1577 of rotor pole 1514, V-shape permanent magnet 1581 of rotor pole 1518 and V-shape permanent magnet 1585 of rotor pole 1524 have the same orientation and polarity as each other, but different than the orientation and polarity of V-shape permanent magnets 1575, 1579 and 1583.

Switched reluctance machine 1500 has a plurality of adjustable parameters associated with the V-shape permanent magnets located on each rotor pole, which can be adjusted based on the application of the switched reluctance machine 1500. Depending on machine ratings suitable for the type of application for the switched reluctance machine 1500, the adjustable parameters may be adjusted to match desired performance characteristics size and cost of the switched reluctance machine 1500.

Adjustable parameters in switched reluctance machine 1500 include a plurality of parameters, such as, for example, length of the left side magnet of a V-shape permanent magnet $L_{151}$ 1515, length of the right side magnet of a V-shape permanent magnet $L_{152}$ 1520, width of the left side magnet of the V-shape permanent magnet $W_{151}$ 1525, width of the right side magnet of the V-shape permanent magnet $W_{152}$ 1530, etc.

Adjustable parameters in switched reluctance machine 1500 may also include parameters, such as, for example, horizontal distance of the left side magnet of the V-shape permanent magnet from the left side of the rotor pole $d_{151}$ 1535, horizontal distance of the right side magnet of the V-shape permanent magnet from the right side of the rotor pole $d_{152}$ 1540, distance between the left and right magnet of the V-shape permanent magnet $d_{153}$ 1545, etc.

Adjustable parameters in switched reluctance machine 1500 may further include parameters, such as, for example, rotation angle of left side magnet of the V-shape permanent magnet $\theta_{151}$ 1550, rotation angle of right side magnet of the V-shape permanent magnet $\theta_{152}$ 1555, fillet radii of each corner of left side magnet of the V-shape permanent magnet $r_{151}$, $r_{152}$, $r_{153}$, $r_{154}$ 1565, 1566, 1567 and 1568, and fillet radii of each corner of right side magnet of the V-shape permanent magnet $r_{155}$, $r_{156}$, $r_{157}$, $r_{158}$ 1570, 1571, 1572 and 1573, etc.

Figure 16:
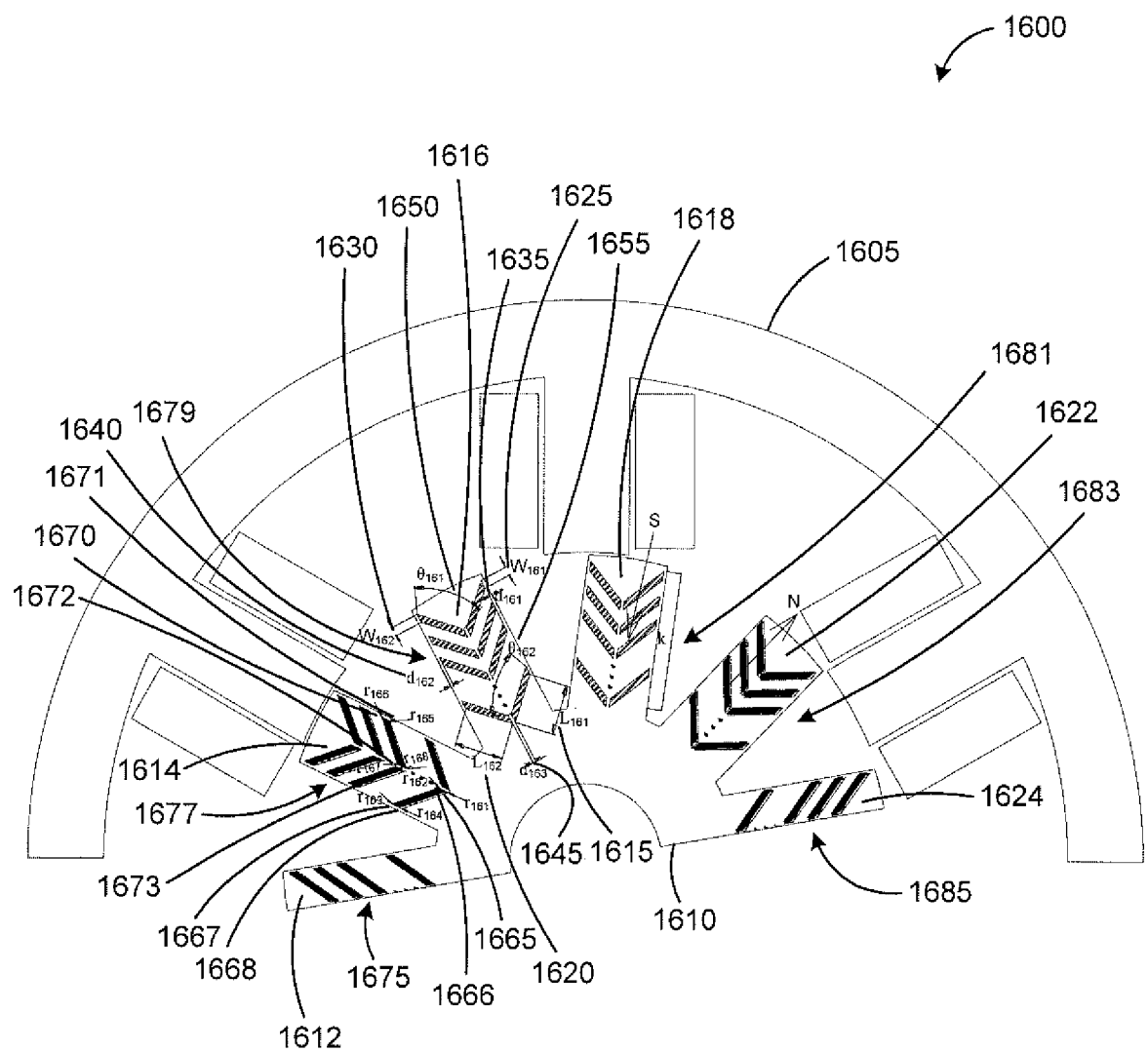
FIG. 16 is a cross-sectional view of a switched reluctance machine having V-shape permanent magnets with same polarity on adjacent rotor pole pairs in accordance with another example embodiment.

Reference is first made to FIG. 16 illustrating a cross-sectional view of a switched reluctance machine 1600 having V-shape permanent magnets with same polarity on adjacent rotor pole pairs in accordance with an example embodiment.

The switched reluctance machine 1600 of FIG. 16 consists of a stator 1605, a rotor 1610 located inside the stator 1605, a first rotor pole 1612, a second rotor pole 1614, a third rotor pole 1616, a fourth rotor pole 1618, a fifth rotor pole 1622 and a sixth rotor pole 1624. Rotor 1610 is located inside stator 1605, as illustrated.

In various cases, rotor 1610 is located outside the stator 1605, where the rotor 1610 is upside down, and the first rotor pole 1612, the second rotor pole 1614, the third rotor pole 1616, the fourth rotor pole 1618, the fifth rotor pole 1622 and the sixth rotor pole 1624 are facing down towards the stator 1605.

In this embodiment, each of the first to sixth rotor poles, 1612 to 1624, comprise permanent magnets located on the surface of the rotor poles. In this embodiment, the permanent magnet is one or more V-shape permanent magnets. A V-shape permanent magnet comprises two sub-magnets forming the left and the right side of the letter 'V'.

In some cases, each rotor pole comprises only one V-shape permanent magnet. In some other cases, each rotor pole comprises more than one V-shape permanent magnets. In the illustrated embodiments, each rotor pole comprises k V-shape permanent magnets, where k is any integer greater than or equal to 1.

As illustrated, rotor pole 1612 comprises k V-shape permanent magnets 1675, rotor pole 1614 comprises k V-shape permanent magnets 1677, rotor pole 1616 comprises k V-shape permanent magnets 1679, rotor pole 1618 comprises k V-shape permanent magnets 1681, rotor pole 1622 comprises k V-shape permanent magnets 1683 and rotor pole 1624 comprises k V-shape permanent magnets 1685.

The V-shape permanent magnets 1675 to 1685 located on each rotor pole 1612 to 1624 of the switched reluctance machine 1600 are configured such that adjacent rotor pole pairs have V-shape permanent magnets with same orientation and polarity as each other. In this embodiment, V-shape permanent magnet 1675 of rotor pole 1612 and V-shape permanent magnet 1667 of rotor pole 1614, as well as V-shape permanent magnet 1683 of rotor pole 1622 and V-shape permanent magnet 1685 of rotor pole 1624 have the same orientation and polarity as each other.

V-shape permanent magnet 1679 of rotor pole 1616 and V-shape permanent magnet 1681 of rotor pole 1618 have the same orientation and polarity as each other, but different than the orientation and polarity of V-shape permanent magnets 1675, 1677, 1683 and 1685.

Switched reluctance machine 1600 has a plurality of adjustable parameters associated with the V-shape permanent magnets located on each rotor pole, which can be adjusted based on the application of the switched reluctance machine 1600. Depending on machine ratings suitable for the type of application for the switched reluctance machine 1600, the adjustable parameters may be adjusted to match desired performance characteristics, size and cost of the switched reluctance machine 1600.

Adjustable parameters in switched reluctance machine 1600 include a plurality of parameters, such as, for example, length of the left side magnet of a V-shape permanent magnet $L_{161}$ 1615, length of the right side magnet of a V-shape permanent magnet $L_{162}$ 1620, width of the left side magnet of the V-shape permanent magnet $W_{161}$ 1625, width of the right side magnet of the V-shape permanent magnet $W_{162}$ 1630, etc.

Adjustable parameters in switched reluctance machine 1600 also include parameters, such as, for example, horizontal distance of the left side magnet of the V-shape permanent magnet from the left side of the rotor pole $d_{161}$ 1635, horizontal distance of the right side magnet of the V-shape permanent magnet from the right side of the rotor pole $d_{162}$ 1640, distance between the left and right magnet of the V-shape permanent magnet $d_{163}$ 1645, etc.

Adjustable parameters in switched reluctance machine 1600 further include parameters, such as, for example, rotation angle of left side magnet of the V-shape permanent magnet $\theta_{161}$ 1650, rotation angle of right side magnet of the V-shape permanent magnet $\theta_{162}$ 1655, fillet radii of each corner of left side magnet of the V-shape permanent magnet $r_{161}, r_{162}, r_{163}, r_{164}$ 1665, 1666, 1667 and 1668, fillet radii of each corner of right side magnet of the V-shape permanent magnet $r_{165}, r_{166}, r_{167}, r_{168}$ 1670, 1671, 1672 and 1673, etc. Rotation angle of left side magnet indicates the angle by which the left side magnet is rotated from the axis parallel to the right side magnet. Similarly, rotation angle of right side magnet indicates the angle by which the right side magnet is rotated from the axis parallel to the left side magnet. In cases where the left side or right side rotation angle is zero, the left and right side magnets are parallel to each other.

Figure 17:
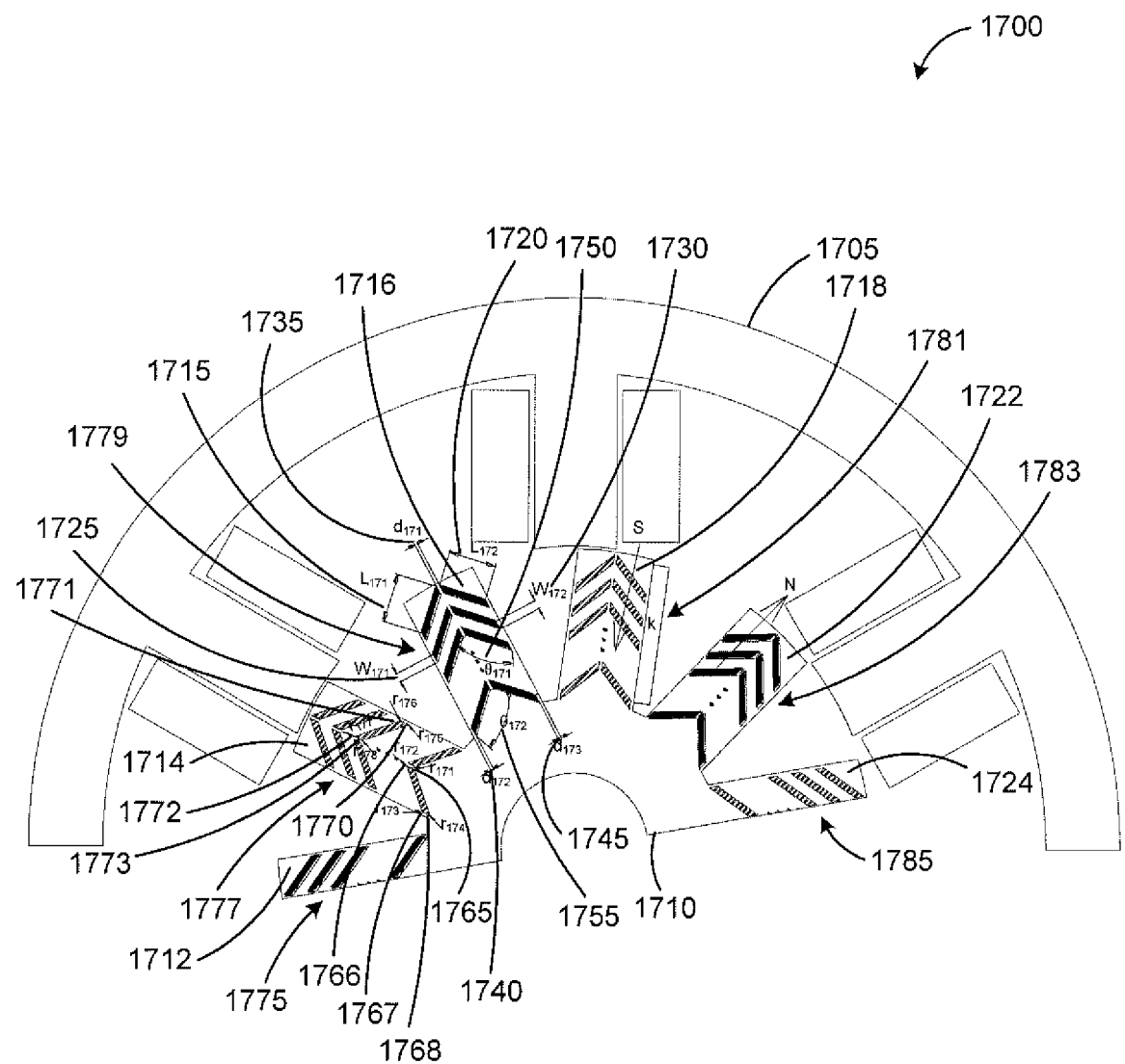
FIG. 17 is a cross-sectional view of a switched reluctance machine having inverse V-shape permanent magnets with opposite polarity on adjacent rotor pole pairs in accordance with an example embodiment.

Reference is first made to FIG. 17 illustrating a cross-sectional view of a switched reluctance machine 1700 having inverse V-shape permanent magnets with opposite polarity on adjacent rotor pole pairs in accordance with an example embodiment.

The switched reluctance machine 1700 of FIG. 17 consists of a stator 1705, a rotor 1710 located inside the stator 1705, a first rotor pole 1712, a second rotor pole 1714, a third rotor pole 1716, a fourth rotor pole 1718, a fifth rotor pole 1722 and a sixth rotor pole 1724. Rotor 1710 is located inside stator 1705, as illustrated.

In various cases, rotor 1710 is located outside the stator 1705, where the rotor 1710 is upside down, and the first rotor pole 1712, the second rotor pole 1714, the third rotor pole 1716, the fourth rotor pole 1718, the fifth rotor pole 1722 and the sixth rotor pole 1724 are facing down towards the stator 1705.

In this embodiment, each of the first to sixth rotor poles, 1712 to 1724, comprise permanent magnets located on the surface of the rotor poles. In this embodiment, the permanent magnet is one or more inverse V-shape permanent magnets. Inverse V-shape permanent magnet comprises two sub-magnets forming the left and the right side of the inverse letter 'V'.

In some cases, each rotor pole comprises only one inverse V-shape permanent magnet. In some other cases, each rotor pole comprises more than one inverse V-shape permanent magnets. In the illustrated embodiments, each rotor pole comprises k inverse V-shape permanent magnets, where k is any integer greater than or equal to 1.

As illustrated, rotor pole 1712 comprises k inverse V-shape permanent magnets 1775, rotor pole 1714 comprises k inverse V-shape permanent magnets 1777, rotor pole 1716 comprises k inverse V-shape permanent magnets 1779, rotor pole 1718 comprises k inverse V-shape permanent magnets 1781, rotor pole 1722 comprises k inverse V-shape permanent magnets 1783 and rotor pole 1724 comprises k inverse V-shape permanent magnets 1785.

The inverse V-shape permanent magnets 1775 to 1785 located on each rotor pole 1712 to 1724 of the switched reluctance machine 1700 are configured such that adjacent rotor pole pairs have inverse V-shape permanent magnets with opposite orientation and polarity to each other. In this embodiment, inverse V-shape permanent magnet 1775 of rotor pole 1712, inverse V-shape permanent magnet 1779 of rotor pole 1716, and inverse V-shape permanent magnet 1783 of rotor pole 1722 have the same orientation and polarity as each other.

Inverse V-shape permanent magnet 1777 of rotor pole 1714, inverse V-shape permanent magnet 1781 of rotor pole 1718 and inverse V-shape permanent magnet 1785 of rotor pole 1724 have the same orientation and polarity as each other, but different than the orientation and polarity of inverse V-shape permanent magnets 1775, 1779 and 1783.

Switched reluctance machine 1700 has a plurality of adjustable parameters associated with the inverse V-shape permanent magnets located on each rotor pole, which can be adjusted based on the application of the switched reluctance machine 1700. Depending on machine ratings suitable for the type of application for the switched reluctance machine 1700, the adjustable parameters may be adjusted to match desired performance characteristics, size and cost of the switched reluctance machine 1700.

Adjustable parameters in switched reluctance machine 1700 include a plurality of parameters, such as, for example, length of the left side magnet of an inverse V-shape permanent magnet $L_{171}$ 1715, length of the right side magnet of an inverse V-shape permanent magnet $L_{172}$ 1720, width of the left side magnet of the inverse V-shape permanent magnet $W_{171}$ 1725, width of the right side magnet of the inverse V-shape permanent magnet $W_{172}$ 1730, etc.

Adjustable parameters in switched reluctance machine 1700 also include parameters, such as, for example, horizontal distance of the left side magnet of the inverse V-shape permanent magnet from the left side of the rotor pole $d_{172}$ 1740, horizontal distance of the right side magnet of the inverse V-shape permanent magnet from the right side of the rotor pole $d_{173}$ 1745, distance between the left and right magnet of the inverse V-shape permanent magnet $d_{171}$ 1735, etc.

Adjustable parameters in switched reluctance machine 1700 further include parameters, such as, for example, rotation angle of left side magnet of the inverse V-shape permanent magnet $\theta_{172}$ 1755, rotation angle of right side magnet of the inverse V-shape permanent magnet $\theta_{171}$ 1750, fillet radii of each corner of left side magnet of the inverse V-shape permanent magnet $r_{171}$, $r_{172}$, $r_{173}$, $r_{174}$ 1765, 1766, 1767 and 1768, fillet radii of each corner of right side magnet of the inverse V-shape permanent magnet $r_{175}$, $r_{176}$, $r_{177}$, $r_{178}$ 1770, 1771, 1772 and 1773, etc.

Figure 18:
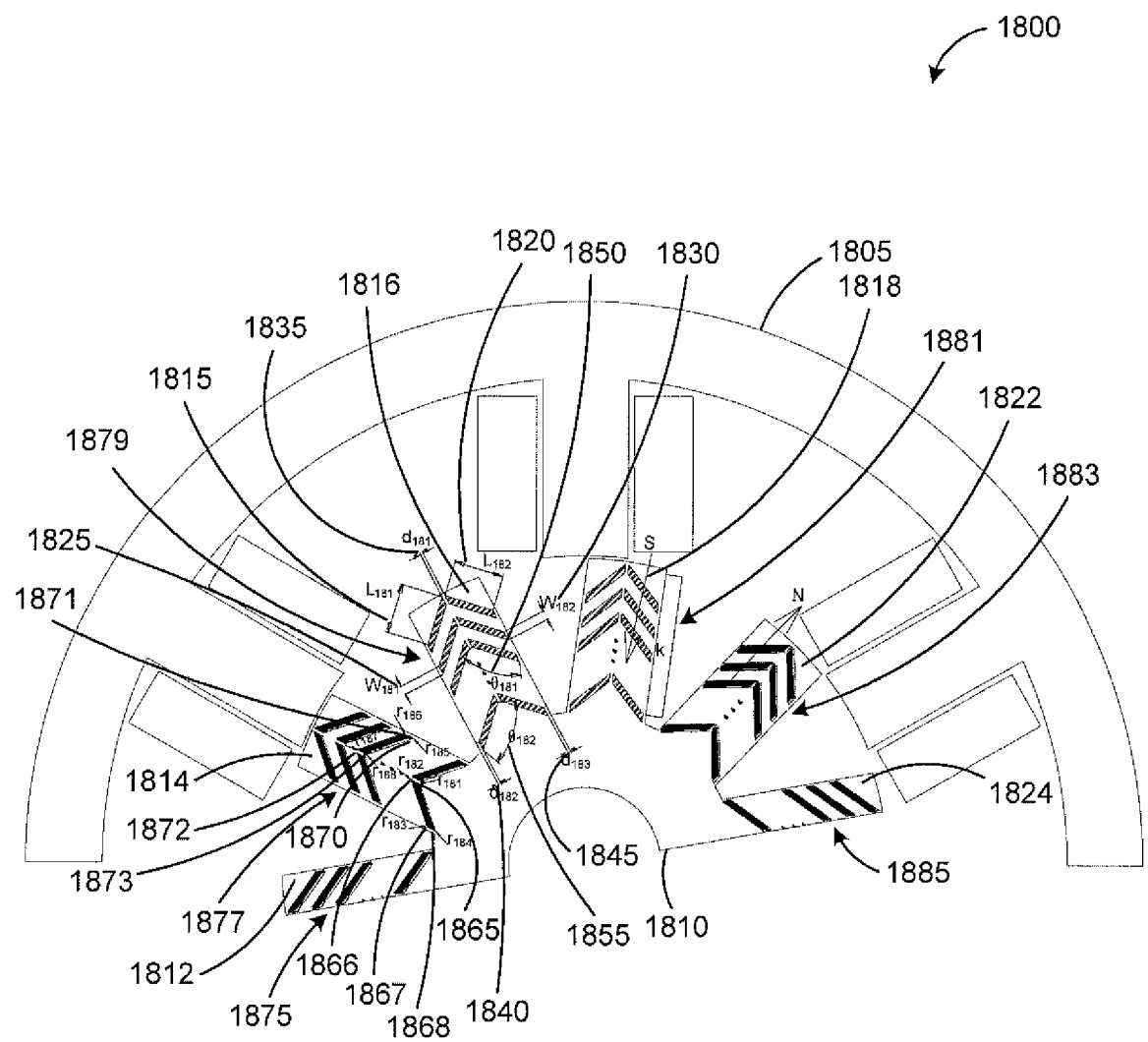
FIG. 18 is a cross-sectional view of a switched reluctance machine having inverse V-shape permanent magnets with same polarity on adjacent rotor pole pairs in accordance with another example embodiment.

Reference is first made to FIG. 18 illustrating a cross-sectional view of a switched reluctance machine 1800 having inverse V-shape permanent magnets with same polarity on adjacent rotor pole pairs in accordance with an example embodiment.

The switched reluctance machine 1800 of FIG. 18 consists of a stator 1805, a rotor 1810 located inside the stator 1805, a first rotor pole 1812, a second rotor pole 1814, a third rotor pole 1816, a fourth rotor pole 1818, a fifth rotor pole 1822 and a sixth rotor pole 1824. Rotor 1810 is located inside stator 1805, as illustrated.

In various cases, rotor 1810 is located outside the stator 1805, where the rotor 1810 is upside down, and the first rotor pole 1812, the second rotor pole 1814, the third rotor pole 1816, the fourth rotor pole 1818, the fifth rotor pole 1822 and the sixth rotor pole 1824 are facing down towards the stator 1805.

In this embodiment, each of the first to sixth rotor poles, 1812 to 1824, comprise permanent magnets located on the surface of the rotor poles. In this embodiment, the permanent magnet is one or more inverse V-shape permanent magnets. Inverse V-shape permanent magnet comprises two sub-magnets forming the left and the right side of the inverse letter 'V'.

In some cases, each rotor pole comprises only one inverse V-shape permanent magnet. In some other cases, each rotor pole comprises more than one inverse V-shape permanent magnets. In the illustrated embodiments, each rotor pole comprises k inverse V-shape permanent magnets, where k is any integer greater than or equal to 1.

As illustrated, rotor pole 1812 comprises k inverse V-shape permanent magnets 1875, rotor pole 1814 comprises k inverse V-shape permanent magnets 1877, rotor pole 1816 comprises k inverse V-shape permanent magnets 1879, rotor pole 1818 comprises k inverse V-shape permanent magnets 1881, rotor pole 1822 comprises k inverse V-shape permanent magnets 1883 and rotor pole 1824 comprises k inverse V-shape permanent magnets 1885.

The inverse V-shape permanent magnets 1875 to 1885 located on each rotor pole 1812 to 1824 of the switched reluctance machine 1800 are configured such that adjacent rotor pole pairs have inverse V-shape permanent magnets with same orientation and polarity as each other. In this embodiment, inverse V-shape permanent magnet 1875 of rotor pole 1812 and inverse V-shape permanent magnet 1867 of rotor pole 1814, as well as inverse V-shape permanent magnet 1883 of rotor pole 1822 and inverse V-shape permanent magnet 1885 of rotor pole 1824 have the same orientation and polarity as each other.

Inverse V-shape permanent magnet 1879 of rotor pole 1816 and inverse V-shape permanent magnet 1881 of rotor pole 1818 have the same orientation and polarity as each other, but different than the orientation and polarity of inverse V-shape permanent magnets 1875, 1877, 1883 and 1885.

Switched reluctance machine 1800 has a plurality of adjustable parameters associated with the inverse V-shape permanent magnets located on each rotor pole, which can be adjusted based on the application of the switched reluctance machine 1800. Depending on machine ratings suitable for the type of application for the switched reluctance machine 1800, the adjustable parameters may be adjusted to match desired performance characteristics, size and cost of the switched reluctance machine 1800.

Adjustable parameters in switched reluctance machine 1800 include a plurality of parameters, such as, for example, length of the left side magnet of an inverse V-shape permanent magnet $L_{181}$ 1815, length of the right side magnet of an inverse V-shape permanent magnet $L_{182}$ 1820, width of the left side magnet of the inverse V-shape permanent magnet $W_{181}$ 1825, width of the right side magnet of the inverse V-shape permanent magnet $W_{182}$ 1830, etc.

Adjustable parameters in switched reluctance machine 1800 may further include parameters, such as, for example, horizontal distance of the left side magnet of the inverse V-shape permanent magnet from the left side of the rotor pole $d_{182}$ 1840, horizontal distance of the right side magnet of the inverse V-shape permanent magnet from the right side of the rotor pole $d_{183}$ 1845, distance between the left and right magnet of the inverse V-shape permanent magnet $d_{181}$ 1835, etc.

Adjustable parameters in switched reluctance machine 1800 may also include parameters, such as, for example, rotation angle of left side magnet of the inverse V-shape permanent magnet $\theta_{182}$ 1855, rotation angle of right side magnet of the inverse V-shape permanent magnet $\theta_{181}$ 1850, fillet radii of each corner of left side magnet of the inverse V-shape permanent magnet $r_{181}$, $r_{182}$, $r_{183}$, $r_{184}$ 1865, 1866, 1867 and 1868, fillet radii of each corner of right side magnet of the inverse V-shape permanent magnet $r_{185}$, $r_{186}$, $r_{187}$, $r_{188}$ 1870, 1871, 1872 and 1873, etc.

Figure 19:
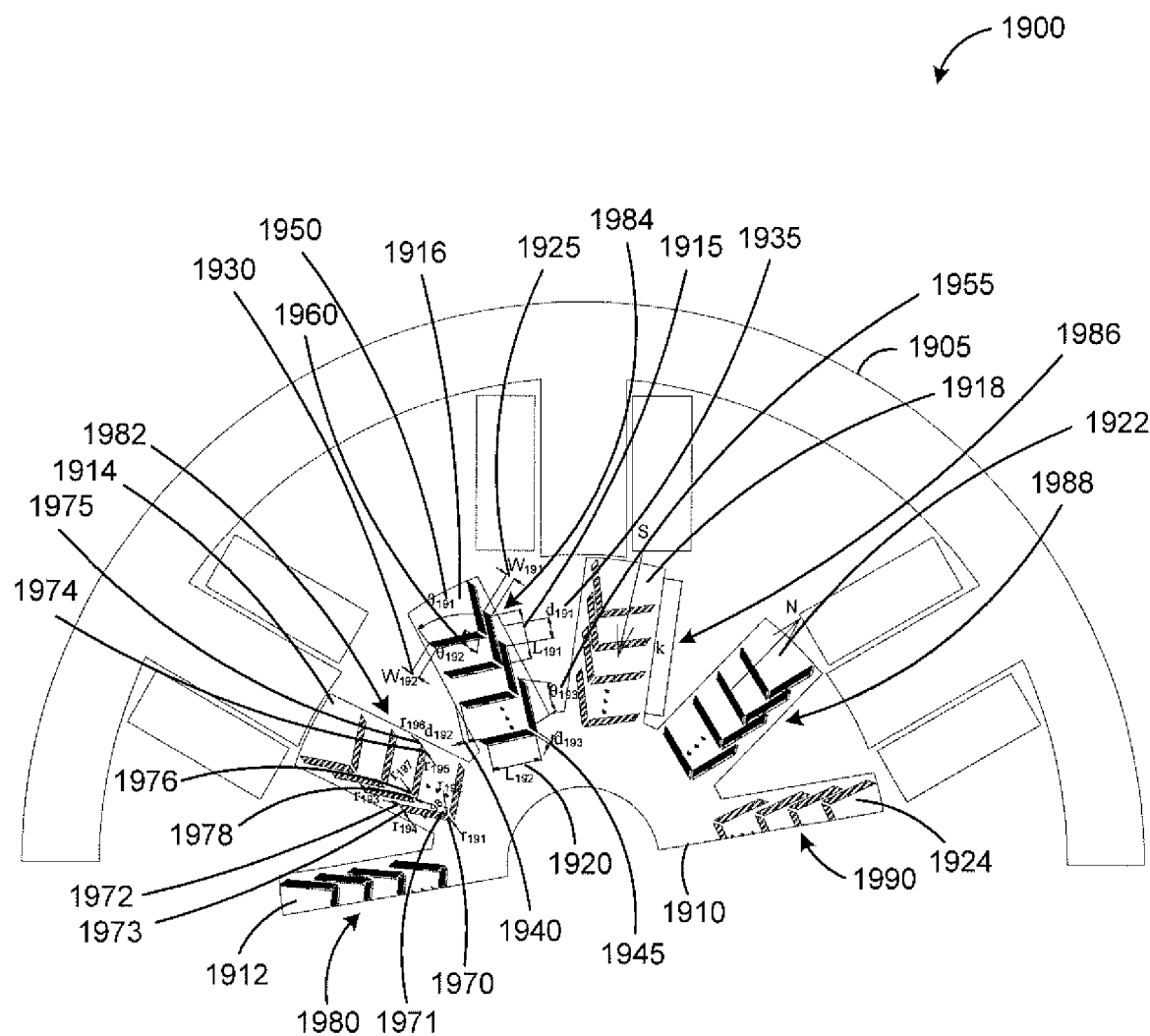
FIG. 19 is a cross-sectional view of a switched reluctance machine having tilted V-shape permanent magnets with opposite polarity on adjacent rotor pole pairs in accordance with an example embodiment.

Reference is first made to FIG. 19 illustrating a cross-sectional view of a switched reluctance machine 1900 having tilted V-shape permanent magnets with opposite polarity on adjacent rotor pole pairs in accordance with an example embodiment.

The switched reluctance machine 1900 of FIG. 19 consists of a stator 1905, a rotor 1910 located inside the stator 1905, a first rotor pole 1912, a second rotor pole 1914, a third rotor pole 1916, a fourth rotor pole 1918, a fifth rotor pole 1922 and a sixth rotor pole 1924. As illustrated, rotor 1910 is located inside stator 1905.

In various cases, rotor 1910 is located outside the stator 1905, where the rotor 1910 is upside down. In such cases, the first rotor pole 1912, the second rotor pole 1914, the third rotor pole 1916, the fourth rotor pole 1918, the fifth rotor pole 1922 and the sixth rotor pole 1924 are looking down towards the stator 1905.

In this embodiment, each of the first to sixth rotor poles, 1912 to 1924, comprise permanent magnets located on the surface of the rotor poles. In this embodiment, the permanent magnet is one or more tilted V-shape permanent magnets. A tilted V-shape permanent magnet comprises a V-shape magnet tilted at an angle. A tilted V-shape permanent magnet comprises two sub-magnets forming the left and the right side of the tilted letter 'V'.

In some cases, each rotor pole comprises only one tilted V-shape permanent magnet. In some other cases, each rotor pole comprises more than one tilted V-shape permanent magnets. In the illustrated embodiments, each rotor pole comprises k tilted V-shape permanent magnets, where k is any integer greater than or equal to 1.

As illustrated, rotor pole 1912 comprises k tilted V-shape permanent magnets 1980, rotor pole 1914 comprises k tilted V-shape permanent magnets 1982, rotor pole 1916 comprises k tilted V-shape permanent magnets 1984, rotor pole 1918 comprises k tilted V-shape permanent magnets 1986, rotor pole 1922 comprises k tilted V-shape permanent magnets 1988 and rotor pole 1924 comprises k tilted V-shape permanent magnets 1990.

The tilted V-shape permanent magnets 1980 to 1990 located on each rotor pole 1912 to 1924 of the switched reluctance machine 1900 are configured such that adjacent rotor pole pairs have tilted V-shape permanent magnets with opposite orientation and polarity to each other. In this embodiment, tilted V-shape permanent magnet 1980 of rotor pole 1912, tilted V-shape permanent magnet 1984 of rotor pole 1916, and tilted V-shape permanent magnet 1988 of rotor pole 1922 have the same orientation and polarity as each other.

Tilted V-shape permanent magnet 1982 of rotor pole 1914, tilted V-shape permanent magnet 1986 of rotor pole 1918, and tilted V-shape permanent magnet 1990 of rotor pole 1924 have the same orientation and polarity as each other, but different than the orientation and polarity of tilted V-shape permanent magnets 1980, 1984 and 1988.

Switched reluctance machine 1900 has a plurality of adjustable parameters associated with the tilted V-shape permanent magnets located on each rotor pole, which can be adjusted based on the application of the switched reluctance machine 1900. Depending on machine ratings suitable for the type of application for the switched reluctance machine 1900, the adjustable parameters may be adjusted to match desired performance characteristics, size and cost of the switched reluctance machine 1900.

Adjustable parameters in switched reluctance machine 1900 include a plurality of parameters, such as, for example, length of the right side magnet of a tilted V-shape permanent magnet $L_{191}$ 1915, length of the left side magnet of a tilted V-shape permanent magnet $L_{192}$ 1920, width of the right side magnet of the tilted V-shape permanent magnet $W_{191}$ 1925, width of the left side magnet of the tilted V-shape permanent magnet $W_{192}$ 1930, etc.

Adjustable parameters in switched reluctance machine 1900 further include parameters, such as, for example, distance of the right side magnet of the tilted V-shape permanent magnet from the right side of the rotor pole $d_{191}$ 1935, distance of the left side magnet of the tilted V-shape permanent magnet from the left side of the rotor pole $d_{192}$ 1940, distance between the left and right magnet of the tilted V-shape permanent magnet $d_{193}$ 1945, etc.

Adjustable parameters in switched reluctance machine 1900 also include parameters, such as, for example, rotation angle of right side magnet of the tilted V-shape permanent magnet $\theta_{191}$ 1950, rotation angle of left side magnet of the tilted V-shape permanent magnet $\theta_{193}$ 1955, rotation angle of tilted V-shape permanent magnet towards the rotor pole surface $\theta_{192}$ 1960, fillet radii of each corner of right side magnet of the tilted V-shape permanent magnet $r_{195}$, $r_{196}$, $r_{197}$, $r_{198}$ 1974, 1975, 1976 and 1978, fillet radii of each corner of left side magnet of the tilted V-shape permanent magnet $r_{191}$, $r_{192}$, $r_{193}$, $r_{194}$ 1970, 1971, 1972 and 1973, etc.

Figure 20:
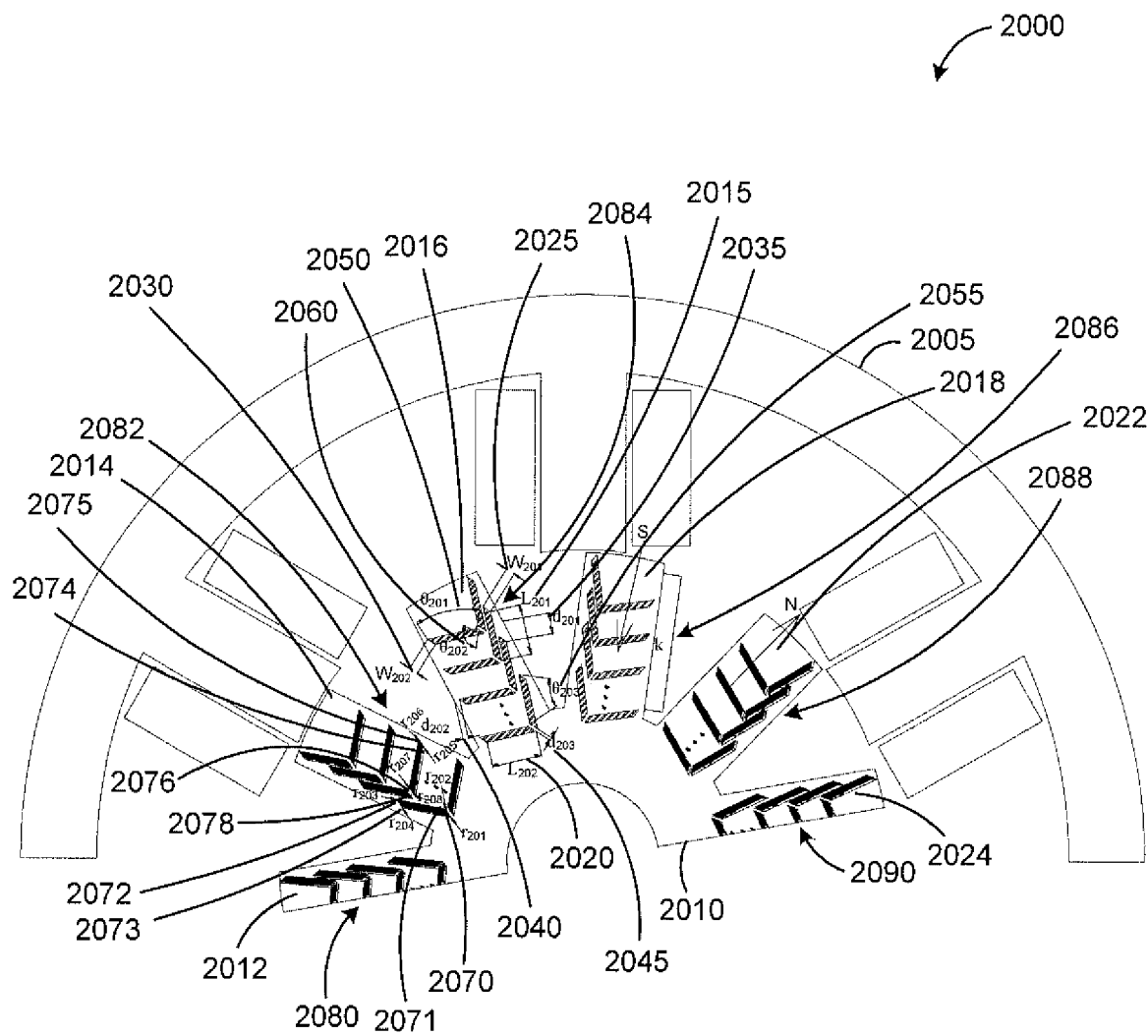
FIG. 20 is a cross-sectional view of a switched reluctance machine having tilted V-shape permanent magnets with same polarity on adjacent rotor pole pairs in accordance with another example embodiment.

Reference is first made to FIG. 20 illustrating a cross-sectional view of a switched reluctance machine 2000 having tilted V-shape permanent magnets with same polarity on adjacent rotor pole pairs in accordance with an example embodiment.

The switched reluctance machine 2000 of FIG. 20 consists of a stator 2005, a rotor 2010 located inside the stator 2005, a first rotor pole 2012, a second rotor pole 2014, a third rotor pole 2016, a fourth rotor pole 2018, a fifth rotor pole 2022 and a sixth rotor pole 2024. As illustrated, rotor 2010 is located inside stator 2005.

In various cases, rotor 2010 is located outside the stator 2005, where the rotor 2010 is upside down, and the first rotor pole 2012, the second rotor pole 2014, the third rotor pole 2016, the fourth rotor pole 2018, the fifth rotor pole 2022 and the sixth rotor pole 2024 are looking down on the stator 2005.

In this embodiment, each of the first to sixth rotor poles, 2012 to 2024, comprise permanent magnets located on the surface of the rotor poles. In this embodiment, the permanent magnet is one or more tilted V-shape permanent magnets. A tilted V-shape permanent magnet comprises a V-shape magnet tilted at an angle. A tilted V-shape permanent magnet comprises two sub-magnets forming the left and the right side of the tilted letter 'V'.

In some cases, each rotor pole comprises only one tilted V-shape permanent magnet. In some other cases, each rotor pole comprises more than one tilted V-shape permanent magnets. In the illustrated embodiments, each rotor pole comprises k tilted V-shape permanent magnets, where k is any integer greater than or equal to 1.

As illustrated, rotor pole 2012 comprises k tilted V-shape permanent magnets 2080, rotor pole 2014 comprises k tilted V-shape permanent magnets 2082, rotor pole 2016 comprises k tilted V-shape permanent magnets 2084, rotor pole 2018 comprises k tilted V-shape permanent magnets 2086, rotor pole 2022 comprises k tilted V-shape permanent magnets 2088 and rotor pole 2024 comprises k tilted V-shape permanent magnets 2090.

The tilted V-shape permanent magnets 2075 to 2085 located on each rotor pole 2012 to 2024 of the switched reluctance machine 2000 are configured such that adjacent rotor pole pairs have tilted V-shape permanent magnets with same orientation and polarity as each other. In this embodiment, tilted V-shape permanent magnet 2075 of rotor pole 2012 and tilted V-shape permanent magnet 2067 of rotor pole 2014, as well as tilted V-shape permanent magnet 2083 of rotor pole 2022 and tilted V-shape permanent magnet 2085 of rotor pole 2024 have the same orientation and polarity as each other.

Tilted V-shape permanent magnet 2079 of rotor pole 2016 and tilted V-shape permanent magnet 2081 of rotor pole 2018 have the same orientation and polarity as each other, but different than the orientation and polarity of tilted V-shape permanent magnets 2075, 2077, 2083 and 2085.

Switched reluctance machine 2000 has a plurality of adjustable parameters associated with the tilted V-shape permanent magnets located on each rotor pole, which can be adjusted based on the application of the switched reluctance machine 2000. Depending on machine ratings suitable for the type of application for the switched reluctance machine 2000, the adjustable parameters may be adjusted to match desired performance characteristics, size and cost of the switched reluctance machine 2000.

Adjustable parameters in switched reluctance machine 2000 include a plurality of parameters, such as, for example, length of the right side magnet of a tilted V-shape permanent magnet $L_{201}$ 2015, length of the left side magnet of a tilted V-shape permanent magnet $L_{202}$ 2020, width of the right side magnet of the tilted V-shape permanent magnet $W_{201}$ 2025, width of the left side magnet of the tilted V-shape permanent magnet $W_{202}$ 2030, etc.

Adjustable parameters in switched reluctance machine 2000 also include parameters, such as, for example, distance of the right side magnet of the tilted V-shape permanent magnet from the right side of the rotor pole $d_{201}$ 2035, distance of the left side magnet of the tilted V-shape permanent magnet from the left side of the rotor pole $d_{202}$ 2040, distance between the left and right magnet of the tilted V-shape permanent magnet $d_{203}$ 2045, etc.

Adjustable parameters in switched reluctance machine 2000 further include parameters, such as, for example, rotation angle of right side magnet of the tilted V-shape permanent magnet $\theta_{201}$ 2050, rotation angle of left side magnet of the tilted V-shape permanent magnet $\theta_{203}$ 2055, rotation angle of tilted V-shape permanent magnet towards the rotor pole surface $\theta_{202}$ 1960, fillet radii of each corner of right side magnet of the tilted V-shape permanent magnet $r_{205}, r_{206}, r_{207}, r_{208}$ 2074, 2075, 2076 and 2078, fillet radii of each corner of left side magnet of the tilted V-shape permanent magnet $r_{201}, r_{202}, r_{203}, r_{204}$ 2070, 2071, 2072 and 2073, etc.

Figure 21:
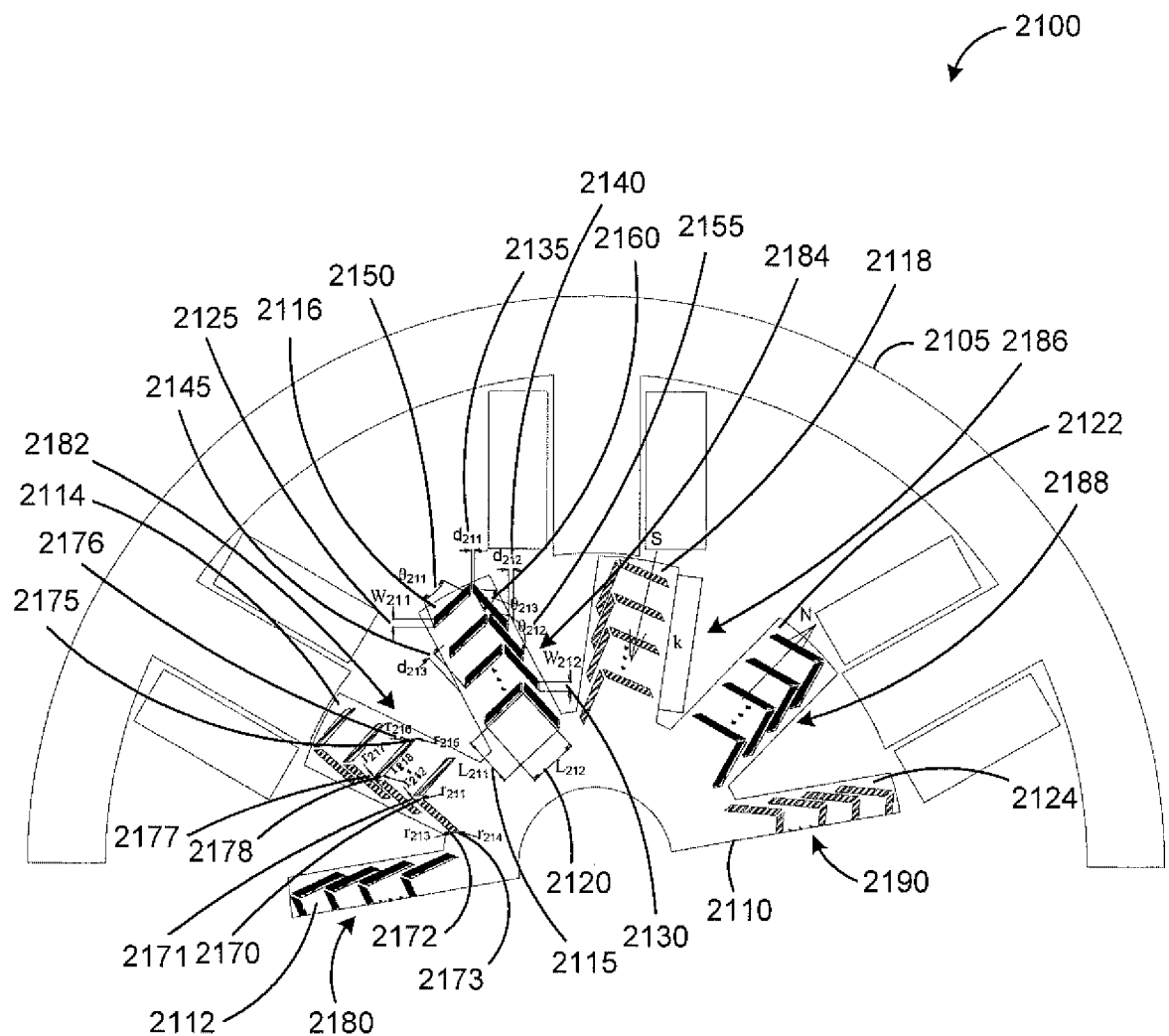
FIG. 21 is a cross-sectional view of a switched reluctance machine having tilted inverse V-shape permanent magnets with opposite polarity on adjacent rotor pole pairs in accordance with an example embodiment.

Reference is first made to FIG. 21 illustrating a cross-sectional view of a switched reluctance machine 2100 having tilted inverse V-shape permanent magnets with opposite polarity on adjacent rotor pole pairs in accordance with an example embodiment.

The switched reluctance machine 2100 of FIG. 21 consists of a stator 2105, a rotor 2110 located inside the stator 2105, a first rotor pole 2112, a second rotor pole 2114, a third rotor pole 2116, a fourth rotor pole 2118, a fifth rotor pole 2122 and a sixth rotor pole 2124. As illustrated, rotor 2110 is located inside stator 2105.

In various cases, rotor 2110 is located outside the stator 2105, and the rotor 2110 is upside down. In such cases, the first rotor pole 2112, the second rotor pole 2114, the third rotor pole 2116, the fourth rotor pole 2118, the fifth rotor pole 2122 and the sixth rotor pole 2124 are looking down on the stator 2105.

In this embodiment, each of the first to sixth rotor poles, 2112 to 2124, comprise permanent magnets located on the surface of the rotor poles. In this embodiment, the permanent magnet is one or more tilted inverse V-shape permanent magnets. A tilted inverse V-shape permanent magnet comprises an inverse V-shape magnet tilted at an angle. A tilted inverse V-shape permanent magnet comprises two sub-magnets forming the left and the right side of the inverse letter 'V' tilted at an angle.

In some cases, each rotor pole comprises only one tilted inverse V-shape permanent magnet. In some other cases, each rotor pole comprises more than one tilted inverse V-shape permanent magnets. In the illustrated embodiments, each rotor pole comprises k tilted inverse V-shape permanent magnets, where k is any integer greater than or equal to 1.

As illustrated, rotor pole 2112 comprises k tilted inverse V-shape permanent magnets 2180, rotor pole 2114 comprises k tilted inverse V-shape permanent magnets 2182, rotor pole 2116 comprises k tilted inverse V-shape permanent magnets 2184, rotor pole 2118 comprises k tilted inverse V-shape permanent magnets 2186, rotor pole 2122 comprises k tilted inverse V-shape permanent magnets 2188 and rotor pole 2124 comprises k tilted inverse V-shape permanent magnets 2190.

The tilted inverse V-shape permanent magnets 2180 to 2190 located on each rotor pole 2112 to 2124 of the switched reluctance machine 2100 are configured such that adjacent rotor pole pairs have tilted inverse V-shape permanent magnets with opposite orientation and polarity to each other. In this embodiment, tilted inverse V-shape permanent magnet 2180 of rotor pole 2112, tilted inverse V-shape permanent magnet 2184 of rotor pole 2116, and tilted inverse V-shape permanent magnet 2188 of rotor pole 2122 have the same orientation and polarity as each other.

Tilted inverse V-shape permanent magnet 2182 of rotor pole 2114, tilted inverse V-shape permanent magnet 2186 of rotor pole 2118, and tilted inverse V-shape permanent magnet 2190 of rotor pole 2124 have the same orientation and polarity as each other, but different than the orientation and polarity of tilted inverse V-shape permanent magnets 2180, 2184 and 2188.

Switched reluctance machine 2100 has a plurality of adjustable parameters associated with the tilted inverse V-shape permanent magnets located on each rotor pole, which can be adjusted based on the application of the switched reluctance machine 2100. Depending on machine ratings suitable for the type of application for the switched reluctance machine 2100, the adjustable parameters may be adjusted to match desired performance characteristics, size and cost of the switched reluctance machine 2100.

Adjustable parameters in switched reluctance machine 2100 include a plurality of parameters, such as, for example, length of the right side magnet of a tilted inverse V-shape permanent magnet $L_{211}$ 2115, length of the left side magnet of a tilted inverse V-shape permanent magnet $L_{212}$ 2120, width of the right side magnet of the tilted inverse V-shape permanent magnet $W_{211}$ 2125, width of the left side magnet of the tilted inverse V-shape permanent magnet $W_{212}$ 2130, etc.

Adjustable parameters in switched reluctance machine 2100 also include parameters, such as, for example, distance of the right side magnet of the tilted inverse V-shape permanent magnet from the right side of the rotor pole $d_{212}$ 2140, distance of the left side magnet of the tilted inverse V-shape permanent magnet from the left side of the rotor pole $d_{213}$ 2145, distance between the left and right magnet of the tilted inverse V-shape permanent magnet $d_{211}$ 2135, etc.

Adjustable parameters in switched reluctance machine 2100 further include parameters, such as, for example, rotation angle of right side magnet of the tilted inverse V-shape permanent magnet $\theta_{212}$ 2155, rotation angle of left side magnet of the tilted inverse V-shape permanent magnet $\theta_{211}$ 2150, rotation angle of tilted inverse V-shape permanent magnet towards the rotor pole surface $\theta_{213}$ 2160, fillet radii of each corner of right side magnet of the tilted inverse V-shape permanent magnet $r_{215}$, $r_{216}$, $r_{217}$, $r_{218}$ 2175, 2176, 2177 and 2178, fillet radii of each corner of left side magnet of the tilted inverse V-shape permanent magnet $r_{211}$, $r_{212}$, $r_{213}$, $r_{214}$ 2170, 2171, 2172 and 2173, etc.

Figure 22:
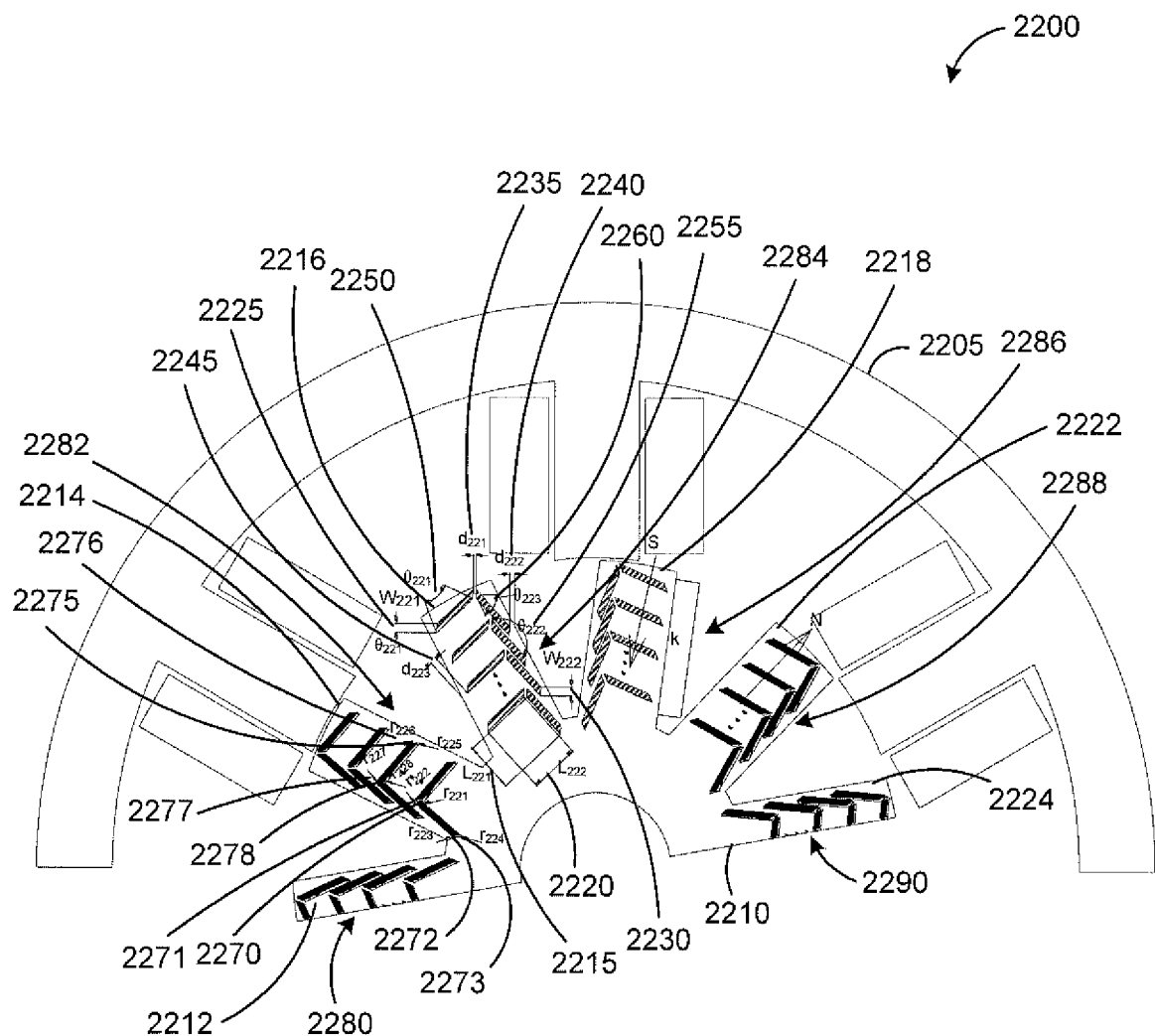
FIG. 22 is a cross-sectional view of a switched reluctance machine having tilted inverse V-shape permanent magnets with same polarity on adjacent rotor pole pairs in accordance with another example embodiment.

Reference is first made to FIG. 22 illustrating a cross-sectional view of a switched reluctance machine 2200 having tilted inverse V-shape permanent magnets with same polarity on adjacent rotor pole pairs in accordance with an example embodiment.

The switched reluctance machine 2200 of FIG. 22 consists of a stator 2205, a rotor 2210 located inside the stator 2205, a first rotor pole 2212, a second rotor pole 2214, a third rotor pole 2216, a fourth rotor pole 2218, a fifth rotor pole 2222 and a sixth rotor pole 2224. As illustrated, rotor 2210 is located inside stator 2205.

In various cases, rotor 2210 is located outside the stator 2205, where the rotor 2210 is upside down, and the first rotor pole 2212, the second rotor pole 2214, the third rotor pole 2216, the fourth rotor pole 2218, the fifth rotor pole 2222 and the sixth rotor pole 2224 are looking down on the stator 2205.

In this embodiment, each of the first to sixth rotor poles, 2212 to 2224, comprise permanent magnets located on the surface of the rotor poles. In this embodiment, the permanent magnet is one or more tilted inverse V-shape permanent magnets. A tilted inverse V-shape permanent magnet comprises a V-shape magnet tilted at an angle. A tilted inverse V-shape permanent magnet comprises two sub-magnets forming the left and the right side of the tilted letter 'V'.

In some cases, each rotor pole comprises only one tilted inverse V-shape permanent magnet. In some other cases, each rotor pole comprises more than one tilted inverse V-shape permanent magnets. In the illustrated embodiments, each rotor pole comprises k tilted inverse V-shape permanent magnets, where k is any integer greater than or equal to 1.

As illustrated, rotor pole 2212 comprises k tilted inverse V-shape permanent magnets 2280, rotor pole 2214 comprises k tilted inverse V-shape permanent magnets 2282, rotor pole 2216 comprises k tilted inverse V-shape permanent magnets 2284, rotor pole 2218 comprises k tilted inverse V-shape permanent magnets 2286, rotor pole 2222 comprises k tilted inverse V-shape permanent magnets 2288 and rotor pole 2224 comprises k tilted inverse V-shape permanent magnets 2290.

The tilted inverse V-shape permanent magnets 2275 to 2285 located on each rotor pole 2212 to 2224 of the switched reluctance machine 2200 are configured such that adjacent rotor pole pairs have tilted inverse V-shape permanent magnets with same orientation and polarity as each other. In this embodiment, tilted inverse V-shape permanent magnet 2275 of rotor pole 2212 and tilted inverse V-shape permanent magnet 2267 of rotor pole 2214, as well as tilted inverse V-shape permanent magnet 2283 of rotor pole 2222 and tilted inverse V-shape permanent magnet 2285 of rotor pole 2224 have the same orientation and polarity as each other.

Tilted inverse V-shape permanent magnet 2279 of rotor pole 2216 and tilted inverse V-shape permanent magnet 2281 of rotor pole 2218 have the same orientation and polarity as each other, but different than the orientation and polarity of tilted inverse V-shape permanent magnets 2275, 2277, 2283 and 2285.

Switched reluctance machine 2200 has a plurality of adjustable parameters associated with the tilted inverse V-shape permanent magnets located on each rotor pole, which can be adjusted based on the application of the switched reluctance machine 2200. Depending on machine ratings suitable for the type of application for the switched reluctance machine 2200, the adjustable parameters may be adjusted to match desired performance characteristics, size and cost of the switched reluctance machine 2200.

Adjustable parameters in switched reluctance machine 2200 include a plurality of parameters, such as, for example, length of the right side magnet of a tilted inverse V-shape permanent magnet $L_{221}$ 2215, length of the left side magnet of a tilted inverse V-shape permanent magnet $L_{222}$ 2220, width of the right side magnet of the tilted inverse V-shape permanent magnet $W_{221}$ 2225, width of the left side magnet of the tilted inverse V-shape permanent magnet $W_{222}$ 2230, etc.

Adjustable parameters in switched reluctance machine 2200 further include parameters, such as, for example, distance of the right side magnet of the tilted inverse V-shape permanent magnet from the right side of the rotor pole $d_{222}$ 2240, distance of the left side magnet of the tilted inverse V-shape permanent magnet from the left side of the rotor pole $d_{223}$ 2245, distance between the left and right magnet of the tilted inverse V-shape permanent magnet $d_{221}$ 2235, etc.

Adjustable parameters in switched reluctance machine 2200 also include parameters, such as, for example, rotation angle of right side magnet of the tilted inverse V-shape permanent magnet $\theta_{221}$ 2255, rotation angle of left side magnet of the tilted inverse V-shape permanent magnet $\theta_{222}$ 2250, rotation angle of tilted inverse V-shape permanent magnet towards the rotor pole surface $\theta_{223}$ 2260, fillet radii of each corner of right side magnet of the tilted inverse V-shape permanent magnet $r_{225}$, $r_{226}$, $r_{227}$, $r_{228}$ 2275, 2276, 2277 and 2278, and fillet radii of each corner of left side magnet of the tilted inverse V-shape permanent magnet $r_{221}$, $r_{222}$, $r_{223}$, $r_{224}$ 2270, 2271, 2272 and 2273, etc.

Figure 23:
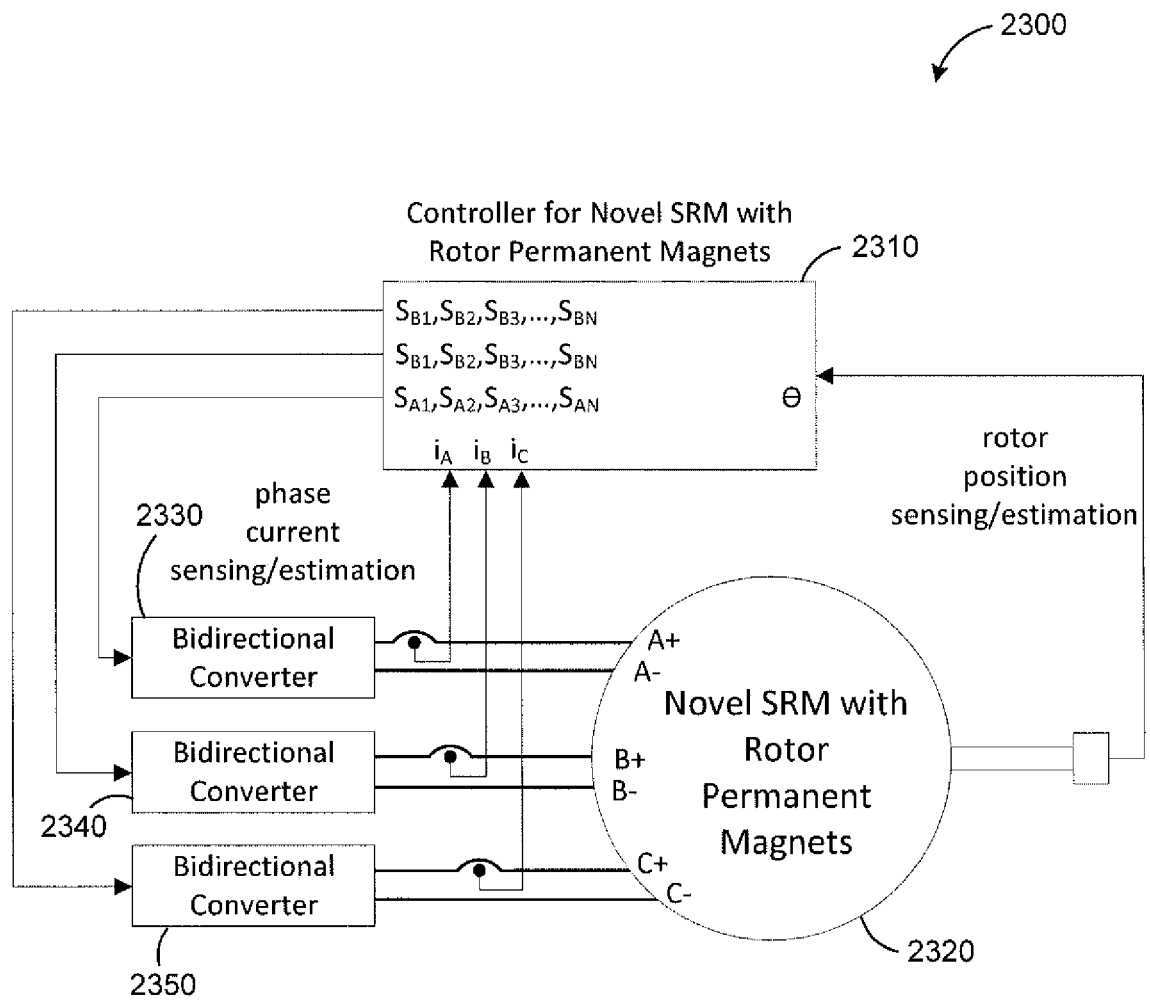
FIG. 23 is a switched reluctance motor drive system according to an example embodiment.

Reference is next made to FIG. 23 illustrating a switched reluctance machine 2300 according to an example embodiment. Switched reluctance machine 2300 consists of a controller 2310 and a driver 2320 communicably coupled to each other. Switched reluctance machine 2300 also consists of a first bidirectional converter 2330, a second bidirectional converter 2340 and a third bidirectional converter 2350, where each bidirectional converter relates to each phase of stator winding.

Depending on factors such as, for example, size of the switched reluctance machine, type of the switched reluctance machine, strength of rotor permanent magnets, dimensions of rotor permanent magnets, etc., magnetic flux of the rotor pole, which is moving away from a stator pole, might link in the coils of that stator pole. In such cases, the permanent magnet flux linking with the stator phase may cause a negative torque and degrade the performance of the switched reluctance machine. To eliminate the negative torque, controller 2310 is configured to energize the stator phase with the increasing inductance profile. Controller 2310 may energize the stator phase by controlling the phase currents of stator windings.

In some cases, the adjustable parameters of the rotor permanent magnets are defined or adjusted so that the opposing flux generated in the stator phase overcomes the negative torque from the linking of the permanent magnet flux.

In some cases, controller 2310 energizes the stator phases or controls the phase currents of stator windings by energizing the proper switches corresponding to each phase. Switches associated with each phase, A, B and C, are located in the bidirectional converters associated with each phase. For example, switches assigned to phase A may include switches $S_{A1}, S_{A2}, \ldots, S_{AN}$, located in the first bidirectional converter 2330. Similarly, switches assigned to phase B may include switches $S_{B1}, S_{B2}, \ldots, S_{BN}$, located in the second bidirectional converter 2340 and switches assigned to phase C may include switches $S_{C1}, S_{C2}, \ldots, S_{CN}$, located in the third bidirectional converter 2350.

In various cases, controller 2310 controls the stator phase current based on information related to rotor positions. Controller 2310 may additionally control the stator phase current based on speed and torque requirements of the switched reluctance machine 2300. In some cases, the rotor positions are measured using devices, such as, for example, sensors etc. In some other cases, the rotor positions are estimated.

In order to maintain a continuous torque production in motoring mode, each phase of the switched reluctance machine is energized by controller 2310 for a given or calculated turn-on and turn-off angles as the rotor pole moves towards the stator pole. If the phase windings are still excited as the rotor pole passes the alignment, the flux closing its path over the rotor pole forces it to stay in the alignment by applying negative torque.

The above-described embodiments and applications of the present invention are intended only to be examples. Alterations, modifications and variations may be effected to the particular embodiments by those of ordinary skill in the art, in light of this teaching, without departing from the spirit of or exceeding the scope of the claimed invention.

The invention claimed is:

1. A switched reluctance machine comprising:
   a stator that extends in an axial direction, the stator having a plurality of salient stator poles and corresponding phase windings to form at least three phases of the switched reluctance machine, wherein each phase winding is wound axially about the corresponding stator pole and the phase windings are adapted to carry electric current to generate magnetic flux; and
   a rotor that extends in the axial direction, the rotor being disposed concentrically with and spaced radially from the stator, the rotor having a plurality of salient rotor poles arranged circumferentially on the rotor;
   wherein at a given location of the stator and the rotor in the axial direction, the salient rotor poles and the salient stator poles extend radially towards one another along a radial plane that is perpendicular to the axial direction;
   wherein each salient rotor pole has a first distal corner and a second distal corner that is spaced circumferentially from the first distal corner;
   wherein each rotor pole comprises at least two permanent magnets defining an excitation source for that rotor pole, the at least two permanent magnets comprising a first permanent magnet positioned on the first distal corner and a second permanent magnet positioned on the second distal corner, wherein the first permanent magnet and the second permanent magnet have opposite polarity.

2. The switched reluctance machine of claim 1, wherein the rotor is disposed outside the stator.

3. The switched reluctance machine of claim 1, wherein the rotor is disposed inside the stator.

4. The switched reluctance machine of claim 1, wherein the excitation source for a first rotor pole in the plurality of salient rotor poles has a first polarity configuration, the excitation source for a second rotor pole in the plurality of salient rotor poles that is circumferentially adjacent to the first rotor pole along the radial plane has a second polarity configuration, and the first polarity configuration is different from the second polarity configuration.

5. The switched reluctance machine of claim 1, wherein the excitation source for a first rotor pole in the plurality of salient rotor poles has a first polarity configuration, the excitation source for a second rotor pole in the plurality of salient rotor poles that is circumferentially adjacent to the first rotor pole along the radial plane also has the first polarity configuration.

6. The switched reluctance machine of claim 1, further comprising a controller configured to control current in each phase winding of the stator based on position of the rotor poles.

7. The switched reluctance machine of claim 1, further comprising a controller coupled to the phase windings, wherein the controller is operable to monitor an inductance profile of each phase of the switched reluctance machine and to energize the stator phase having an increasing inductance profile.

8. The switched reluctance machine of claim 7, further comprising a plurality of bidirectional converters corresponding to the at least three phases of the switched reluctance machine, each bidirectional converter coupling the controller to the phase windings in one phase of the at least three phases of the switched reluctance machine.

9. A method of manufacturing a switched reluctance machine, the method comprising:
   providing a stator that extends in an axial direction, the stator having a plurality of salient stator poles and corresponding phase windings to form at least three phases of the switched reluctance machine, wherein each phase winding is wound axially about the corresponding stator pole and the phase windings are adapted to carry electric current to generate magnetic flux; and
   disposing a rotor that extends in the axial direction concentrically with and radially spaced from the stator, the rotor having a plurality of salient rotor poles arranged circumferentially on the rotor and a plurality of permanent magnets, wherein at a given location of the stator and the rotor in the axial direction, the salient rotor poles and the salient stator poles extend radially towards one another along a radial plane that is perpendicular to the axial direction, and wherein each salient rotor pole has a first distal corner and a second distal corner that is spaced circumferentially from the first distal corner, and
   providing each rotor pole with at least two of the permanent magnets defining an excitation source for that rotor pole, the at least two permanent magnets including a first permanent magnet on the first distal corner and a second permanent magnet on the second distal corner, wherein the first permanent magnet and the second permanent magnet have opposite polarity.

10. The method of claim 9, wherein the rotor is disposed outside the stator.

11. The method of claim 9, wherein the rotor is disposed inside the stator.

12. The method of claim 9, wherein the excitation source for a first rotor pole in the plurality of salient rotor poles is defined to have a first polarity configuration, the excitation source for a second rotor pole in the plurality of salient rotor poles that is circumferentially adjacent to the first rotor pole along the radial plane is defined to have a second polarity configuration, and the first polarity configuration is different from the second polarity configuration.

13. The method of claim 9, wherein the excitation source for a first rotor pole in the plurality of salient rotor poles is defined to have a first polarity configuration, the excitation source for a second rotor pole in the plurality of salient rotor poles that is circumferentially adjacent to the first rotor pole along the radial plane is also defined to have the first polarity configuration.

14. The method of claim 9, further comprising coupling a controller to each of the phase windings, wherein the controller is configured to control current in each phase winding of the stator based on position of the rotor poles.

15. The method of claim 9, further comprising coupling a controller to each of the phase windings, wherein the controller is operable to monitor an inductance profile of each phase of the switched reluctance machine and to energize the stator phase having an increasing inductance profile.

16. The method of claim 15, further comprising providing a plurality of bidirectional converters corresponding to the at least three phases of the switched reluctance machine, wherein each bidirectional converter is used to couple the controller to the phase windings in one phase of the at least three phases of the switched reluctance machine.

* * * * *